United States Patent
Peralta et al.

(10) Patent No.: US 10,636,563 B2
(45) Date of Patent: *Apr. 28, 2020

(54) METHOD OF FABRICATING A SINGLE STRUCTURE MULTI MODE ANTENNA FOR WIRELESS POWER TRANSMISSION USING MAGNETIC FIELD COUPLING

(71) Applicant: NUCURRENT, INC., Chicago, IL (US)

(72) Inventors: Alberto Peralta, Chicago, IL (US); Vinit Singh, Austin, TX (US); Ajit Rajagopalan, Chicago, IL (US); Jason Luzinski, Chicago, IL (US); Jacob Babcock, Chicago, IL (US); Christine A. Frysz, Orchard Park, NY (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,236

(22) Filed: Aug. 7, 2015

(65) Prior Publication Data
US 2017/0040105 A1 Feb. 9, 2017

(51) Int. Cl.
H01F 38/14 (2006.01)
H01Q 7/00 (2006.01)
(Continued)

(52) U.S. Cl.
CPC ....... H01F 38/14 (2013.01); G06K 19/07773 (2013.01); H01F 27/2804 (2013.01);
(Continued)

(58) Field of Classification Search
CPC ......... Y10T 29/49016; Y10T 29/49018; Y10T 29/4902; Y10T 29/49002
(Continued)

(56) References Cited

U.S. PATENT DOCUMENTS 2,797,393 A 6/1957 Clogston
2,911,605 A 11/1959 Wales, Jr.
(Continued)

FOREIGN PATENT DOCUMENTS

CN 2650300 10/2004
CN 103944196 7/2014
(Continued)

OTHER PUBLICATIONS

Office Action dated Sep. 27, 2016 in corresponding EP Application No. 13 001 130.7 (6 pages).
(Continued)

*Primary Examiner* — Peter Dungba Vo
*Assistant Examiner* — Azm A Parvez
(74) *Attorney, Agent, or Firm* — McDermott Will & Emery LLP

(57) ABSTRACT

A method of fabricating a single structure multiple mode antenna is described. The antenna is preferably constructed having a first inductor coil that is electrically connected in series with a second inductor coil. The antenna is constructed having a plurality of electrical connections positioned along the first and second inductor coils. A plurality of terminals is connected to the electrical connections that facilitate numerous electrical connections and enables the antenna to be selectively tuned to various frequencies and frequency bands.

21 Claims, 28 Drawing Sheets

(51) Int. Cl.
*H01F 27/28* (2006.01)
*G06K 19/077* (2006.01)

(52) U.S. Cl.
CPC .......... *H01F 27/2871* (2013.01); *H01Q 7/00* (2013.01); *Y10T 29/49016* (2015.01)

(58) Field of Classification Search
USPC .............................. 29/601, 600, 592.1, 602.1
See application file for complete search history.

(56) References Cited

U.S. PATENT DOCUMENTS

| | | |
|---|---|---|
| 3,484,731 A | 12/1969 | Rich |
| 4,328,531 A | 5/1982 | Nagashima et al. |
| 4,494,100 A | 1/1985 | Stengel et al. |
| 4,959,631 A | 9/1990 | Hasegawa et al. |
| 4,996,165 A | 2/1991 | Chang et al. |
| 5,137,478 A | 8/1992 | Graf et al. |
| 5,237,165 A | 8/1993 | Tingley, III |
| 5,604,352 A | 2/1997 | Schuetz |
| 5,713,939 A | 2/1998 | Nedungadi et al. |
| 5,748,464 A | 5/1998 | Schuetz |
| 5,767,808 A | 6/1998 | Robbins et al. |
| 5,767,813 A | 6/1998 | Verma et al. |
| 5,777,538 A | 7/1998 | Schuetz |
| 5,801,611 A | 9/1998 | Van Loenen et al. |
| 5,808,587 A | 9/1998 | Shima |
| 5,838,154 A | 11/1998 | Morikawa et al. |
| 5,883,392 A | 3/1999 | Schuetz |
| 5,892,489 A | 4/1999 | Kanba et al. |
| 5,980,773 A | 11/1999 | Takeda |
| 6,005,193 A | 12/1999 | Markel |
| 6,021,337 A | 2/2000 | Remillard et al. |
| 6,028,568 A | 2/2000 | Asakura et al. |
| 6,107,972 A | 8/2000 | Seward et al. |
| 6,148,221 A | 11/2000 | Ishikawa et al. |
| 6,163,307 A | 12/2000 | Kim et al. |
| 6,271,803 B1 | 8/2001 | Watanabe et al. |
| 6,503,831 B2 | 1/2003 | Speakman |
| 6,556,101 B1 | 4/2003 | Tada et al. |
| 6,583,769 B2 | 6/2003 | Shiroki et al. |
| 6,664,863 B1 | 12/2003 | Okamoto et al. |
| 6,809,688 B2 | 10/2004 | Yamada |
| 6,897,830 B2 | 5/2005 | Bae et al. |
| 6,924,230 B2 | 8/2005 | Sun et al. |
| 7,046,113 B1 | 5/2006 | Okamoto et al. |
| 7,205,655 B2 | 4/2007 | Sippola |
| 7,355,558 B2 | 4/2008 | Lee |
| 7,563,352 B2 | 7/2009 | Hubel |
| 7,579,835 B2 | 8/2009 | Schnell et al. |
| 7,579,836 B2 | 8/2009 | Schnell et al. |
| 7,713,762 B2 | 5/2010 | Lee et al. |
| 7,786,836 B2 | 8/2010 | Gabara |
| 7,952,365 B2 | 5/2011 | Narita et al. |
| 8,056,819 B2 | 11/2011 | Rowell et al. |
| 8,299,877 B2 | 10/2012 | Hong et al. |
| 8,436,780 B2 | 5/2013 | Schantz et al. |
| 8,567,048 B2 | 10/2013 | Singh et al. |
| 8,610,530 B2 | 12/2013 | Singh et al. |
| 8,653,927 B2 | 2/2014 | Singh et al. |
| 8,680,960 B2 | 3/2014 | Singh et al. |
| 8,692,641 B2 | 4/2014 | Singh et al. |
| 8,692,642 B2 | 4/2014 | Singh et al. |
| 8,698,590 B2 | 4/2014 | Singh et al. |
| 8,698,591 B2 | 4/2014 | Singh et al. |
| 8,707,546 B2 | 4/2014 | Singh et al. |
| 8,710,948 B2 | 4/2014 | Singh et al. |
| 8,774,712 B2 | 7/2014 | Sato et al. |
| 8,803,649 B2 | 8/2014 | Singh et al. |
| 8,823,481 B2 | 9/2014 | Singh et al. |
| 8,823,482 B2 | 9/2014 | Singh et al. |
| 8,855,786 B2 | 10/2014 | Derbas et al. |
| 8,860,545 B2 | 10/2014 | Singh et al. |
| 8,898,885 B2 | 12/2014 | Singh et al. |
| 9,178,369 B2 | 11/2015 | Partovi |
| 9,208,942 B2 | 12/2015 | Singh et al. |
| 9,559,526 B2 | 1/2017 | Von Novak, III et al. |
| 9,912,173 B2 | 3/2018 | Tseng |
| 2002/0020554 A1 | 2/2002 | Sakamoto et al. |
| 2002/0053992 A1 | 5/2002 | Kawakami et al. |
| 2002/0071003 A1 | 6/2002 | Kimura |
| 2002/0075191 A1 | 6/2002 | Yokoshima |
| 2002/0101383 A1 | 8/2002 | Junod |
| 2002/0105080 A1 | 8/2002 | Speakman |
| 2003/0006069 A1 | 1/2003 | Watanabe |
| 2003/0119677 A1 | 6/2003 | Qiyan et al. |
| 2004/0000974 A1 | 1/2004 | Odenaal et al. |
| 2004/0085247 A1 | 5/2004 | Mickle et al. |
| 2004/0108311 A1 | 6/2004 | de Rooij |
| 2004/0118920 A1 | 6/2004 | He |
| 2004/0140528 A1 | 7/2004 | Kim et al. |
| 2004/0159460 A1 | 8/2004 | Passiopoulos et al. |
| 2004/0189528 A1 | 9/2004 | Killen et al. |
| 2004/0217488 A1 | 11/2004 | Luechinger |
| 2004/0227608 A1 | 11/2004 | Nakatani et al. |
| 2005/0121229 A1 | 6/2005 | Takai et al. |
| 2005/0174628 A1 | 8/2005 | Kelly et al. |
| 2006/0022772 A1 | 2/2006 | Kanno et al. |
| 2006/0040628 A1 | 2/2006 | Porret |
| 2006/0192645 A1 | 8/2006 | Lee et al. |
| 2006/0284718 A1 | 12/2006 | Baumgartner et al. |
| 2007/0018767 A1 | 1/2007 | Gabara |
| 2007/0020969 A1 | 1/2007 | Yungers |
| 2007/0023424 A1 | 2/2007 | Weber |
| 2007/0045773 A1 | 3/2007 | Mi et al. |
| 2007/0046544 A1 | 3/2007 | Murofushi et al. |
| 2007/0095913 A1 | 5/2007 | Takahashi |
| 2007/0120629 A1 | 5/2007 | Schnell et al. |
| 2007/0179570 A1 | 8/2007 | Taboada et al. |
| 2007/0182367 A1 | 8/2007 | Partovi |
| 2007/0267718 A1 | 11/2007 | Lee |
| 2007/0279287 A1* | 12/2007 | Castaneda ............ H01Q 1/2266 343/700 MS |
| 2008/0039332 A1 | 2/2008 | Bernstein et al. |
| 2008/0055178 A1 | 3/2008 | Kim |
| 2008/0062066 A1 | 3/2008 | Arai |
| 2008/0067874 A1 | 3/2008 | Tseng |
| 2008/0150693 A1* | 6/2008 | You ...................... G06K 7/0008 340/10.1 |
| 2008/0164840 A1 | 7/2008 | Kato et al. |
| 2008/0164844 A1 | 7/2008 | Kato et al. |
| 2008/0164960 A1 | 7/2008 | Schnell et al. |
| 2008/0211320 A1 | 9/2008 | Cook et al. |
| 2008/0277386 A1 | 11/2008 | Haimer |
| 2008/0283277 A1 | 11/2008 | Muramatsu et al. |
| 2008/0303735 A1 | 12/2008 | Fukimoto |
| 2009/0015266 A1 | 1/2009 | Narita et al. |
| 2009/0079628 A1 | 3/2009 | Rofougaran |
| 2009/0085706 A1 | 4/2009 | Baarman et al. |
| 2009/0096413 A1 | 4/2009 | Partovi et al. |
| 2009/0108974 A1* | 4/2009 | Raggam ........... G06K 19/07749 336/105 |
| 2009/0134875 A1 | 5/2009 | Tomiha et al. |
| 2009/0140691 A1 | 6/2009 | Jung |
| 2009/0152542 A1 | 6/2009 | Lee et al. |
| 2009/0230777 A1 | 9/2009 | Baarman et al. |
| 2009/0261778 A1 | 10/2009 | Kook |
| 2009/0261936 A1 | 10/2009 | Widjaja et al. |
| 2010/0033290 A1 | 2/2010 | Liu |
| 2010/0072588 A1 | 3/2010 | Yang |
| 2010/0127660 A1 | 5/2010 | Cook et al. |
| 2010/0141042 A1 | 6/2010 | Kesler |
| 2010/0164296 A1* | 7/2010 | Kurs ...................... H01Q 1/248 307/104 |
| 2010/0219694 A1 | 9/2010 | Kurs et al. |
| 2010/0289599 A1 | 11/2010 | Knecht et al. |
| 2010/0289709 A1 | 11/2010 | Guan |
| 2010/0295701 A1 | 11/2010 | Denis |
| 2011/0024510 A1 | 2/2011 | Kato et al. |
| 2011/0084656 A1 | 4/2011 | Gao |
| 2011/0101788 A1 | 5/2011 | Sun et al. |
| 2011/0137379 A1 | 6/2011 | Wosmek |
| 2011/0241437 A1 | 10/2011 | Kanno |
| 2011/0248891 A1 | 10/2011 | Han et al. |

(56) References Cited

U.S. PATENT DOCUMENTS

| | | |
|---|---|---|
| 2011/0279198 A1 | 11/2011 | Haner |
| 2012/0062345 A1 | 3/2012 | Kurs et al. |
| 2012/0095531 A1 | 4/2012 | Derbas et al. |
| 2012/0169434 A1 | 7/2012 | Masuda et al. |
| 2012/0217819 A1 | 8/2012 | Yamakawa et al. |
| 2012/0235500 A1 | 9/2012 | Ganem et al. |
| 2012/0235634 A1 | 9/2012 | Hall et al. |
| 2012/0235636 A1 | 9/2012 | Partovi |
| 2012/0249396 A1 | 10/2012 | Parsche |
| 2012/0274148 A1 | 11/2012 | Sung et al. |
| 2012/0280765 A1 | 11/2012 | Kurs et al. |
| 2012/0326931 A1 | 12/2012 | Murayama et al. |
| 2013/0067737 A1 | 3/2013 | Singh |
| 2013/0067738 A1 | 3/2013 | Singh |
| 2013/0068499 A1 | 3/2013 | Singh et al. |
| 2013/0068507 A1 | 3/2013 | Singh et al. |
| 2013/0069748 A1 | 3/2013 | Singh |
| 2013/0069749 A1 | 3/2013 | Singh |
| 2013/0069750 A1 | 3/2013 | Singh |
| 2013/0069843 A1 | 3/2013 | Singh et al. |
| 2013/0076154 A1* | 3/2013 | Baarman ............... H01F 38/14 307/104 |
| 2013/0146671 A1 | 6/2013 | Grieshofer et al. |
| 2013/0199027 A1 | 8/2013 | Singh et al. |
| 2013/0199028 A1 | 8/2013 | Singh |
| 2013/0200070 A1 | 8/2013 | Singh |
| 2013/0200722 A1 | 8/2013 | Singh |
| 2013/0200968 A1 | 8/2013 | Singh |
| 2013/0200969 A1 | 8/2013 | Singh et al. |
| 2013/0200976 A1 | 8/2013 | Singh |
| 2013/0201589 A1 | 8/2013 | Singh |
| 2013/0205582 A1 | 8/2013 | Singh |
| 2013/0207744 A1 | 8/2013 | Singh |
| 2013/0208389 A1 | 8/2013 | Singh |
| 2013/0208390 A1 | 8/2013 | Singh |
| 2013/0257362 A1* | 10/2013 | Lim ............... H02J 50/70 320/108 |
| 2013/0300207 A1 | 11/2013 | Wang |
| 2013/0335284 A1 | 12/2013 | Hsu et al. |
| 2014/0008974 A1 | 1/2014 | Miyamoto |
| 2014/0028111 A1 | 1/2014 | Hansen |
| 2014/0035383 A1 | 2/2014 | Riehl |
| 2014/0035793 A1 | 2/2014 | Kato |
| 2014/0041218 A1 | 2/2014 | Singh et al. |
| 2014/0047713 A1 | 2/2014 | Singh et al. |
| 2014/0084946 A1 | 3/2014 | Clark et al. |
| 2014/0168019 A1 | 6/2014 | Hirobe |
| 2014/0183971 A1 | 7/2014 | Endo et al. |
| 2014/0197694 A1 | 7/2014 | Asanuma et al. |
| 2014/0231518 A1 | 8/2014 | Yosui |
| 2014/0266019 A1 | 9/2014 | Pigott |
| 2014/0361628 A1 | 12/2014 | Huang et al. |
| 2015/0054455 A1 | 2/2015 | Kim et al. |
| 2015/0076922 A1 | 3/2015 | Kato et al. |
| 2015/0091502 A1 | 4/2015 | Mukherjee et al. |
| 2015/0115727 A1 | 4/2015 | Carobolante et al. |
| 2015/0136858 A1 | 5/2015 | Finn |
| 2015/0137746 A1 | 5/2015 | Lee et al. |
| 2015/0140807 A1 | 5/2015 | Mohammed et al. |
| 2015/0145634 A1 | 5/2015 | Kurz |
| 2015/0145635 A1* | 5/2015 | Kurz ............... H01F 38/14 336/232 |
| 2015/0180440 A1 | 6/2015 | Ishizuka |
| 2015/0207541 A1 | 7/2015 | Kuroda |
| 2015/0236545 A1 | 8/2015 | Song |
| 2015/0236550 A1 | 8/2015 | Yang et al. |
| 2015/0280322 A1 | 10/2015 | Saito |
| 2015/0318710 A1 | 11/2015 | Lee et al. |
| 2015/0357827 A1 | 12/2015 | Muratov et al. |
| 2016/0056664 A1 | 2/2016 | Partovi |
| 2016/0111889 A1 | 4/2016 | Jeong |
| 2016/0118711 A1 | 4/2016 | Finn |
| 2016/0126002 A1 | 5/2016 | Chien |
| 2016/0149416 A1 | 5/2016 | Ha et al. |
| 2016/0156103 A1 | 6/2016 | Bae |
| 2016/0156215 A1 | 6/2016 | Bae |
| 2016/0224975 A1 | 8/2016 | Na |
| 2017/0126544 A1 | 5/2017 | Vigneras et al. |
| 2018/0166921 A1 | 6/2018 | Peralta |
| 2018/0167107 A1 | 6/2018 | Peralta |
| 2018/0167108 A1 | 6/2018 | Peralta |
| 2018/0167109 A1 | 6/2018 | Peralta |
| 2018/0167110 A1 | 6/2018 | Peralta |
| 2018/0168057 A1 | 6/2018 | Peralta |
| 2018/0212649 A1 | 7/2018 | Tenno |

FOREIGN PATENT DOCUMENTS

| | | |
|---|---|---|
| CN | 104037493 A | 9/2014 |
| CN | 104037494 A | 9/2014 |
| EP | 0310396 | 4/1989 |
| EP | 1609503 | 12/2005 |
| EP | 2031729 | 3/2009 |
| EP | 2557630 | 2/2013 |
| EP | 2775564 A1 | 9/2014 |
| EP | 2775565 A1 | 9/2014 |
| JP | 1-310518 | 12/1989 |
| JP | 5-83249 | 4/1993 |
| JP | 09-093005 | 4/1997 |
| JP | 10-255629 | 9/1998 |
| JP | 2007-7042569 | 2/2007 |
| JP | 2008-160781 | 7/2008 |
| JP | 2008-160781 A | 7/2008 |
| JP | 2008-205215 | 9/2008 |
| JP | 2008-294285 | 12/2008 |
| JP | 2008-307114 | 12/2008 |
| JP | 2001344574 | 12/2011 |
| JP | 2012-147408 | 8/2012 |
| JP | 2013-93429 | 5/2013 |
| JP | 2014-175864 A | 9/2014 |
| JP | 2014-175865 A | 9/2014 |
| KR | 10-2010-0092741 | 8/2010 |
| KR | 10-1216946 B1 | 1/2013 |
| KR | 10-2013-0015618 | 2/2013 |
| KR | 10-2014-0111554 A | 9/2014 |
| KR | 10-2014-0111794 A | 9/2014 |
| KR | 2014-0135357 | 11/2014 |
| KR | 10-1559939 B1 | 10/2015 |
| TW | 201436494 A | 9/2014 |
| TW | 201436495 A | 9/2014 |
| WO | 2008/050917 | 5/2008 |
| WO | WO 2010/104569 | 9/2010 |
| WO | 2010/129369 | 11/2010 |

OTHER PUBLICATIONS

Office Action dated Sep. 27, 2016 in corresponding EP Application No. 13 001 121.6 (6 pages).

Office Action dated Jan. 31, 2017 in corresponding JP Application No. 2013-047049 (5 pages).

European Search Report dated Aug. 7, 2014 for EP Appln. No. 10751119.8.

European Search Report dated Aug. 1, 2013 for EP Appln. No. 13001121.6.

European Search Report dated Aug. 1, 2013 for EP Appln. No. 13001130.7.

European Search Report dated Nov. 4, 2014 for EP Appln. No. 14000885.5.

Relative Permittivity—Dielectric Constant—Jul. 2011 (3 pages).

International Search Report and Written Opinion dated Oct. 14, 2016 for PCT/US2016/045588 (10 pages).

International Search Report and Written Opinion dated Oct. 28, 2016 for PCT/US2016/047607 (9 pages).

Office Action issued in corresponding EP Patent Application No. 14000885.5 dated Jun. 29, 2017 (4 pages).

Office Action issued in corresponding Taiwanese Patent Application No. 102108342 dated Feb. 21, 2017 (10 pages).

Office Action issued in corresponding Japanese Patent Application No. 2013-047048 dated Mar. 21, 2017 (12 pages).

International Search Report and Written Opinion issued in PCT/US2017/048708 dated Nov. 8, 2017 (10 pages).

(56) References Cited

OTHER PUBLICATIONS

Written Opinion and International Search Report issued in corresponding International Application No. PCT/US2017/065329 dated Feb. 21, 2018 (7 pages).
Office Action issued in corresponding Japanese Patent Application No. 2013-047048 dated Dec. 12, 2017 (11 pages).
Office Action dated Mar. 30, 2018 in corresponding CN Application No. 201310074946.8 (10 pages).
Office Action dated Mar. 27, 2018 in corresponding CN Application No. 201310075086.X (10 pages).
Office Action issued in corresponding Japanese Patent Application No. 2013-047048 dated May 8, 2018 (2 pages).
Decision of Dismissal of Amendment issued in corresponding Japanese Patent Application No. 2013-047048 dated May 8, 2018 (7 pages).
Office Action dated Apr. 27, 2018 in corresponding TW Application No. 102108345 (11 pages).
Office Action dated Nov. 28, 2017 in corresponding JP Application No. 2013-047049 (5 pages).
Office Action dated Aug. 25, 2017 in corresponding CN Application No. 201310075086.X (10 pages).
Office Action dated Aug. 23, 2017 in corresponding CN Application No. 201310074946.8 (10 pages).
Office Action dated Sep. 12, 2018 in corresponding CN Application No. 201310074946.8 (9 pages).
Office Action dated Sep. 12, 2018 in corresponding CN Application No. 201310075086.X (10 pages).
Office Action dated Oct. 29, 2018 in corresponding KR Application No. 10-2013-0026135 (12 pages).
Office Action dated Oct. 29, 2018 in corresponding KR Application No. 10-2013-0025858 (12 pages).
Ex. 1004—Prosecution History of U.S. Pat. No. 9,300,046, 322 pages (in two attachments A and B) due to size.
IPR2019-00860—Petition for Inter Partes Review of U.S. Pat. No. 8,680,960, 86 pages.
Ex. 1001—U.S. Pat. No. 868960 to Singh et al., 50 pages.
Ex 1004—File History for U.S. Pat. No. 8,680,960, 201 pages. (in two attachments due to size).
IPR2019-00861—Petition for Inter Partes Review of U.S. Pat. No. 9,300,046, 89 pages.
IPR2019-00862—Petition for Inter Partes Review of U.S. Pat. No. 8,710,948, 88 pages.
Ex. 1001 U.S. Pat. No. 8,710,948 to Singh et al., 50 pages.
Ex. 1004 File History of U.S. Pat. No. 8,710,948 to Singh et al., 213 pages.
IPR2019-0863 Petition for Inter Partes Review of U.S. Pat. No. 8,698,591, 89 pages.
Ex. 1001 U.S. Pat. No. 8,698,591, 49 pages.
Ex. 1004—Prosecution History of U.S. Pat. No. 8,698,591, 180 pages.
EP Communication pursuant to Rule 62 EPC regarding extended European Search Report for EP App. No. 16835665.7- 1212 dated May 15, 2019, 16 pages.
Notification of Decision of Rejection for KR App. No. 10-2013-0025858 dated May 14, 2019, with English Translation, 8 pages.
Notification of Decision of Rejection for KR 10-2013-0026135 dated May 14, 2019, 8 pages with.
EP Communication of extended European Search Report for EP 19154162.2 dated Jun. 12, 2019, 9 pages.
EP Office Communication Pursuant to Article 94(3) dated Jan. 17, 2019 for EP App. No. 13001121.6-1216.
EP Communication pursuant to Rule 164(1) EPC regarding partial supplementary European Search Report for EP App. No. 16835665.7-1212 dated Feb. 14, 2019, 20 pages.
Muratov, V., Multi-Mode Wireless Power Systems can be a bridge to the Promised Land of Universal Contactless charging, Mediatek, Inc., Nov. 20, 2014, 15 pages.
Qi 2010, "System Description Wireless Power Transfer", vol. 1, Low Power, Part 1: Interface Definition, Version 1.0.1, Oct. 2010, Wireless Power Consortium, 86 pages.
Narayanan, R., "Wireless Power Charging Coil Changing Considerations", Wurth Elektronik, Feb. 23, 2015, 9 pages.
Barcelo, T., "Wireless Power User Guide", Linear Technology, Application Note 138, Oct. 2013, 8 pages.
Yoon, Y., "Embedded conductor technology for micromachined RF elements", Journal of Micromechanics and Microengineering, Jun. 2005, 11 pages.
Burghartz, J., "On the Design of RF Spiral Inductors on Silicon", IEEE Transactions on Electron Devices, vol. 50, No. 3, Mar. 2003, pp. 718-729.
Qi 2009, "System Description Wireless Power Transfer", vol. 1, Low Power, Version 0.95, Jul. 2009, 76 pages.
Lee, Y., "Antenna Circuit Design for RFID Applications", 2003 Microchip Technology, AN710, 50 pages.
Sun, M., et al., "Apparatus for Wireless Power and Data Transfer Over a Distance", University of Pittsburgh, Jun. 2009, 30 pages.
IPR2019-00858—Petition for Inter Partes Review of U.S. Pat. No. 8,680,960, *Samsung Electronics Co., Ltd.* v. *NuCurrent, Inc.*, 90 pages.
IPR2019-00858—Ex. 1001 U.S. Pat. No. 8,680,960.
IPR2019-00858—Ex 1004—File History for U.S. Pat. No. 8,680,960 in two parts due to length.
Ex. 1002 Declaration of Dr. Steven Leeb, 115 pages.
Ex. 1003—CV of Dr. Steven B. Leeb, 7 pages.
Ex. 1005—US20070267718A1 to Lee, 13 pages.
Ex. 1006—Semat—Physics Chapters 29-32, 81 pages, (1958).
Ex 1009—US20090096413 to Partovi, 88 pages.
Ex 1010—IEEE Dictionary 1996 (excerpt), 9 pages.
Ex. 1011—US20070089773A1 to Koester et al., 26 pages.
Ex. 1012—US20120280765 to Kurs, 122 pages.
Ex. 1013—U.S. Pat. No. 6,432,497 to Bunyan, 12 pages.
Ex. 1014 U.S. Pat. No. 6,083,842 to Cheung et al., 8 pages.
Ex. 1015 Reinhold—Efficient Antenna Design of Inductive Coupled RFID—Systems with High Power Demand, Journal of Communication vol. 2, No., 6, Nov. 2007, 10 pages.
Ex. 1016 U.S. Pat. No. 4,549,042 to Akiba et al., 8 pages.
Ex. 1017—U.S. Pat. No. 5,812,344 to Balakrishnan, 12 pages.
Ex. 1018—Wheeler, Formulas for the Skin (1942), 13 pages.
Ex. 1019—Kyriazidou—U.S. Pat. No. 7,236,080, 12 pages.
Ex. 1020 Alldred et al., "A 1.2 V, 60 Ghz radio receiver with onchip transformers and inductors in 90 nm CMOS," Proc. IEEE Compound Semiconductor Integrated Circuits SYmp., pp. 51-54, Nov. 2006 ("Alldred"), 12 pages.
Ex. 1022 U.S. Pat. No. 9,912,173 to Tseng, 31 pages.
Ex. 1023 U.S. Pat. No. 7,248,138 to Chiang, 18 pages.
Ex. 1024 U.S. Pat. No. 5,084,958 to Yerman et al., 20 pages.
Ex. 1025—US20070126544—Wotherspoon, 6 pages.
Ex. 1028—U.S. Pat. No. 9,820,374 to Bois et al., 9 pages.
Ex. 1029 U.S. Pat. No. 7,601,919 to Phan et al., 14 pages.
Ex. 1030 U.S. Pat. No. 5,108,825 to Wojnarowski et al., 10 pages.
Ex. 1031 Ahn 7305725, 9 pages.
Ex. 1032—U.S. Pat. No. 5,745,331 to Shamouilian et al., 23 pages.
Ex. 1033—Hu, et al., "AC Resistance to Planar Power Inductors and the Quasidistributed Gap Technique," IEEE Transactions on Power Electronics, vol. 16, No. 4, Jul. 2001 ("Hu"), 13 pages.
Ex. 1034—U.S. Pat. No. 6,608,363 to Fazelpour, 8 pages.
Ex. 1035—IEEE Xplore web page, 2 pages.
Ex. 1036 Kraemer et al., "Architecture Considerations for 60 GhzPulse Transceiver Front-Ends," CAS 2007 Proceedings vol. 2, 2007, Int'l Semiconductor Conference (2007), 26 pages.
Ex. 1037—Varonen et al., "V-band Balanced Resistive Mixer in 65-nm CMOS," Proceedings of the 33rd European Solid-State Circuits Conference (2007), 22 pages.
Ex. 1038—IEEE Xplore web page, 2 pages.
Ex. 1039—Lopera et al., "A Multiwinding Modeling Method for High Frequency Transformers and Inductors", IEEE Transactions on Power Electronics, vol. 18, No. 3, May 2003, 14 pages.
Ex. 1040—Leonavicius et al., "Comparison of Realization Techniques for PFC Inductor Operating in Discontinuous Conduction Mode," IEEE Transactions on Power Electronics, vol. 19, No. 2, Mar. 2004, 14 pages.

(56) References Cited

OTHER PUBLICATIONS

Ex. 1041—Roshen, W.A., "Fringing Field Formulas and Winding Loss Due to an Air Gap," IEEE Transactions on Magnetics, vol. 43, No. 8, Aug. 2007, 12 pages.
IPR2019-00859—Petition for Inter Partes Review of U.S. Pat. No. 9,300,046, 87 pages.
Ex. 1001 U.S. Pat. No. 9,300,046 to Singh et al., 50 pages.
First Office Action for Chinese App. No. 201680058731.9 dated Aug. 5, 2019, English Translation, 6 pages.
Extended Search Report for EP 19188841.1-1216 dated Sep. 10, 2019, 11 pages.
Exhibit A-01: Invalidity Contentions: '960 Patent in View Jitsuo, *NuCurrent* v. *Samsung Electronics America, Inc. et al.*, Case No. 1:19-cv-00798-DLC (S.D.N.Y.), Invalidity of U.S. Pat. No. 8,680,960 ("The '960 Patent") by Japanese Patent Application Publication JP05082349A ("Jitsuo"), 56 pages.
Exhibita-02: Invalidity Contentions: '960PATENT in View of Kurs '694, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by U.S. Patent Application Publication 2010/0219694 Al ("Kurs '694"), 59 pages.
Exhibit A-03: Invalidity Contentions: '960 Patent in View of Sheng-Yuan, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by U.S. Patent Application Publication 2007/267718 Al ("Sheng-Yuan"). 86 pages.
Exhibit A-04: Invalidity Contentions: '960 Patent in View of Wotherspoon, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by U.S. Patent Application Publication 2007/0126544 Al ("Wotherspoon"), 51 pages.
Exhibit A-05: Invalidity Contentions: '960 Patent in View of Baarman '777, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by U.S. Patent Application Publication 2009/0230777A1 ("Baarman '777"), 50 pages.
Exhibit A-06: Invalidity Contentions: '960 Patent in View of Bae, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Granted Publication 6897830 B2 ("Bae"), 80 pages.
Exhibit A-07: Invalidity Contentions: '960 Patent in View of Ganem, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Application Publication 2012/0235500 Al ("Steven J. Ganem"), 82 pages.
Exhibit A-08: Invalidity Contentions: '960 Patent in View of Gao, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Application Publication 20111084656 Al ("Gao"), 39 pages.
Exhibit A-09: Invalidity Contentions: '960 Patent in View of Burghartz &Rejaei, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by on the Design of RF Spiral Inductors on Silicon ("Burghartz & Rejaei"), 53 pages.
Exhibit A-10: Invalidity Contentions: '960 Patent in View of Hasegawa '215, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by Japanese Patent Application Publication 2008-205215 a ("Hasegawa Minoru"), 46 pages.
Exhibit A-11: Invalidity Contentions: '960 Patent in View of Hasegawa '518, *NuCurrent* v. *Samsung Electronics America, Inc. et al.*, Case No. 1:19-cv-00798-DLC (S.D.N.Y.) Invalidity of U.S. Pat. No. 3,680,960 ("The '960 Patent") by J.P. Patent Application Publication 01310518 A ("Hasegawa Michio '518"), 82 pages.
Exhibit A-12: Invalidity Contentions: '960 Patent in View of Hasegawa Michio '631, *NuCurrent* v. *Samsung Electronics America, Inc. et al.*, Case No. 1:19-cv-00798-DLC (S.D.n. Y.) Invalidity of U.S. Pat. No. 3,680,960 ("The '960 Patent") by U.S. Patent Granted Publication 4959631 A ("Hasegawa Michio '631"), 43 pages.
Exhibit A-13: Invalidity Contentions: '960 Patent in View of Ishihara, *NuCurrent* v. *Samsung Electronics America, Inc. et al.*, Case No. 1:19-cv-00798-DLC (S.D.n. Y.) Invalidity of U.S. Pat. No. 3,680,960 ("The '960 Patent") by JP Patent Application Publication 2008/294285 A ("Ishihara Keien"), 37 pages.
Exhibit A-14: Invalidity Contentions: '960 Patent in View of Kato, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2008/164840 Al ("Hiroshi Kato"), 35 pages.
Exhibit A-15: Invalidity Contentions: '960 Patent in View of Kato, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2008/164844 A1 ("Hiroshi Kato"), 40 pages.
Exhibit A-16: Invalidity Contentions: '960 Patent in View of Kimura, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2002/071003 A1 ("Isao Kimura"), 59 pages.
Exhibit A-17: Invalidity Contentions: '960 Patent in View of Kurs '765, *NuCurrent* v. *Samsung Electronics America, Inc. et al.*, Case No. 1:19-cv-00798-DLC (S.D.n. Y.) Invalidity of U.S. Pat. No. 3,680,960 ("The '960 Patent") by U.S. Patent Application Publication 2012/0280765 A1 ("Kurs '765"), 57 pages.
Exhibit A-18: Invalidity Contentions: '960 Patent in View of Misumi, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by Japanese. Patent Application Publication JP 10255629 A ("Misumi Shuichi"), 37 pages.
Exhibit A-19: Invalidity Contentions: '960 Patent in View of Nakatani, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2004/227608 A1 ("Toshifumi Nakatani"), 58 pages.
Exhibit A-20: Invalidity Contentions: '960 Patent in View of Partovi '367, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2007/0182367 A1 ("Partovi '367"), 49 pages.
Exhibit A-21: Invalidity Contentions: '960 Patent in View of Inventor Partovi '413, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2009/0096413 A1 ("Afshin Partovi '413"), 45 pages.
Exhibit A-22: Invalidity Contentions: '960 Patent in View of Partovi '636, *NuCurrent* v. *Samsung Electronics America, Inc. et al.*, Case No. 1:19-cv-00798-DLC (S.D.n. Y.) Invalidity of U.S. Pat. No. 8,680,960 ("The '960 Patent") by U.S. Patent Application Publication 2012/0235636 A1 ("Afshin Partovi '636"), 64 pages.
Exhibit A-23: Invalidity Contentions: '960 Patent in View of QI 0.95, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by Qi System Description, Wireless Power Transfer, vol. 1: Low Power, Version 0.95 ("Qi 0.95"), 26 pages.
Exhibit A-24: Invalidity Contentions: '960 Patent in View of QI 1.0.1, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by Qi System Description, Wireless Power Transfer, vol. 1: Low Power, Part 1: Interface Definition, Version 1.0.1 ("Qi 1.0.1"), 49 pages.
Exhibit A-25: Invalidity Contentions: '960 Patent in View of Shima, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Pat. No. 5,808,587 A ("Hiroshi Shima"), 87 pages.
Exhibit A-26: Invalidity Contentions: '960 Patent in View of Sun, *NuCurrent* v. *Samsung Electronics America, Inc. et al.*, Case No.

(56) References Cited

OTHER PUBLICATIONS

1:19-cv-00798-DLC (S.D.N.Y.) Invalidity of U.S. Pat. No. 8,680,960 ("The '960 Patent") by U.S. Patent Application Publication 2011/0101788 A1 ("Sun"), 65 pages.
Exhibit A-27: Invalidity Contentions: '960 Patent in View of Tseng, *NuCurrent* v. *Samsung Electronics America, Inc. et al.*, Case No. 1:19-cv-00798-DLC (S.D.N.Y.) Invalidity of U.S. Pat. No. 8,680,960 ("The '960 3atent") by U.S. Pat. No. 9,912,173 B2 ("Ryan Tseng"), 67 pages.
Exhibit A-28: Invalidity Contentions: '960 Patent in View of Von Novak, III, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Pat. No. 9,559,526 B2 ("William H. Von Novak, III"), 57 pages.
Exhibit A-29: Invalidity Contentions: '960 Patent in View of Yamakawa, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Application Publication 2012/0217819 A1 ("Yamakawa"), 40 pages.
Exhibit A-30: Invalidity Contentions: '960 Patent in View of Yoon & Allen, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by Embedded Conductor Technology for Micromachined Rf Elements ("Yoon & Allen"), 13 pages.
Exhibit A-31: Invalidity Contentions: '960 Patent in View of the Blackberry Z30, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by the Blackberry Z30, 154 pages.
Exhibit A-32: Invalidity Contentions: '960 Patent in View of the LG G2, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by the LG G2, 462 pages.
Exhibit A-33: Invalidity Contentions: '960 Patent in View of the Lg G3, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by the LG G3, 228 pages.
Exhibit A-34: Invalidity Contentions: '960 Patent in View of the LG Nexus 5, *NuCurrent* v. *Samsung Electronics America, Inc. et al.*, Case No. 1:19-cv-00798-DLC (S.D.N.Y.) Invalidity of U.S. Pat. No. 8,680,960 ("The '960 Patent") by the LG Nexus 5, 391 pages.
Exhibit B-01: Invalidity Contentions: '046PATENT in View of Jitsuo, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by Japanese Patent Application Publication JP05082349A ("Jitsuo"), 50 pages.
Exhibit B-02: Invalidity Contentions: '046PATENT in View of Kurs '694, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2010/0219694 A1 ("Kurs '694"), 51 pages.
Exhibit B-03: Invalidity Contentions: '046 Patent in View of Sheng-Yuan, *NuCurrent* v. *Samsung Electronics America, Inc. et al.*, Case No. 1:19-cv-00798-DLC (S.D.N.Y.) Invalidity of U.S. Pat. No. 3,300,046 ("The '046 Patent") by U.S. Patent Application Publication 2007/267718 A1 ("Sheng-Yuan"), 76 pages.
Exhibit B-04: Invalidity Contentions: '046 Patent in View of Wotherspoon, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2007/0126544 A1 ("Wotherspoon"), 44 pages.
Exhibit B-05: Invalidity Contentions: '046PATENT in View of Baarman '777, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2009/0230777A1 ("Baarman '777"), 42 pages.
Exhibit B-06: Invalidity Contentions: '046PATENT in View of Bae, *NuCurrent* v. *Samsung Electronics America, Inc. et al.*, Case No. 1:19-cv-00798-Dlc (S.D.N.Y.) Invalidity of U.S. Pat. No. 9,300,046 ("The '046 3atent") by U.S. Patent Granted Publication 6897830 B2 ("Bae"), 71 pages.
Exhibit B-07: Invalidity Contentions: '046 Patent in View of Burghartz & Rejaei, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by On the Design of RF Spiral Inductors on Silicon ("Burghartz & Rejaei"), 45 pages.
Exhibit B-08: Invalidity Contentions: '046 Patent in View of Ganem, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2012/0235500 A1 ("Steven J. Ganem"), 75 pages.
Exhibit B-09: Invalidity Contentions: '046PATENT in View of Gao, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2011/084656 A1 ("Gao"), 33 pages.
Exhibit B-10: Invalidity Contentions: '046 Patent in View of Hasegawa '215, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by Japanese Patent Application Publication 2008-205215 A ("Hasegawa Minoru"), 42 pages.
Exhibit B-11: Invalidity Contentions: '046 Patent in View of Hasegawa '518, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by J.P. Patent Application Publication 01310518 A ("Hasegawa Michio '518"), 69 pages.
Exhibit B-12: Invalidity Contentions: '046 Patent in View of Hasegawa Michio '631, *NuCurrent* v. *Samsung Electronics America, Inc. et al.*, Case No. Case No. 1:19-cv-00798-DLC (S.D.N.Y.) Invalidity of U.S. Pat. No. 9,300,046 ("The '046 Patent") by U.S. Patent Granted Publication 4959631 A ("Hasegawa Michio '631"), 37 pages.
Exhibit B-13: Invalidity Contentions: '046 Patent in View of Ishihara, *NuCurrent* v. *Samsung Electronics America, Inc. et al.*, Case No. 1:19-cv-00798-DLC (S.D.N.Y.) Invalidity of U.S. Pat. No. 3,300,046 ("The '046 Patent") by JP Patent Application Publication 2008/294285 A ("Ishihara Keien"), 33 pages.
Exhibit B-14: Invalidity Contentions: '046 Patent in View of Kato '840, *NuCurrent* v. *Samsung Electronics America, Inc. et al.*, Case No. 1:19-cv-00798-DLC (S.D.N.Y.) Invalidity of U.S. Pat. No. 3,300,046 ("The '046 Patent") by U.S. Patent Application Publication 2008/164840 A1 ("Hiroshi Kato"), 32 pages.
Exhibit B-15: Invalidity Contentions: '046 Patent in View of Kato '844, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2008/164844 A1 ("Hiroshi Kato"), 37 pages.
Exhibit B-16: Invalidity Contentions: '046 Patent in View of Inventor Kimura, *NuCurrent* v. *Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2002/071003 A1 ("Isao Kimura"), 53 pages.
Exhibit C-33: Invalidity Contentions: 'Invalidity Contentions: '591 Patent in View of the LG G3 *NuCurrent* v. *Samsung Electronics America, Inc. et al.*, Case No. 1:19-cv-00798-DLC (S.D.N.Y.) Invalidity of U.S. Pat. No. 8,698,591 ("The '591 Patent") by the LG G3, 266 pages.
Exhibit C-34: Invalidity Contentions: '591 Patent in View of the LG Nexus 5, *NuCurrent* v. *Samsung Electronics America, Inc. et al.*, Case No. 1:19-cv-00798-DLC (S.D.N.Y.) Invalidity of U.S. Pat. No. 8,698,591 ("The '591 Patent") by the LG Nexus 5, 468 pages.
Exhibit D-01: Invalidity Contentions: '948 Patent in View of Jitsuo, *NuCurrent* v. *Samsung Electronics America, Inc. et al.*, Case No. 1:19-cv-00798-DLC (S.D.N.Y.) Invalidity of U.S. Pat. No. 8,710,948 ("The '948 Patent") by Japanese Patent Application Publication JP05082349A ("Jitsuo"), 54 pages.
Exhibit D-02: Invalidity Contentions: '948 Patent in View of Kurs, *NuCurrent* v. *Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2010/0219694 A1 ("Kurs"), 59 pages.

(56) References Cited

OTHER PUBLICATIONS

Exhibit D-03: Invalidity Contentions: '948 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2007/267718 A1 ("Sheng-Yuan"), 77 pages.

Exhibit D-04: Invalidity Contentions: '948 Patent in View of Wotherspoon, *NuCurrent v. Samsung Electronics America, Inc. et al.*, Case No. 1:19-cv-00798-DLC (S.D.N.Y.) Invalidity of U.S. Pat. No. 3,710,948 ("The '948 Patent") by U.S. Patent Application Publication 2007/0126544 Al ("Wotherspoon"), 52 pages.

Exhibit D-05: Invalidity Contentions: '948 Patent in View of Baarman, *NuCurrent v. Samsung Electronics America, Inc. et al.*, Case No. 1:19-cv-00798-DLC (S.D.N.Y.) Invalidity of U.S. Pat. No. 3,710,948 ("The '948 Patent") by U.S. Patent Application Publication 2009/0230777A1 ("David W. Baarman"), 52 pages.

Exhibit D-06: Invalidity Contentions: '948 Patent in View of Bae, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Granted Publication 6897830 B2 ("Bae"), 82 pages.

Exhibit D-07: Invalidity Contentions: '948 Patent in View of Burghartz &Rejaei, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by on the Design of RF Spiral Inductors on Silicon ("Burghartz & Rejaei"), 52 pages.

Exhibit D-08: Invalidity Contentions: '948 Patent in View of Ganem, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2012/0235500 A1 ("Steven J. Ganem"), 92 pages.

Exhibit D-09: Invalidity Contentions: '948 Patent in View of Gao, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2011/084656 A1 ("Gao"), 44 pages.

Exhibit D-10: Invalidity Contentions: '948 Patent in View of Hasegawa '215, *NuCurrent v. Samsung Electronics America, Inc. et al.*, Case No. 1:19-cv-00798-DLC (S.D.N.Y.) Invalidity of U.S. Pat. No. 3,710,948 ("The '948 Patent") by Japanese Patent Application Publication 2008-205215 A ("Hasegawa Minoru '215"), 16 pages.

Exhibit D-11: Invalidity Contentions: '948 Patent in View of Hasegawa Michio '631, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Granted Publication 4959631 A ("Hasegawa Michio '631"), 37 pages.

Exhibit D-12: Invalidity Contentions: '948 Patent in View of Hasegawa '518, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by J.P. Patent Application Publication 01310518 A ("Hasegawa Michio '518"), 78 pages.

Exhibit D-13: Invalidity Contentions: '948 Patent in View of Ishihara, *NuCurrent v. Samsung Electronics America, Inc. et al.*, Case No. 1:19-cv-00798-DLC (S.D.N.Y.) Invalidity of U.S. Pat. No. 3,710,948 ("The '948 Patent") by JP Patent Application Publication 2008/294285 A ("Ishihara Keien"), 38 pages.

Exhibit D-14: Invalidity Contentions: '948 Patent in View of Kato, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2008/164840 A1 ("Hiroshi Kato"), 34 pages.

Exhibit D-15: Invalidity Contentions: '948 Patent in View of Kato, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2008/164844 A1 ("Hiroshi Kato"), 39 pages.

Exhibit D-16: Invalidity Contentions: '948 Patent in View of Kimura, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2002/071003 A1 ("Isao Kimura"), 50 pages.

Exhibit D-17: Invalidity Contentions: '948 Patent in View of Kurs '765, *NuCurrent v. Samsung Electronics America, Inc. et al.*, Case No. 1:19-cv-00798-DLC (S.D.N.Y.) Invalidity of U.S. Pat. No. 3,710,948 ("The '948 Patent") by U.S. Patent Application Publication 2012/0280765 A1 ("Kurs '765"), 57 pages.

Exhibit D-18: Invalidity Contentions: '948 Patent in View of Misumi, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by Japanese. Patent Application Publication JP 10255629 A ("Misumi Shuichi"), 34 pages.

Exhibit D-19: Invalidity Contentions: '948 Patent in View of Nakatani, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2004/227608 A1 ("Toshifumi Nakatani"), 56 pages.

Exhibit D-20: Invalidity Contentions: '948 Patent in View of Partovi '367, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2007/0182367 A1 ("Partovi '367"), 51 pages.

Exhibit D-21: Invalidity Contentions: '948 Patent in View of Partovi '413, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2009/0096413 A1 ("Afshin Partovi '413"), 51 pages.

Exhibit D-22: Invalidity Contentions: '948 Patent in View of Partovi '636, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2012/0235636 A1 ("Afshin Partovi '636"), 67 pages.

Exhibit D-23: Invalidity Contentions: '948 Patent in View of 01 0.95, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by Qi System Description, Wireless Power Transfer, vol. 1: Low Power, Version 0.95 ("Qi 0.95"), 28 pages.

Exhibit D-24: Invalidity Contentions: '948 Patent in View of QI 1.0.1, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by Qi System Description, Wireless Power Transfer, vol. 1: Low Power, Part 1: Interface Definition, Version 1.0.1 ("Qi 1.0.1"), 55 pages.

Exhibit D-25: Invalidity Contentions: '948 Patent in View of Shima, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Pat. No. 5,808,587 a ("Hiroshi Shima"), 94 pages.

Exhibit D-26: Invalidity Contentions: '948 Patent in View of Sun, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2011/0101788 A1 ("Sun"), 63 pages.

Exhibit D-27: Invalidity Contentions: '948 Patent in View of Tseng, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Pat. No. 9,912,173 B2 ("Ryan Tseng"), 75 pages.

Exhibit D-28: Invalidity Contentions: '948 Patent in View of Von Novak, III, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Pat. No. 9,559,526 B2 ("William H. Von Novak, III"), 73 pages.

Exhibit D-29: Invalidity Contentions: '948 Patent in View of Yamakawa, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by U.S. Patent Application Publication 2012/0217819 Al ("Yamakawa"), 42 pages.

Exhibit D-30: Invalidity Contentions: '948 Patent in View of Yoon &Allen, *NuCurrent v. Samsung Electronics America, Inc. et al.*, Case No. 1:19-cv-00798-DLC (S.D.N.Y.) Invalidity of U.S. Pat. No.

(56) References Cited

OTHER PUBLICATIONS 8,710,948 ("The '948 Patent") by Embedded Conductor Technology for Micromachined Rf Elements ("Yoon & Allen"), 41 pages.
Exhibit D-31—Invalidity Contentions: '948 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by the Blackberry Z30, 168 pages.
Exhibit D-32: Invalidity Contentions: '948 Patent in View of the LG G2, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by the LG G2, 511 pages.
Exhibit D-33—Invalidity Contentions: '948 Patent in View of LG G3, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by the LG G3, 249 pages.
Exhibit D-34—Invalidity Contentions: '948 Patent in View of the Lg Nexus 5, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by the LG Nexus 5, 434 pages.
Exhibit E-01: Invalidity Contentions: '729 Patent in View of Ha, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2016/0149416 ("Ha"), 99 pages.
Exhibit E-02: Invalidity Contentions: '729 Patent in View of Riehl, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Application Publication 2014/0035383 ("Riehl"), 50 pages.
Exhibit E-03 : Invalidity Contentions: '729 Patent in View of Baarman '154, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Application Publication No. 2013/0076154 ("Baarman '154"), 42 pages.
Exhibit E-04: Invalidity Contentions: '729PATENT in View of Kanno, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Application Publication 2011/0241437 ("Kanno"), 30 pages.
Exhibit E-05: Invalidity Contentions: '729 Patent in View of Kazuya, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Japanese Patent Application Publication 2013093429 ("Kazuya"), 32 pages.
Exhibit E-06: Invalidity Contentions: '729 Patent in View of Muratov, *NuCurrent v. Samsung Electronics America, Inc. et al.*, Case No. 1:19-cv-00798-DLC (S.D.N.Y.) Invalidity of U.S. Pat. No. 3,941,729 ("The '729 Patent") by United States Patent Application Publication No. 2015/0357827 ("Muratov"), 35 pages.
Exhibit E-07: Invalidity Contentions: '729 Patent in View of Sung, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2012/0274148 ("Sung"), 27 pages.
Exhibit E-08 : Invalidity Contentions: '729 Patent in View of Kurz '635, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2015/0145635 ("Kurz '635"), 133 pages.
Exhibit E-09: Invalidity Contentions: '729 Patent in View of Kurz '634, *NuCurrent v. Samsung Electronics America, Inc. et al.*, Case No. 1:19-cv-00798-DLC (S.D.N.Y.) Invalidity of U.S. Pat. No. 3,941,729 ("The '729 Patent") by United States Patent Publication No. 2015/0145635 ("Kurz '634"), 122 pages.
Exhibit E-10: Invalidity Contentions: '729 Patent in View of Lee '746, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Application Publication No. 2015/0137746 ("Lee '746"), 34 pages.

Exhibit E-11: Invalidity Contentions: '729 Patent in View of Mukherjee, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2015/0091502 ("Mukherjee"), 32 pages.
Exhibit E-12: Invalidity Contentions: '729 Patent in View of Asanuma, *NuCurrent v. Samsung Electronics America, Inc. et al.*, Case No. 1:19-cv-00798-DLC (S.D.N.Y.) Invalidity of U.S. Patent No. 9,941,729 ("The '729 Patent") by United States Patent Application Publication No. 2014/0197694 ("Asanuma"), 24 pages.
Exhibit E-13: Invalidity Contentions: '729 Patent in View of Takashi, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2014/0008974 ("Takashi"), 77 pages.
Exhibit E-14: Invalidity Contentions: '729 Patent in View of Hoon, *NuCurrent v. Samsung Electronics 4merica, Inc. et al.*, Case No. 1:19-cv-00798-DLC (S.D.N.Y.) Invalidity of U.S. Pat. No. 9,941,729 ("The '729 Patent") by Korean Patent Publication No. 20130015618 ("Hoon"), 28 pages.
Exhibit E-15 : Invalidity Contentions: '729 Patent in View of Lee '710, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2015/0318710 ("Lee '710"), 42 pages.
Exhibit E-16: Invalidity Contentions: '729 Patent in View of Hisanori, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Japanese Patent Publication No. 2012-147408 ("Hisanori"), 45 pages.
Exhibit E-17: Invalidity Contentions: '729 Patent in View of Muratov Presentation, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Multi-Mode Wireless Power Systems can be a Bridge to the Promised Land of Universal Contactless Charging, presented by Vladimir Muratov ("Muratov Presentation"), 57 pages.
Exhibit E-18: Invalidity Contentions: '729 Patent in View of Han, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2017/0353055 A1 ("Han"), 46 pages.
Exhibit E-19: Invalidity Contentions: '729 Patent in View of Riehl IEEE, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Wireless Power Systems for Mobile Devices Supporting Inductive and Resonant Operating Modes, by Patrick S. Riehl et al., IEEE Transactions on Microwave Theory and Techniques, vol. 63, No. 3, Mar. 3, 2015 (Riehl IEEE), 56 pages.
Exhibit F-01: Invalidity Contentions: '960 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No. 8,680,960 ("The '960 Patent") by Korean Patent Application Publication 2010/0092741 A ("Chung Yeon Ho"), 34 pages.
Exhibit F-02: Invalidity Contentions: '960 Patent in View of Jung, *NuCurrent v. Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Application Publication 2009/0140691 A1 ("Chun-Kil Jung"), 58 pages.
Exhibit F-03: Invalidity Contentions: '960 Patent in View of Kook, *NuCurrent v. Samsung Electronics America, Inc. et al.*, Case No. 1:19-cv-00798-DLC (S.D.N.Y.) Invalidity of U.S. Pat. No. 8,680,960 ("The '960 Patent") by WIPO Patent Application Publication 2008/050917 A1 ("Kook Yoon-Sang"), 30 pages.
Exhibit G-01: Invalidity Contentions: '046 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by Korean Patent Application Publication 2010/0092741 A ("Chung Yeon Ho"), 33 pages.
Exhibit G-02: Invalidity Contentions: '046 Patent in View of Jung, *NuCurrent v. Samsung Electronics America, Inc. et al.*, Case No. 1:19-cv-00798-DLC (S.D.N.Y.) Invalidity of U.S. Pat. No. 9,300,046

(56) References Cited

OTHER PUBLICATIONS ("The '046 Patent") by U.S. Patent Application Publication 2009/0140691 A1 ("Chun-Kil Jung"), 49 pages.
Exhibit G-03: Invalidity Contentions: '046 Patent in View of Kook, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by WIPO Patent Application Publication 2008/050917 A1 ("Kook Yoon-Sang"), 26 pages.
Exhibit H-01: Invalidity Contentions: '591 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by Korean Patent Application Publication 2010/0092741 A ("Chung Yeon Ho"), 43 pages.
Exhibit H-02: Invalidity Contentions: '591 Patent in View of Jung, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2009/0140691 A1 ("Chun-Kil Jung"), 88 pages.
Exhibit H-03: Invalidity Contentions: '591 Patent in View of Kook, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by WIPO Patent Application Publication 2008/050917 A1 ("Kook Yoon-Sang"), 49 pages.
Exhibit I-01: Invalidity Contentions: '948 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by Korean Patent Application Publication 2010/0092741 A ("Chung Yeon Ho"), 39 pages.
Exhibit I-02: Invalidity Contentions: '948 Patent in View of Jung, *NuCurrent v. Samsung Electronics America, Inc. et al.*, Case No. 1:19-cv-00798-DLC (S.D.N.Y.) Invalidity of U.S. Pat. No. 8,710,948 ("The '948 3atent") by U.S. Patent Application Publication 2009/0140691 A1 ("Chun-Kil Jung"), 78 pages.
Exhibit I-03: Invalidity Contentions: '948 Patent in View of Kook, *NuCurrent v. Samsung Electronics America, Inc. et al.*, Case No. 1:19-cv-00798-DLC (S.D.N.Y.) Invalidity of U.S. Pat. No. 8,710,948 ("The '948 Patent") by WIPO Patent Application Publication 2008/050917 A1 ("Kook Yoon-Sang"), 43 pages.
Exhibit J-01 : Invalidity Contentions: '729 Patent in View of Satoshi, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Japanese Patent Publication No. 2001-344574 ("Satoshi"), 19 pages.
Exhibit J-02: Invalidity Contentions: '729 Patent in View of Takahashi, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2007/0095913 ("Takahashi"), 23 pages.
Exhibit J-03: Invalidity Contentions: '729 Patent in View of Baarman '953, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Application Publication No. 2011/0259953 ("Baarman '953"), 31 pages.
Exhibit J-04: Invalidity Contentions: '729 Patent in View of Carobolante, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2015/0115727 ("Carobolante"), 12 pages.
Exhibit J-05: Invalidity Contentions: '729 Patent in View of Bae, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2016/0156103 ("Bae"), 6 pages.
Exhibit J-06: Invalidity Contentions: '729 Patent in View of Singh, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by U.S. Pat. No. 8,680,960 ("Singh"), 3 pages.
Exhibit J-07: Invalidity Contentions: '729 Patent in View of Qi 1.0.1, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Qi System Description, Wireless Power Transfer, vol. 1: Low Power, Part 1: Interface Definition, Version 1.0.1 ("Qi 1.0.1"), 14 pages.
Exhibit J-08 : Invalidity Contentions: '729 Patent in View of Narayanan, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Application Note: Wireless Power Charging Coil Considerations, by Raghu Narayanan, Würth Elektronik ("Narayanan"), 6 pages.
Exhibit J-09: Invalidity Contentions: '729 Patent in View of Barcelo, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Application Note 138: Wireless Power User Guide, by Trevor Barcelo, Linear Technology ("Barcelo"), 4 pages.
Exhibit K: Family Patents Combinations, *NuCurrent v. Samsung Electronics America, Inc. et al.*, Case No. 1:19-cv-00798-DLC (S.D.N.Y.), 103 pages.
Exhibit L: '729 Patent Combinations, *NuCurrent v. Samsung Electronics America, Inc. et al.*, Case No. 1:19-cv-00798-DLC (S.D.N.Y.), 106 pages.
Decision Granting Institution of Inter Partes Review of IPR2019-0858, 44 pages.
IPR2019-00858, Exhibit 1042—Order Denying [167] Motion for Preliminary Injunction, 15 pages.
IPR2019-00859—Decision Granting Institution of Inter Partes Review for Patent 9,300,046 B2, 48 pages.
IPR2019-00859—Ex. 1042—Order Denying [167] Motion for Preliminary Injunction, 15 pages.
IPR2019-00860—Decision Denying Institution of Inter Partes Review re U.S. Pat. No. 8,680,960 B2, 6 pages.
IPR2019-00860—Ex. 1042, Order Denying [167] Motion for Preliminary Injunction, 15 pages.
Decision Denying Institution of Inter Partes Review re U.S. Pat. No. 9,300,046 B2, 6 pages.
Decision Granting of Inter Partes Review Case IPR2019-00862 re U.S. Pat. No. 8,710,948 B2, 41 pages.
IPR2019-00862 Exhibit 1042—Order Denying [167] Motion for Preliminary injunction.
IPR2019-00863 Decision Granting Institution of Inter Partes Review re U.S. Pat. No. 8,698,591 B2, 42 pages.
IPR2019-00863—Ex. 1002 Corrected Leeb Declaration.
IPR2019-01217—Petition for Inter Partes Review of U.S. Pat. No. 9,941,729, 90 pages.
IPR2019-01217—Ex. 1001—U.S. Pat. No. 9,941,729, 48 pages.
IPR2019-01217—Ex. 1002—Declaration of R. Jacob Baker, Ph.D., Re., in Support of Petition for Inter Partes Review of U.S. Pat. No. 9,941,729, 143 pages.
IPR2019-01217—Ex. 1003—CV of R. Jacob Baker, 35 pages.
IPR2019-01217—Ex. 1004—U.S. Appl. No. 14/821,065, part 1, 330 pages.
IPR2019-01217—Ex. 1004—U.S. Appl. No. 14/821,065, part 2, 430 pages.
IPR2019-01217—Ex. 1004—U.S. Appl. No. 14/821,065, part 3, 230 pages.
IPR2019-01217—Ex. 1004—U.S. Appl. No. 14/821,065, part 4, 299 pages.
Ex. 1005—U.S. Publication 2014-0035383 to Riehl, 11 pages.
Ex. 1006—Riehl IEEE Transactions on Microwave Therory and Techniques, Mar. 2015, vol. 63, No. 3, 17 pages.
Ex. 1007 U.S. Publication 2011/0241437 to Kanno, 21 pages.
Ex. 1008—U.S. Publication 2012/0274148 to Sung et al., 13 pages.
Ex. 1009—JP Patent No. 2013-93429 to Kazuya, 27 pages.
Ex. 1010—U.S. Pub. No. 2015/0091502 to Mukherjee et al., 7 pages.
Ex. 1011—KR Patent No. 10-2013-0045307 to Yu, 45 pages.
Ex. 1012—IEE Transactions on microwave theory and techniques, New York, NY 1953, 17 pages.
Ex. 1013—Asa et al., A Novel Multi-Level Phase-Controlled Resonant Inverter with Common Mode Capacitor for Wireless EV Chargers, 6 pages.
Ex. 1014—Abstract of a Novel Multi-Level Phase-Controlled Resonant Inverter with Common Mode Capacitor for Wireless EV Chargers, IEEE XPlore Digital Library, 2 pages.

(56) References Cited

OTHER PUBLICATIONS

IPR2019-01217—Ex.1015—Wotherspoon—US 2007/0126544, 6 pages.
PGR2019-00049—Petition for Post-Grant Review re U.S. Pat. No. 10,063,100, 112 pages.
Ex. 1001—U.S. Pat. 10,063,100, 48 pages.
PGR2019-00049—Ex. 1002—Declaration of Jacob Baker, Ph.D., P.E. In support of Petition for Post-Grant Review of U.S. Pat. No. 10,063,100, 141 pages.
Ex. 1003—CV of R. Jacob Baker, Ph.D., P.E., 34 pages.
Ex. 1004—File History of U.S. Appl. No. 14/821,157, Part 1, 475 pages.
Ex. 1004—File History of U.S. Appl. No. 14/821,157, Part 2, 475 pages.
Ex. 1004—File History of U.S. Appl. No. 14/821,157, Part 3, 438 pages.
PGR2019-0050—Petition for Post-Grant Review of U.S. Pat. No. 10,063,100, 73 pages.
PGR2019-0050—Ex. 1002 Declaration of R. Jacob Baker, Ph.D., P.E. In Support of Petition for Post-Grant Review of U.S. Pat. No. 10,063,100, 42 pages.
PGR2019-0050—Ex. 1005 U.S. Pat. No. 9,941,729 to Peralta et al., 48 pages.
PGR2019-0050—Ex. 1006 File History for U.S. Appl. No. 14/821,065, Part 1, 800 pages.
PGR2019-0050—Ex. 1006 File History for U.S. Appl. No. 14/821,065, Part 2, 489 pages.
PGR2019-0050—Ex. 1008—First Amended Complaint for *NuCurrent, Inc. v. Samsung Electronics Co., Ltd.; Samsung Electronics America, Inc.*, Case. No. 6:18-cv-00051-JRG-KNM, 62 pages.
PGR2019-0050—Ex. 1009—NuCurrent's Opening Claim Construction Brief, Case. No. 1:19-CV-00798-DLC, 31 pages.
European Extended Search Report for EP Application No. 17879649.6-1202 dated Dec. 17, 2019.
Exhibit B-17: Invalidity Contentions: '046Patent in View of Kurs '765, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2012/0280765 A1 ("Kurs '765"), 50 pages.
Exhibit B-18: Invalidity Contentions: '046 Patent in View of Misumi, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by Japanese. Patent Application Publication JP 10255629 A ("Misumi Shuichi"), 33 pages.
Exhibit B-19: Invalidity Contentions: '046 Patent in View of Nakatani, *NuCurrent v. Samsung Electronics America, Inc. et al.*, Case No. 1:19-cv-00798-DLC (S.D.N.Y.) Invalidity of U.S. Pat. No. 3,300,046 ("The '046 Patent") by U.S. Patent Application Publication 2004/227608 A1 ("Toshifumi Nakatani"), 51 pages.
Exhibit B-20: Invalidity Contentions: '046Patent in View of Partovi '367, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2007/0182367 A1 ("Partovi '367"), 37 pages.
Exhibit B-21: Invalidity Contentions '046 Patent in View of Inventor Partovi '413, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2009/0096413 A1 ("Afshin Partovi '413"), 39 pages.
Exhibit B-22: Invalidity Contentions: '046 Patent in View of Partovi '636, *NuCurrent v. Samsung Electronics America, Inc. et al.*, Case No. 1:19-cv-00798-DLC (S.D.N.) Invalidity of U.S. Pat. No. 9,300,046 ("The '046 Patent") by U.S. Patent Application Publication 2012/0235636 A1 ("Afshin Partovi '636"), 55 pages.
Exhibit B-23: Invalidity Contentions: '046 Patent in View of 01 0.95, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by Qi System Description, Wireless Power Transfer, vol. 1: Low Power, Version 0.95 ("Qi 0.95"), 23 pages.

Exhibit B-24: Invalidity Contentions: '046 Patent in View of Qi 1.0.1, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by Qi System Description, Wireless Power Transfer, vol. 1: Low Power, Part 1: Interface Definition, Version 1.0.1 ("Qi 1.0.1"), 44 pages.
Exhibit B-25: Invalidity Contentions: '046 Patent in View of Shima, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 5,808,587 A ("Hiroshi Shima"), 76 pages.
Exhibit B-26: Invalidity Contentions: '046 Patent in View of Sun, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2011/0101788 A1 ("Sun"), 55 pages.
Exhibit B-27: Invalidity Contentions: '046 Patent in View of Tseng, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Pat. No. 9,912,173 B2 ("Ryan Tseng"), 62 pages.
Exhibit B-28: Invalidity Contentions: '046 Patent in View of Von Novak, III, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 9,559,526 B2 ("William H. Von Novak, III"), 50 pages.
Exhibit B-29: Invalidity Contentions: '046PATENT in View of Yamakawa, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by U.S. Patent Application Publication 2012/0217819 A1 ("Yamakawa"), 36 pages.
Exhibit B-30: Invalidity Contentions: '046 Patent in View of Yoon & Allen, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by Embedded Conductor Technology for Micromachined Rf Elements ("Yoon & Allen"), 39 pages.
Exhibit B-31: Invalidity Contentions: '046 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by the Blackberry Z30, 135 pages.
Exhibit B-32: Invalidity Contentions: '046 Patent in View of the LG G2, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the LG G2, 401 pages.
Exhibit B-33: Invalidity Contentions: '046 Patent in View of the LG G3, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the LG G3, 200 pages.
Exhibit B-34: Invalidity Contentions: '046 Patent in View of the LG Nexus 5, *NuCurrent v. Samsung Electronics America, Inc. et al.*, Case No. 1:19-cv-00798-DLC (S.D.N.Y.) Invalidity of U.S. Pat. No. 9,300,046 ("The '046 Patent") by the LG Nexus 5, 340 pages.
Exhibit C-01: Invalidity Contentions: '591 Patent in View of Jitsuo, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by Japanese Patent Application Publication JP05082349A ("Jitsuo"), 59 pages.
Exhibit C-02: Invalidity Contentions: '591 Patent in View of Kurs '694, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2010/0219694 A1 ("Kurs '694"), 61 pages.
Exhibit C-03: Invalidity Contentions: '591 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2007/267718 A1 ("Sheng-Yuan"), 84 pages.
Exhibit C-04: Invalidity Contentions: '591 Patent in View of Wotherspoon, *NuCurrent v. Samsung Electronics America, Inc. et al.*, Case No. 1:19-cv-00798-DLC (S.D.N.Y.) Invalidity of U.S. Pat. No. 3,698,591 ("The '591 Patent") by U.S. Patent Application Publication 2007/0126544 A1 ("Wotherspoon"), 58 pages.

(56) References Cited

OTHER PUBLICATIONS

Exhibit C-05: Invalidity Contentions: '591 Patent in View of Baarman '777, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2009/0230777A1 ("Baarman '777"), 57 pages.

Exhibit C-06: Invalidity Contentions: '591 Patent in View of Burghartz &Rejaei, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by on the Design of RF Spiral Inductors on Silicon ("Burghartz & Rejaei"), 61 pages.

Exhibit C-07:Invalidity Contentions: '591 Patent in View of Ganem, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2012/0235500 A1 ("Steven J. Ganem"), 98 pages.

Exhibit C-08: Invalidity Contentions: '591 Patent in View of Gao, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2011/084656 A1 ("Gao"), 49 pages.

Exhibit C-09: Invalidity Contentions: '591 Patent in View of Hasegawa'215, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by Japanese Patent Application Publication 2008-205215 A ("Hasegawa Minoru"), 50 pages.

Exhibit C-10: Invalidity Contentions: '591 Patent in View of Hasegawa '518, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by J.P. Patent Application Publication 01310518 A ("Hasegawa Michio '518"), 85 pages.

Exhibit C-11: Invalidity Contentions: '591 Patent in View of Hasegawa'631, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Granted Publication 4959631 A ("Hasegawa'631"), 40 pages.

Exhibit C-12: Invalidity Contentions: '591 Patent in View of Ishihara, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by JP Patent Application Publication 2008/294285 A ("Ishihara Keien"), 40 pages.

Exhibit C-13: Invalidity Contentions: '591 Patent in View of Kato '840, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2008/164840 A1 ("Hiroshi Kato"), 35 pages.

Exhibit C-14: Invalidity Contentions: '591 Patent in View of Kato '844, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2008/164844 A1 ("Hiroshi Kato"), 39 pages.

Exhibit C-15: Invalidity Contentions: '591 Patent in View of Kimura, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2002/071003 A1 ("Isao Kimura "), 52 pages.

Exhibit C-16: Invalidity Contentions: '591 Patent in View of Kurs '765, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2012/0280765 A1 ("Kurs '765"), 61 pages.

Exhibit C-17: Invalidity Contentions: '591 Patent in View of Misum, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by Japanese. Patent Application Publication JP 10255629 A ("Misum Shuichi"), 37 pages.

Exhibit C-18: Invalidity Contentions: '591 Patent in View of Nakatani, *NuCurrent v. Samsung Electronics America, Inc. et al.*, Case No. 1:19-cv-00798-DLC (S.D.N.Y.) Invalidity of U.S. Pat. No. 3,698,591 ("the '591 Patent") by U.S. Patent Application Publication 2004/227608 A1 ("Toshifumi Nakatani"), 59 pages.

Exhibit C-19: Invalidity Contentions: '591 Patent in View of Partovi '367, *NuCurrent v. Samsung Electronics America, Inc. et al.*, Case No. 1:19-cv-00798-DLC (S.D.N.Y.) Invalidity of U.S. Pat. No. 8,698,591 ("The '591 patent") by U.S. Patent Application Publication 2007/0182367 A1 ("Partovi '367"), 55 pages.

Exhibit C-20: Invalidity Contentions: '591 Patent in View of Afshin Partovi '413, *NuCurrent v. Samsung Electronics America, Inc. et al.*, Case No. 1:19-cv-00798-DLC (S.D.N.Y.) Invalidity of U.S. Pat. No. 3,698,591 ("The '591 Patent") by U.S. Patent Application Publication 2009/0096413 A1 ("Afshin Partovi '413"), 56 pages.

Exhibit C-21: Invalidity Contentions: '591 Patent in View of Partovi '636, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2012/0235636 A1 ("Afshin Partovi '636"), 77 pages.

Exhibit C-22: Invalidity Contentions: '591 Patent in View of 01 0.95, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by Qi System Description, Wireless Power Transfer, vol. 1: Low Power, Version 0.95 ("Qi 0.95"), 29 pages.

Exhibit C-23: Invalidity Contentions: '591 Patent in View of 01 1.0.1, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by Qi System Description, Wireless Power Transfer, vol. 1: Low Power, Part 1: Interface Definition, Version 1.0.1 ("Qi 1.0.1"), 57 pages.

Exhibit C-24: Invalidity Contentions: '591 Patent in View of Shima, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 5,808,587 A ("Hiroshi Shima"), 102 pages.

Exhibit C-25: Invalidity Contentions: '591 Patent in View of Sun, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2011/0101788 A1 ("Sun"), 68 pages.

Exhibit C-26: Invalidity Contentions: '591 Patent in View of Tseng, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication U.S. Pat. No. 9,912,173 B2 ("Ryan Tseng"), 84 pages.

Exhibit C-27: Invalidity Contentions: '591 Patent in View of Von Novak, III, *NuCurrent v. Samsung Electronics America, Inc. et al.*, Case No. 1:19-cv-00798-DLC (S.D.N.Y.) Invalidity of U.S. Patent No. 8,698,591 ("the '591 Patent") by U.S. Patent Application Publication 9,559,526 B2 ("William H. Von Novak, III"), 81 pages.

Exhibit C-28: Invalidity Contentions: '591 Patent in View of Yamakawa, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2012/0217819 A1 ("Yamakawa"), 46 pages.

Exhibit C-29: Invalidity Contentions: '591 Patent in View of Yoon &Allen, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by Embedded Conductor Technology for Micromachined Rf Elements ("Yoon & Allen"), 14 pages.

Exhibit C-30: Invalidity Contentions: '591 Patent in View of Bae, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Granted Publication 6897830 B2 ("Bae"), 88 pages.

Exhibit C-31: Invalidity Contentions: '591 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by the Blackberry Z30, 180 pages.

Exhibit C-32: Invalidity Contentions: '591 Patent in View of the LG G2, *NuCurrent v. Samsung Electronics America, Inc. et al.*, Case

(56) References Cited

OTHER PUBLICATIONS

No. 1:19-cv-00798-DLC (S.D.N.Y.) Invalidity of U.S. Pat. No. 8,698,591 ("the '591 Patent") by the LG G2, 557 pages.

* cited by examiner

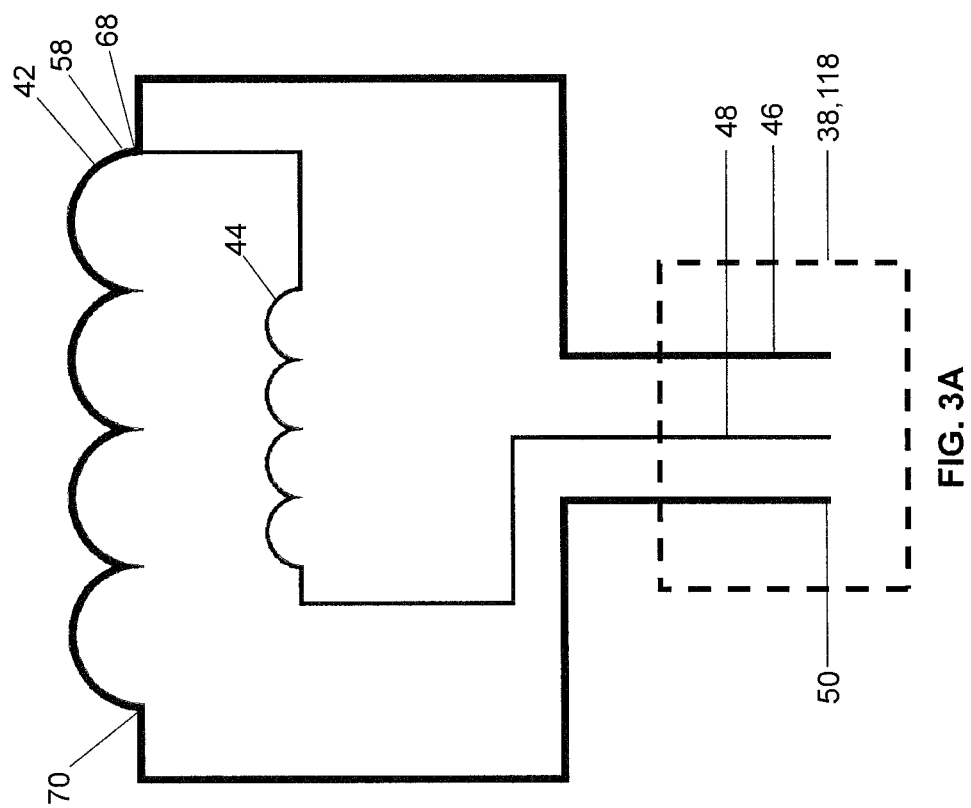

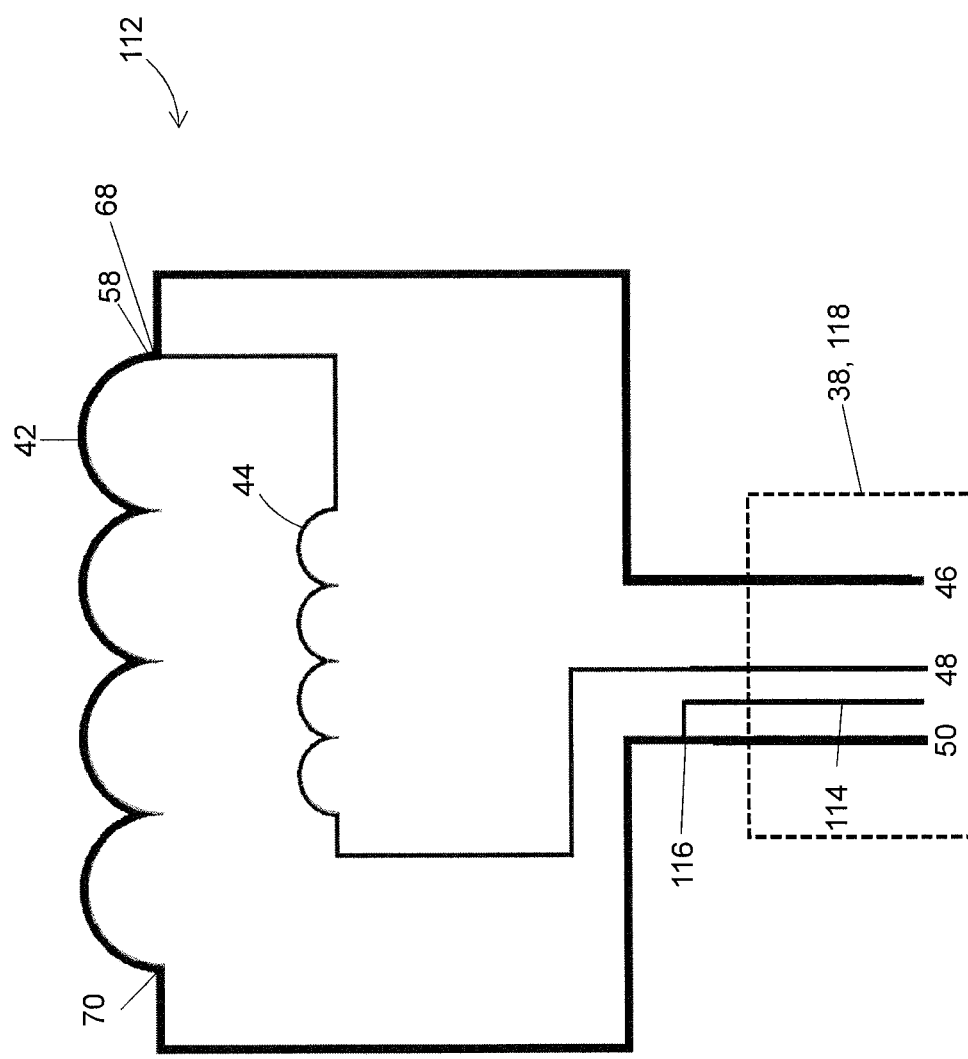

METHOD OF FABRICATING A SINGLE STRUCTURE MULTI MODE ANTENNA FOR WIRELESS POWER TRANSMISSION USING MAGNETIC FIELD COUPLING

TECHNICAL FIELD

The present disclosure relates generally to the wireless transmission of electrical energy and data. More specifically, this application relates to an antenna that facilitates the wireless transmission of data and electrical energy at multiple operating frequency bands.

BACKGROUND

Wireless energy transfer is useful in cases where the interconnection of wires may be inconvenient, hazardous or impossible. In recent years, applications employing near-field wireless power and/or data transmission have gained prominence in areas such as consumer electronics, medical systems, military systems and industrial applications. Near-field communication enables the transfer of electrical energy and/or data wirelessly through magnetic field induction between a transmitting antenna and a corresponding receiving antenna. Near-field communication interface and protocol modes are defined by ISO/IEC standard 18092.

However, near-field communication is often not optimal because prior art antennas that facilitate the wireless transfer of electrical power and/or data operate inefficiently. In such cases, the amount of electrical energy received by the corresponding antenna is generally significantly less than the amount of electrical energy initially transmitted. In addition, data that is received may be incomplete or may become corrupted. In addition, near-field communication generally suffers from reduced wireless transfer distances, i.e., the transmission range, and physical antenna orientation issues. These inefficiencies of near field communication are largely due to the low quality factor of the prior art antennas in addition to the inefficient large size of prior art antennas. In general, prior art near field communication antennas have a relatively large size that hinders efficient operation and wireless transmission. Size and efficiency are often a tradeoff, a problem which becomes more acute when multiple wireless operations are desired, i.e., multiple modes of operation. A solution to inefficient near-field communication is antenna integration.

Inductive solutions transfer power and/or data between two inductor coils that are placed in close proximity to each other. This technology, for example, facilitates the deployment of inductive charging "hot spots" that enables wireless electrical charging of electronic devices by simply placing them near a charging "hot spot", such as on a surface of a table. However, for these systems to operate efficaciously, the respective transmitter and receiver antennas are required to not only be located in close proximity to each other but, in addition, must also be physically positioned in a specific orientation with respect to one another. Typically, these prior art antennas require that they are physically positioned in near perfect alignment such that the centers of the respective transmitting and receiving antennas are oriented in perfect opposition to each other in order to operate efficaciously. This general requirement for near perfect physical alignment of the transmitting and receiving antennas typically leads to poor near field communication performance as it is challenging to achieve perfect alignment of the opposing transmitting and receiving antennas to ensure proper wireless power and/or data transfer.

As a result, use of these prior art antennas leads to near field communication that is generally not reliable and significantly reduced operating efficiency. As defined herein "inductive charging" is a wireless charging technique that utilizes an alternating electromagnetic field to transfer electrical power between two antennas. "Resonant inductive coupling" is defined herein as the near field wireless transmission of electrical energy between two magnetically coupled coils that are part of two spaced apart resonant circuits that are tuned to resonate at the same frequency. "Magnetic resonance" is defined herein as the excitation of particles (as atomic nuclei or electrons) in a magnetic field by exposure to electromagnetic radiation of a specific frequency.

Various multimode wireless power solutions have been developed to address these antenna positioning and proximity limitations and concomitant of reliability & efficiency issues. In some cases, operating frequency bands have been reduced, for example, a frequency band that ranges from about 150 kHz to about 250 kHz to increase range from about 15 mm to about 20 mm has been achieved by resonating the receiving antenna at a frequency that is about the same as the frequency of the transmitting antenna, both of which are similar to the frequency at which power transfer is taking place. However, such solutions have not sufficiently addressed the need to provide increased efficient wireless transfer with multiple mode operation capability through modification of the antenna structure.

Inductive and resonance interface standards have been developed to create global standards for wireless charging technologies. "Qi" is a wireless inductive power transfer standard/specification. Specifically, the Qi wireless inductive power transfer standard is an interface standard that was developed by the Wireless Power Consortium. The Qi interface standard is a protocol generally intended to facilitate transfer of low electrical power up to about 15 W at frequencies ranging from 100 kHz to about 200 kHz over distances ranging from about 2 mm to about 5 mm.

"Rezence" is a competing interface standard developed by the Alliance for Wireless Power (A4WP) for wireless electrical power transfer based on the principles of magnetic resonance. Specifically, the Rezence interface standard currently supports electrical power transfer up to about 50 W, at distances up to about 5 cm. Unlike the Qi interface standard, the Rezence interface standard utilizes an increased frequency of about 6.78 MHz+/−15 kHz.

In addition, there exists a third standard developed by the Power Matters Alliance (PMA) that operates in the frequency range of about 100 kHz to about 350 kHz. Unlike prior art multi-band antennas, the multi-band single structure antenna of the present disclosure is capable of receiving and/or transmitting signals and/or electrical energy across all of these standards with one antenna.

Currently these standards are the preeminent standards for wireless power technology in consumer electronics. Although these standards are relatively new to the market, the surge in development of small portable wireless devices and the proliferation of wireless transmission solutions into other wireless applications increases the need for, and adoption of, these standards. The Qi interface standard, released in 2010, has already been widely adopted. The Qi interface standard is currently incorporated into more than 20 million products world-wide.

Antennas are a key building block in the construction of wireless power and/or data transmission systems. As wireless technologies have developed, antennas have advanced from a simple wire dipole to more complex structures.

Multi-mode antennas have been designed to take advantage of different wireless interface standards. For example, Qi inductive wireless charging was first demonstrated in an Android smartphone more than four years ago. In 2015, the Samsung® Galaxy S56® supports two wireless charging standards, namely PMA and WPC's Qi. This solution, however, addresses inductive interface standards only. Given the differences in, for example, performance efficiencies, size, transfer range, and positioning freedom between inductive transmission versus resonance-based transmission, what is needed is a single antenna board that works with all types of wireless charging standards, for example, the PMA standard, WPC's Qi standard and A4WP's Rezence standard.

Furthermore, some wireless transmission applications will utilize a combination of standards-based and/or non-standards-based transfer protocols. The multi-band single structure antenna of the present disclosure is capable of receiving and/or transmitting signals and/or electrical energy across any combination of standards-based and/or non-standards-based transfer protocols with one antenna.

Prior art "multi mode" antennas, referred to as "Two-Structure Dual Mode" (TSDM) antennas, are typically constructed having two discrete antenna structures that are positioned on a substrate. The two discrete antenna structures that comprise a TSDM antenna operate independent of each other and require separate terminal connections to each of the respective independent antenna. FIG. 1 illustrates an example of such a prior art two-structure dual mode antenna 10 which comprises a first exterior inductor 12 and a second, separate interior inductor 14, each antenna having a positive and negative terminal connection respectively that are not electrically connected. However, such TSDM antennas have a relatively large footprint which comprises a significant amount of space and surface area. Such TSDM antennas are therefore, not ideally suited for incorporation with small electronic devices or positioned within small confined spaces.

Two-structure multi-mode (TSMM) antennas 10 are generally constructed such that both the separate exterior and interior inductors 12, 14 each have a specific inductance. Thus, the exterior inductor 12 is constructed having a specific number of exterior inductor turns and the interior inductor 14 is constructed having a specific number of interior inductor turns. In this structure, the two respective coils operate as independent antennas. Coil-based TSMM antennas fundamentally require a large amount of area to enable better performance. Specifically, antenna coupling between the exterior and interior antennas require that they be positioned a distance away from each other such that energy generated from one antenna is not absorbed by the other. Furthermore, in a traditional TSMM configuration, when the "interior" antenna is operating, the area extending from the outermost trace of the internal antenna to the outermost trace of the exterior antenna is not being utilized and, thus, is "wasted" space.

SUMMARY

The present disclosure provides various embodiments of an antenna that is capable of wirelessly receiving and/or transmitting electrical power and/or data between different locations. Specifically, the antenna of the present disclosure is designed to enable wireless reception or transmission of electrical power and/or data over multiple frequencies such as the specifications established by the Qi and Rezence interface standards, as previously mentioned. The multi-mode antenna of the present disclosure is of a single structure comprising at least two inductor coils that are electrically connected in series. In an embodiment, the single structure multi-mode antenna of the present disclosure may comprise a composite of at least one substrate on which at least one electrically conductive filar is disposed. Furthermore, at least one of the substrate layers that comprise the single structure antenna may be composed of a different material. Alternatively, the single structure antenna of the present disclosure may be constructed without a substrate.

The single structure antenna of the present disclosure preferably comprises at least two inductor coils that are electrically connected in series. Each of the inductors is preferably composed of an electrically conductive material such as a wire, which may include, but is not limited to, a conductive trace, a filar, a filament, a wire, or combinations thereof. It is noted that throughout this specification the terms, "wire", "trace", "filament" and "filar" may be used interchangeably. As defined herein, the word "wire" is a length of electrically conductive material that may either be of a two dimensional conductive line or track that may extend along a surface or alternatively, a wire may be of a three dimensional conductive line or track that is contactable to a surface. A wire may comprise a trace, a filar, a filament or combinations thereof. These elements may be a single element or a multitude of elements such as a multifilar element or a multifilament element. Further, the multitude of wires, traces, filars, and filaments may be woven, twisted or coiled together such as in a cable form. The wire as defined herein may comprise a bare metallic surface or alternatively, may comprise a layer of electrically insulating material, such as a dielectric material that contacts and surrounds the metallic surface of the wire. A "trace" is an electrically conductive line or track that may extend along a surface of a substrate. The trace may be of a two dimensional line that may extend along a surface or alternatively, the trace may be of a three dimensional conductive line that is contactable to a surface. A "filar" is an electrically conductive line or track that extends along a surface of a substrate. A filar may be of a two dimensional line that may extend along a surface or alternatively, the filar may be a three dimensional conductive line that is contactable to a surface. A "filament" is an electrically conductive thread or threadlike structure that is contactable to a surface.

In a preferred embodiment, the at least two inductor coils are disposed on an external surface of one of the plurality of substrates. Alternatively, at least one of the plurality of inductor coils may be disposed on each of the substrates that comprise the antenna structure. At least one via may be provided that connects at least two of the conductive materials that comprise the inductors of the antenna. In a preferred embodiment, the at least one via may be provided to create an electrical shunt connection between the coils, or portions thereof. As defined herein the term "shunt" means an electrically conductive pathway that is created by electrically joining two points of a circuit such that an electrical current or an electrical voltage may pass therethrough.

The inductor coils are strategically positioned and electrically connected in series to facilitate the reception and/or transmission of wirelessly transferred electrical power or data through near field magnetic induction at either, both or all frequency ranges of about 100 kHz to about 200 kHz (Qi interface standard), 100 kHz to about 350 kHz (PMA interface standard), 6.78 MHz (Rezence interface standard), or alternatively at a frequency being employed by the device in a proprietary recharging mode. In addition, the antenna of the present disclosure may be designed to receive or transmit over a wide range of frequencies on the order of about 1 kHz to about 1 GHz or greater in addition to the Qi and Rezence interfaces standards.

In addition to enabling dynamic adjustment of the antenna's operating frequency, the single structure of the present disclosure also enables dynamic adjustment of its self-resonance frequency. Such self resonant frequencies are typically utilized for radio frequency (RF) communication such as a cellular phone or radio. The single structure antenna of the present application is capable of self resonant frequencies that range from about 1 kHz to about 500 GHz. Furthermore, the single structure antenna of the present application is capable of dynamically adjusting the inductance exhibited by the antenna.

Such a dynamic adjustment of at least one of the operating frequency, resonance frequency and inductance of the antenna is preferably accomplished through modifying the various connections within the antenna. More specifically, the operating frequency, the self-resonance frequency and/or the inductance of the antenna can be changed by modifying the various "tapped" inductance coil electrical connections that are strategically positioned therewithin. Thus, by modifying the sequence of the electrical connections between the at least various portions of the electrically connected inductor coils that comprise the antenna, the operating frequency, resonance frequency and/or inductance can be dynamically adjusted to meet various application requirements. Moreover, by dynamically adjusting the electrical connections within the antenna of the present disclosure, the separation distance between adjacent antennas that facilitates data or electrical power transfer can also be adjusted to meet specific application requirements. As defined herein, the term "tapped" means an electrical connection between at least two points.

In at least one of the embodiments of the present disclosure, a method of fabricating a single structure multi mode antenna is provided. The method of fabricating the antenna includes providing a substrate having a surface composed of an electrically insulative material. In addition, the method includes forming a first coil capable of generating a first inductance disposed on the substrate surface, the first coil formed of a first conductive wire having $N_1$ number of turns with spaced apart first and second first coil ends. The method also includes forming a second coil capable of generating a second inductance that is positioned within an inner perimeter formed by the first coil, the second coil formed of a second conductive wire having $N_2$ number of turns with spaced apart first and second second coil ends. The method further includes electrically connecting a first terminal to the first end of the first coil, electrically connecting a second terminal to the second end of the second coil and electrically connecting a third terminal along either of the second or third coils. The method further includes selecting an electrical connection between two of the first, second, and third terminals to selectively tune an inductance or frequency that is generatable by the antenna.

One or more embodiments include wherein the first and second conductive wires are formed by at least one of the following methods: a surface printing technique, photolithography, chemical or laser etching, laser cladding, laser cutting, physical or chemical vapor deposition, electrochemical deposition, molecular beam epitaxy, atomic layer deposition, stamping, or chemical processing. One or more embodiments include creating a gap between the inner perimeter of the first coil and an outer perimeter of the second coil. One or more embodiments include providing a gap size of at least about 0.1 mm. One or more embodiments include further comprising providing the first conductive wire with two or more filars electrically connected in parallel. One or more embodiments include providing the second conductive wire with two or more filars electrically connected in parallel. One or more embodiments include electrically connecting the first terminal to the first end of the first coil, wherein the first end of the first coil is disposed at an end of the first wire of the first coil located at an outermost first coil perimeter, electrically connecting the third terminal to the first end of the second coil positioned at a second coil outer perimeter, and electrically connecting the second terminal to the second end of the second coil located along an interior perimeter of the second coil.

One or more embodiments include providing a selection circuit comprising at least one of a capacitor, a resistor, and an inductor electrically connected to the first, second, and third terminals. One or more embodiments include wherein the selection circuit actively connects two of the first, second, and third terminals to generate a tunable inductance. One or more embodiments include providing $N_1$ at least one and $N_2$ at least two. One or more embodiments include providing $N_2$ greater than $N_1$. One or more embodiments include providing each terminal with a terminal lead portion that extends between a coil connection point and a terminal end, the coil connection point electrically connected to one of either of the first and second conductive wires of the first and second coils, respectively, and wherein the terminal lead portion extends over at least a portion of either of the first and second conductive wires of the first and second coils, respectively. One or more embodiments include providing a plurality of first vias are positioned adjacently along a right side of a length of the terminal lead portion and a plurality of second vias are positioned along a left side of a length of the terminal lead portion and opposed from the plurality of first vias so that each of the plurality of first vias opposes one of the plurality of second vias, wherein the respective opposing vias of the plurality of first and second vias are electrically connected to the same conductive wire of either of the first or second coils thereby establishing a conductive electrical path therebetween that bypasses the terminal lead portion.

One or more embodiments include providing at least the first or second wires with a variable wire width. One or more embodiments include providing a quality factor greater than 10. One or more embodiments include selecting an electrical signal from the group consisting of a data signal, an electrical voltage, an electrical current, and combinations thereof receivable by at least one of the first and second coils. One or more embodiments include selecting an electrical signal from the group consisting of a data signal, an electrical voltage, an electrical current, and combinations thereof transmittable by at least one of the first and second coils. One or more embodiments include selecting the substrate material from the group consisting of a polyimide, an acrylic, fiberglass, polyester, polyether imide, polytetrafluoroethylene, polyethylene, polyetheretherketone (PEEK), polyethylene napthalate, fluropolymers, copolymers, a ceramic material, a ferrite material and combinations thereof. One or more embodiments include wherein the antenna is capable of receiving or transmitting within a frequency band selected from the group consisting of about 100 kHz to about 250 kHz, about 250 kHz to about 500 kHz, 6.78 MHz, 13.56 MHz, and combinations thereof. One or more embodiments include wherein the antenna is capable of receiving or transmitting at frequencies of at least 100 kHz.

In a preferred embodiment, various materials may be incorporated within the structure of the antenna to shield the coils from magnetic field and/or electromagnetic interference and, thus, further enhance the antenna's electrical performance. Specifically, magnetic field shielding materials, such as a ferrite material, may be positioned about the antenna structure to either block or absorb magnetic fields that create undesirable proximity effects that increase electrical impedance within the antenna. As will be discussed in more detail, these proximity effects generally increase electrical impedance within the antenna which results in a degradation of the quality factor. In addition, the magnetic field shielding materials may be positioned about the antenna structure to increase inductance and/or act as a heat sink within the antenna structure to minimize over heating of the antenna. Furthermore, such materials may be utilized to modify the magnetic field profile of the antenna. Modification of the magnetic field(s) exhibited by the single structure antenna of the present disclosure may be desirable in applications such as wireless charging. For example, the profile and strength of the magnetic field exhibited by the antenna may be modified to facilitate and/or improve the efficiency of wireless power transfer between the antenna and an electric device such as a cellular phone. Thus, by modifying the profile and/or strength of the magnetic field about an electronic device being charged, minimizes undesirable interferences which may hinder or prevent transfer of data or an electrical charge therebetween.

Thus, the single structure antenna of the present disclosure is of an efficient design that is capable of operating over multiple frequencies having an optimized inductance and quality factor that comprises at least two inductor coils that are electrically connected in series. The single structure antenna of the present disclosure enables the antenna to be tuned to a multitude of customizable frequencies and frequency bands to facilitate optimized wireless transfer of electrical energy and/or data.

BRIEF DESCRIPTION OF THE DRAWINGS

FIG. 3A is an electrical schematic diagram of the three terminal embodiment of the antenna shown in FIG. 3.

FIG. 4 is an electrical schematic diagram of the four terminal antenna embodiment of the present disclosure shown in FIG. 4.

DETAILED DESCRIPTION

Figure 1:
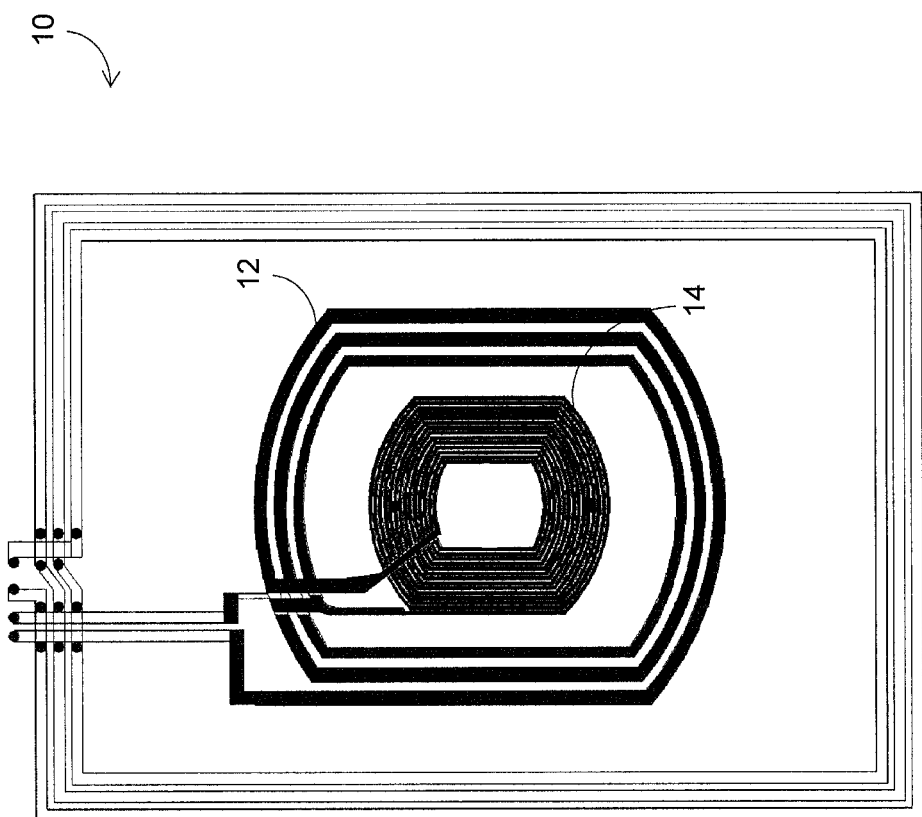
FIG. 1 illustrates an embodiment of a prior art four terminal two-structure dual mode antenna.

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The antenna and communication system thereof of the present disclosure provides for improved induction communication, such as near field communication. More specifically, the antenna of the present disclosure is of a single structure design that enables coupled magnetic resonance. Coupled magnetic resonance is an alternative technology that when appropriately designed, can provide for increased wireless power transfer and communication efficiencies and is less dependent of physical orientation and positioning requirements of prior art antennas. As a result, the antenna of the present disclosure provides for improved wireless transfer efficiency and a better user experience.

The multi-band single structure antenna of the present disclosure also enables increased transmission range. As will be discussed in more detail, the structure of the antenna of the present disclosure enables tuning of the operating frequency. This enables the operator to quickly modify the receiving antenna's operating frequency to match the frequency of the transmitted signal or, alternatively, transmit a signal at an increased frequency using a frequency multiplier to match the increased operating frequency of a receiving antenna. Furthermore, the single structure antenna of the present disclosure may also comprise a selection circuit which may be capable of conditioning or modifying the received or transmitted signal. An example of which includes modifying the operating frequency of the antenna by a frequency multiplying factor to increase range.

In addition, the antenna of the present disclosure enables increased operating frequencies. Operating at a higher frequency range provides for smaller antenna form factors. For example, consider a generic transmitting and receiving antenna combination both operating at a frequency ($\omega$) that are spaced a distance d apart and have a coupling factor, k. The transmitting antenna has a transmitting antenna inductance ($LT_x$) and the receiving antenna has a receiving antenna inductance ($LR_x$). In this scenario, the induced voltage at the receiving antenna is given by the formula:

$$V_{induced} \sim \omega k \sqrt{L_{TX} L_{RX}}$$

Based on the equation above, if the frequency of operation ($\omega$) is increased, the respective transmitting and receiving antenna inductances required to produce a similar induced voltage is reduced, given a similar coupling factor, k. Thus, as a result, smaller inductors that require less space can be utilized for the respective antennas. For example, if the form factor, i.e., surface area of the coils is kept nearly identical having a similar coupling coefficient, a thinner receiver coil or transmitter coil may be possible by designing for a reduced receiving or transmitting inductance because of the increased operating frequency ($\omega$).

In wearable electronics, where space is at a premium, operating at a higher frequency and tuning the respective inductors of the receiving antenna closer to the intended frequency of transmission provides the potential of increased performance, i.e., improved quality factor and increased induced voltages in a smaller form factor.

In contrast to the prior art TSMM antenna, the single-structure multi-mode (SSMM) antenna of the present disclosure provides an efficient design that enables the reception and transmission of a multitude of a non-limiting range of frequencies which includes the frequency specification of the Qi and Rezence interface standards, in addition to many other wireless electrical power transfer standards. In addition, the single structure multi-mode antenna of the present disclosure enables multiple communication based standards such as, but not limited to, near field communication (NFC), radio frequency identification (RFID), multi-mode standard transponder (MST), in addition to a host of frequency standards that operate at frequencies greater than about 400 MHz. The physical mechanism of these multiple "power" transfer and/or "communications" modes may be purely magnetic, such as via magnetic fields, electromagnetic, such as via electromagnetic waves, electrical, such as via capacitive interactions or piezoelectric action. Piezoelectric power transfer and/or communication modes would generally require a unique piezoelectric material such as barium titanate, lead zirconate titanate, or potassium niobate that is able to transduce acoustic signals to electrical signals and vice versa.

Specifically, the single-structure multi-mode (SSMM) antenna of the present disclosure facilitates either or both the transmission and reception of wirelessly transmitted electrical power and/or data. The unique design and construction of the SSMM antenna of the present disclosure, provides an antenna having optimized electrical performance in a reduced form factor.

In addition, the single structure antenna of the present disclosure may also comprise a plurality of materials such as various ferrite materials to block magnetic fields from adjacent wire strands of the plurality of coils. Thus, these magnetic blocking materials shield adjacent wire strands from the adverse effects of magnetic fields on the propagation of electrical power and/or electric signals.

Specifically, the present disclosure provides an antenna having a single coil structure in which a multitude inductor coils are electrically connected in series. Such a construction provides for an antenna having a compact design that enables adjustment or tuning of the inductance within the antenna which results in the ability to tune multiple antenna frequencies.

Figure 2:
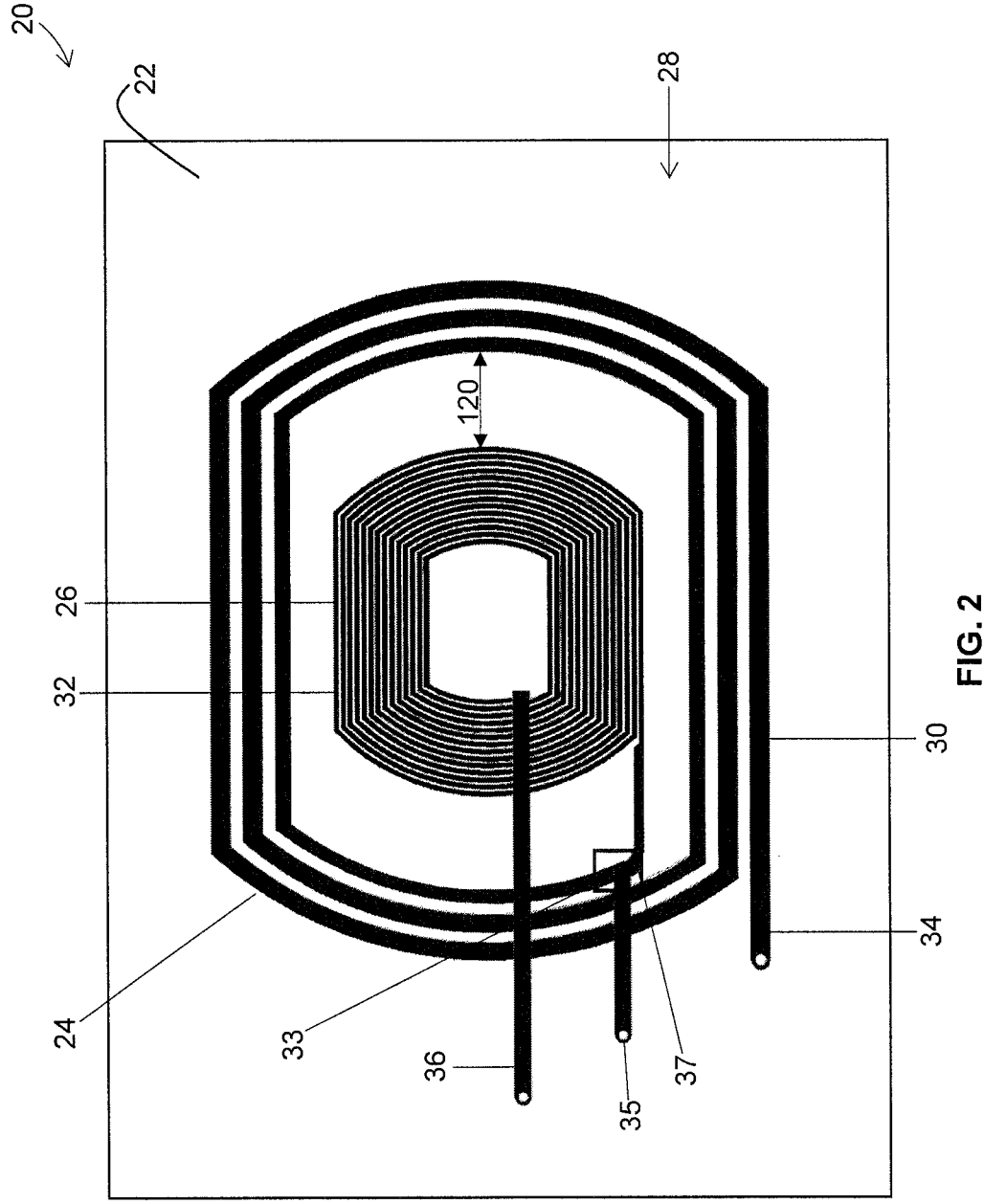
FIG. 2 shows an embodiment of a three terminal single structure multiple mode antenna of the present disclosure comprising a switch circuit.

Turning now to the drawings, FIGS. 2, 2A, 3, 3A, 3B, 3C, 3D, 3E, 4, 4A, 9 and 11 illustrate different embodiments and configurations of a single structure multi-mode antenna of the present disclosure. FIG. 2 illustrates an embodiment of a three-terminal antenna 20 of the present disclosure. As illustrated, the antenna 20 comprises a substrate 22 on which is positioned a first, outer coil 24 and a second, interior coil 26. More specifically, both the first and second coils 24, 26 are positioned on an external surface 28 of the substrate 22.

As shown, the first outer coil 24 comprises a first electrically conductive material 30 such as a trace or filar which is positioned in a curved orientation with respect to the surface 28 of the substrate 22. In a preferred embodiment, the trace or filar 30 is positioned in a spiral or serpentine orientation with respect to the surface 28 of the substrate 22 having "$N_1$" number of turns. The second interior coil 26 comprises a second electrically conductive material 32 such as a trace or filar positioned in a curved orientation with respect to the surface 28 of the substrate 22. In a preferred embodiment, the second trace or filar 32 is positioned in a spiral or serpentine orientation with respect to the surface 28 of the substrate 22 having "$N_2$" number of turns.

In a preferred embodiment as shown in FIG. 2, the second interior coil 26 is positioned within an inner perimeter formed by the first outer coil 24. As defined herein, a "turn" is a single complete circumferential revolution of the electrically conductive filar positioned on the surface of a substrate. As illustrated in the example antenna shown in FIG. 2, the first outer coil 24 comprises 3 turns ($N_1$) and the second interior coil 26 comprises 14 turns ($N_2$). In a preferred embodiment, the first outer coil 24 may comprise from about 1 to as many as 500 or more "$N_1$" turns and the second interior coil 26 may comprise from about 1 to as many as 1,000 or more "$N_2$" turns. In a preferred embodiment, the number of "$N_2$" turns is greater than the number of "$N_1$" turns. In addition, it is not necessary for the first and second coils 24, 26 to be constructed having a discrete number of turns, the coils 24, 26 may also be constructed having a partial turn or revolution such as a half or quarter of a complete turn.

In addition, the conductive filars 30 that form the first outer inductive coil 24 have a filar width that may range from about 0.01 mm to about 20 mm. In a preferred embodiment, the width of the outer inductor coil filars 30 is constant. However, the width of the first outer inductor conductive filars 30 may vary. The conductive filars 32 that form the second interior inductive coil 26 have a preferred width that ranges from about 0.01 mm to about 20 mm. The second conductive filar 32 may also be constructed having a constant or variable width. In a preferred embodiment, the first electrically conductive filars 30 that form the first outer inductor coil 24, have a width that is greater than the width of the second electrically conductive filars 32 that form the second interior inductor coil 26. However, it is contemplated that the width of the first conductive filars 30 may be about equal to or narrower than the width of the second electrically conductive filars 32 that form the second interior inductor coil 26.

In general, the first outer inductor coil 24 contributes to the reception and/or transmission of higher frequencies in the MHz range whereas, the second interior inductor coil 26 contributes to the reception and/or transmission of frequencies in the kHz range. The increased perimeter size and typically fewer number of filar turns that comprise the first outer inductor coil 24, generally create first coil inductances in the 4.2 µH range, which, thus, provides reception and/or transmission in the MHz operating frequency range. In contrast, the increased number of filar turns and smaller coil diameter of the second interior inductor coil 26 generally create inductances in the 8.2 µH range, which provides reception and/or transmission in the kHz operating frequency range. Furthermore, by electrically connecting at least the first and second inductor coils 24, 26 in series at different locations thereof, enables the single structure antenna of the present disclosure to operate at multiple frequencies while encompassing reduced surface area and a smaller foot print.

Specifically, the single structure antenna of the present disclosure comprises a plurality of terminal connections that are strategically positioned on the first and second inductor coils 24, 26, respectively. This unique antenna design provides for a variety of tunable inductances which, in turn, provides for a variety of selectively tunable operating frequencies. In a preferred embodiment, the single structure antenna can be designed so that it can operate at multiple frequencies and multiple frequency bands anywhere between about the 1 kHz range to about the 10 GHz range. The prior art two structure antenna 10 is not capable of operating at such multiple frequencies with such a reduced foot print size.

Figure 2A:
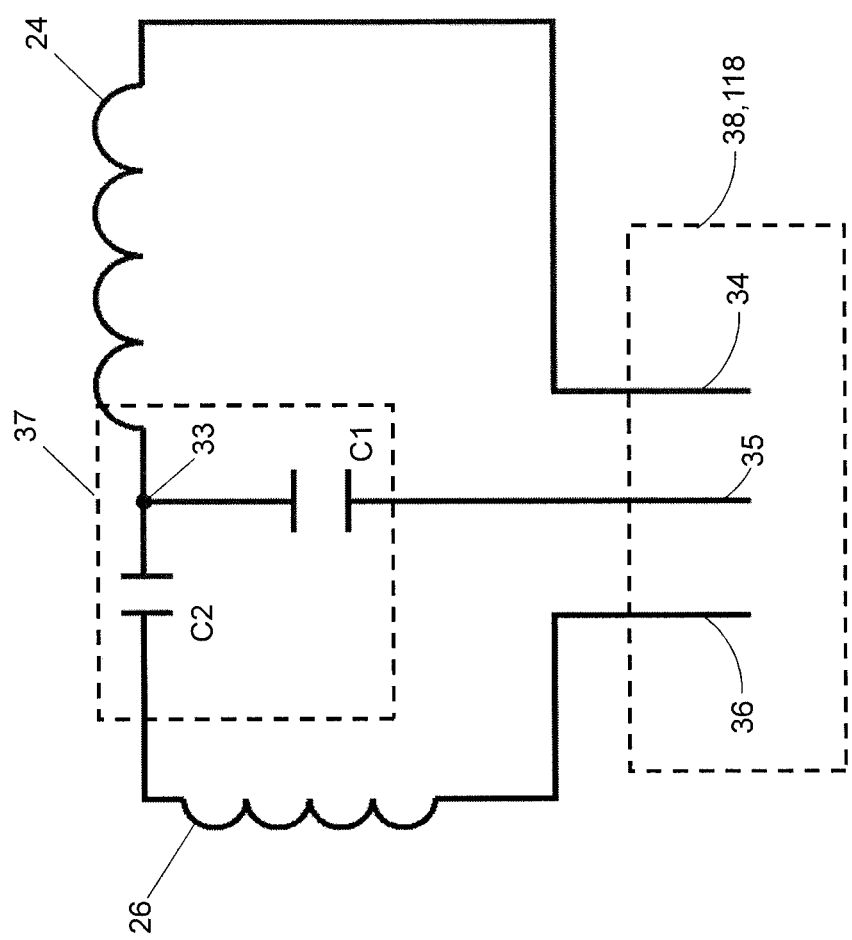
FIG. 2A is an electrical schematic diagram of the three terminal single structure multiple mode antenna illustrated in FIG. 2.

FIG. 2 illustrates an example of a three terminal single structure antenna 20 of the present disclosure. As shown in FIG. 2, the first outer coil 24 is electrically connected in series to the second interior coil 26. This electrical connection between the two coils 24, 26 combines the inductance contributions of both coils, and portions thereof, in a reduced foot print. FIG. 2A is an electrical schematic diagram of the antenna 20 shown in FIG. 2. As shown, the antenna 20 comprises three terminals, a first terminal 34 a second terminal 36, and a third terminal 35. As illustrated, the first terminal 34 is electrically connected to the first outer inductive coil 24, the second terminal 36 is electrically connected to the second interior inductive coil 26, and the third terminal 35 is electrically connected to a second end of the first outer coil 24. Alternatively, the antenna 20 may be constructed having the first terminal 34 electrically connected to the second inductive coil 26 and the second terminal 36 electrically connected to the first inductive coil 24.

In a preferred embodiment, the antenna 20 may be constructed with an electrical switch circuit 37 that enables selection of a desired inductance and operating frequency. More specifically, the electrical switch circuit 37 enables the detection and analysis of the electrical impedance of either or combination thereof of the first and second coils 24, 26. Therefore, based on the detection and analysis of the electrical impedance, an efficient selection of the antenna's operating frequency can be achieved based on an optimized or desired electrical impedance value. In addition, the selection of the terminal connections may be based on an optimized or desired inductance value at a desired operating frequency or frequencies.

As illustrated in FIG. 2A, the switch circuit 37 is electrically connected in series between the first and second coils 24, 26. In a preferred embodiment, the switch circuit 37 enables the selection of a connection between the first and second coils 24, 26, or alternatively, a selection of either of the first or second coils 24, 26 individually. The third terminal 35 is electrically connected at point 33 which is an electrical junction between the first and second coils 24, 26.

As previously mentioned, the electrical switch circuit 37 preferably comprises at least one capacitor $C_1$ having a first capacitance. The at least one capacitor $C_1$ is preferably electrically connected along the third terminal 35. In addition, the switch 37 may also comprise a second capacitor $C_2$ having a second capacitance. The second capacitor $C_2$ is preferably connected between point 33 and the second interior coil 26. Inclusion of the at least one capacitor $C_1$ enables the detection and analysis of the impedance of either or both coils 24, 26 at an operating frequency. In a preferred embodiment, the electrical impedance can be determined by the following equation: $X=2\pi fL$, where X is the electrical impedance of the antenna, f is the operating frequency of the antenna and L is the inductance of the antenna.

In a preferred embodiment, the substrate 22 is of a flexible form, capable of bending and mechanical flexure. The substrate 22 is preferably composed of an electrically insulating material. Examples of such insulative materials may include but are not limited to, a paper, a polymeric material such as polyimide, acrylic or Kapton, fiberglass, polyester, polyether imide, polytetrafluoroethylene, polyethylene, polyetheretherketone (PEEK), polyethylene napthalate, fluropolymers, copolymers, a ceramic material such as alumina, composites thereof, or a combination thereof. In some situations (e.g when the antenna is constructed using insulated wire such as magnet wire/litz wire or stamped metal), the substrate may be the shielding material.

In a preferred embodiment, at least one of the first, second and third terminals 34, 36, 35 of the antenna 20 are electrically connectable to an electronic device 38. The electrical device 38 may be used to modify and/or condition the electrical power, electrical voltage, electrical current or electronic data signal received or transmitted by the antenna 20. The electrical energy received by the antenna may be used to directly power the electronic device 38. Alternatively, the electrical device 38 may be used to transmit electrical power and/or a data signal thereof. The electronic device 38 may comprise, but is not limited to, a tuning or matching circuit (not shown), a rectifier (not shown), a voltage regulator (not shown), an electrical resistance load (not shown), an electrochemical cell (not shown) or combinations thereof.

Figure 3:
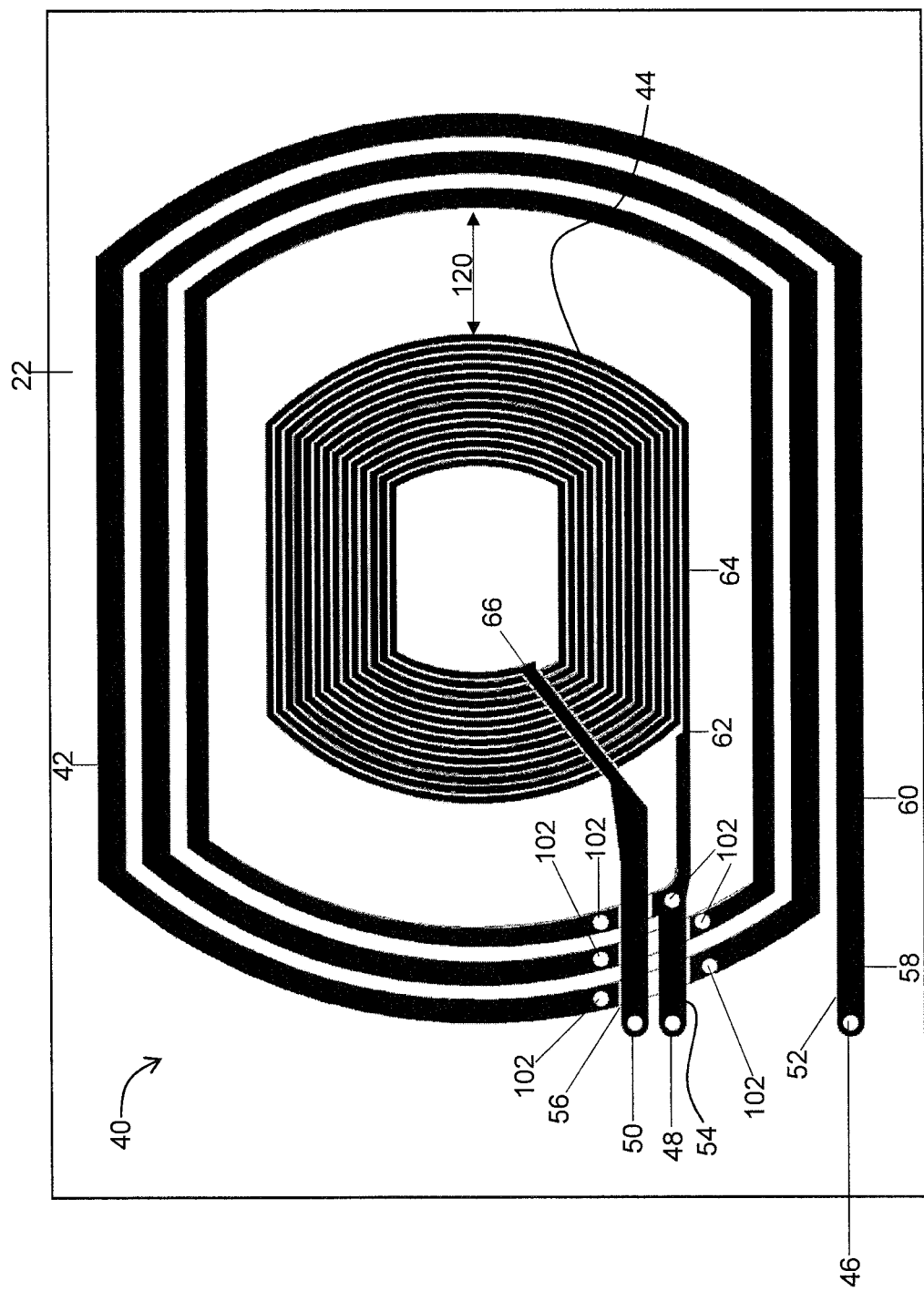
FIG. 3 illustrates an embodiment of a three terminal single structure multiple mode antenna of the present disclosure.

FIG. 3 illustrates an additional embodiment of a three terminal single structure antenna 40 of the present disclosure. Similar to the antenna 20 embodiment illustrated in FIG. 2, the three terminal antenna 40 comprises a first outer coil 42 that is electrically connected in series to a second interior coil 44. The electrical connection between the two coils 42, 44 combines the inductance contributions of each of the coils 42, 44 in a reduced size and surface area. The addition of a third terminal further enables the antenna 40 to be tuned to a specific frequency or multiple frequency bands. Thus, by providing multiple connection points within and between the outer and interior inductor coils 42, 44 the inductance, and thus, the receiving or transmitting frequency bands can be instantaneously adjusted without the need to add or remove inductors. The three terminal antenna design enables the first and second coils 42, 44 to be strategically connected at different locations along either or both the first and second coil 42, 44. As a result, the inductance of the antenna 40 can be modified, i.e., increased or decreased, without increasing the size of the footprint of the antenna. The antenna 40 of the present disclosure efficiently utilizes space and substrate surface area to increase and/or decrease inductance therewithin and, thus, custom tune the operating frequency or frequency band of the antenna 40.

The antenna 40 as shown in FIG. 3 comprises three terminals, a first terminal 46, a second terminal 48, and a third terminal 50, each having three respective terminal connections 52, 54, and 56. Each of the terminals is electrically connected at different terminal connection points of the antenna 40. As shown, the first terminal 46 extends from a first end 58 of a first trace 60 of the first outer coil 42. The second terminal 48 extends from a first end 62 of a second trace 64 of the second inductor 44. The third terminal 50 extends from a second end 66 of the second trace 64 of the second coil 44. Thus, the three terminals 46, 48, and 50 provide different connection points between the first and second inductor coils 42, 44 and portions thereof. Connecting the various terminals in different combinations thus provides the antenna 40 of the present disclosure with different adjustable inductances which, in turn, modifies the operating frequency or operating mode of the antenna 40. For example, by electrically connecting the first terminal 46 to the second terminal 48, a first inductance may be produced that is generally suitable for operation at a first operating frequency. Electrically connecting the first terminal 46 to the third terminal 50 produces a second inductance that is generally suitable for operation at a second operating frequency. Electrically connecting the second terminal 48 to the third terminal 50 produces a third inductance that is generally suitable for operation at a third operating frequency. Each of the inductances that are capable of being generated by the antenna of the present disclosure is preferably different from each other. Furthermore, it is contemplated that the antenna may be able to instantaneously switch from one inductance value to another, thereby instantaneously changing the antenna's operating frequency.

FIG. 3A illustrates an electrical schematic diagram of the three terminal antenna 40 illustrated in FIG. 3. As shown, connecting the first terminal 46 and the third terminal 50 provides a connection to the first outer inductor coil 42 having "$N_1$" number of turns. Connecting the second terminal 48 to the first terminal 46 provides a connection to the second interior inductor coil 44 having "$N_2$" number of turns. Lastly, establishing a connection between the second and third terminals 48, 50 provides an electrical series connection to both the first outer inductor coil 42 and the second interior inductor coil 44 having "$N_1$"+"$N_2$" turns. More specifically, FIG. 3A illustrates an embodiment in which the first inductor coil 42 is electrically connected in series with the second inductor coil 44. As shown, the first terminal 46 is electrically connected to the first end 58 of the first outer inductor coil 42. The second terminal 48 is electrically connected to the first end 62 of the second inductor coil 44 at an electrical junction 68 distal of the first inductor coil first end 58. As illustrated, the third terminal 50 is electrically connected to a second end 70 of the first inductor coil 42.

In a preferred embodiment, the three-terminal antenna design shown in FIGS. 3 and 3A enables the operation of the antenna in three different operation modes. As defined herein, an operation mode is an operating frequency band width. Such modes may include, but are not limited to the Qi, PMA and Rezence wireless standard frequencies. Table I shown below, details an example of the different terminal connection configurations and how they affect the operation mode of the antenna. More specifically, Table I illustrates various examples of how the operating frequency of the antenna may be changed by connecting various terminal connections together. It is noted that the operating frequencies detailed in Table I are examples and that the operating frequency bands may be custom tailored to meet specific requirements. Such customization can be achieved through designing each coil with a specific number of turns, a specific trace width, and terminal location points on each of the first and second coils.

TABLE I

| Mode | Operating Frequency | Terminal Connections |
|---|---|---|
| 1 | 100-250 kHz (Qi and/or PMA) | 1 and 2 |
| 1 | 6.78 MHz (A4WP) | 1 and 3 |
| 2 | 13.56 MHz (NFC/RFID/ Proprietary power and data) | 1 and 3 |
| 2 | 100-250 kHz (Qi and/or PMA) | 2 and 3 |
| 3 | 250-500 kHz (PMA and/or, proprietary power and data) | 2 and 3 |

While FIGS. 3 and 3A illustrate a specific example of connecting three terminals to the respective ends of the first and second inductor coils 42, 44, it is further contemplated that these connections may be positioned at various electrically conductive points along the first and second conductive traces 60, 64 of the first and second inductor coils 42, 44. In addition, it is contemplated that additional terminal connections may be positioned along the first and second 42, 44 inductor coils of the antenna 40, to further provide customized inductances and, thus, provide customized operating frequencies of the antenna 40. In general, establishing an electrical connection with an inductor coil or multiple inductor coils having an increased number of turns increases the inductance that results in an antenna that more suitable to receive or transmit lower frequency signals. Likewise, establishing an electrical connection with an inductor coil or multiple inductor coils having a decreased number of turns decreases the inductance and therefore results in an antenna that is more suitable to receive or transmit higher frequency signals.

Similar to the two terminal antenna illustrated in FIGS. 2 and 2A, the three terminal antenna may be electrically connected to an electrical device 38. The electrical device 38 may be designed to condition or modify electrical power and/or an electrical signal, such as a digital data signal. Alternatively, the electrical device 38 may directly receive or transmit the electrical power and/or data signal. The electronic device 38 may comprise, but is not limited to, a tuning or matching circuit (not shown), a rectifier (not shown), a voltage regulator (not shown), an electrical resistance load (not shown), an electrochemical cell (not shown) or combinations thereof. In addition to modifying or conditioning a received electrical voltage, electrical current, or digital signal, the electronic device 38 may also be used to modify or condition an electrical voltage, electrical current, or digital signal that is being transmitted by the antenna 40.

Figure 3B:
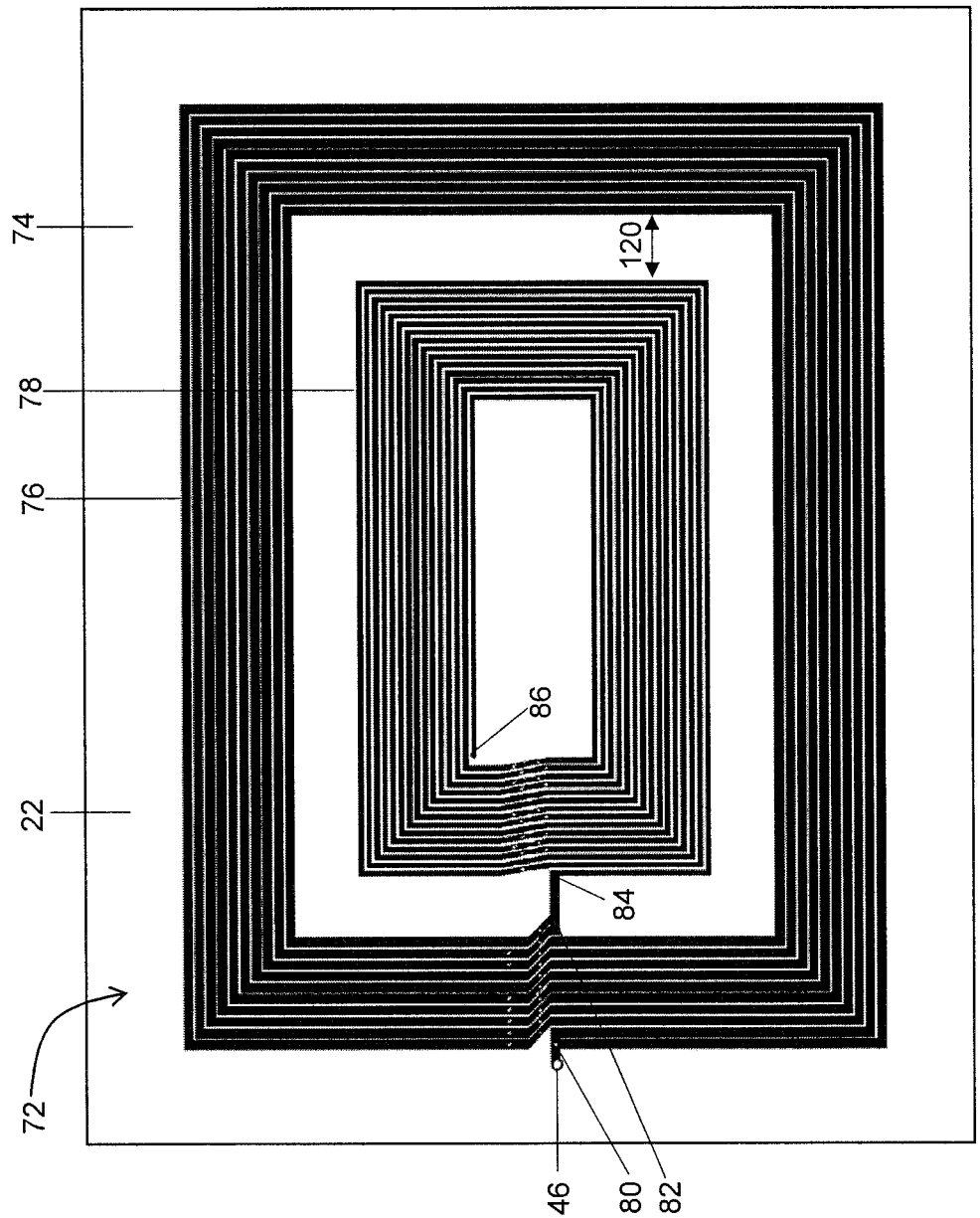
FIG. 3B is an embodiment of a first layer of a multi-layer single structure multiple mode antenna of the present disclosure.
Figure 3C:
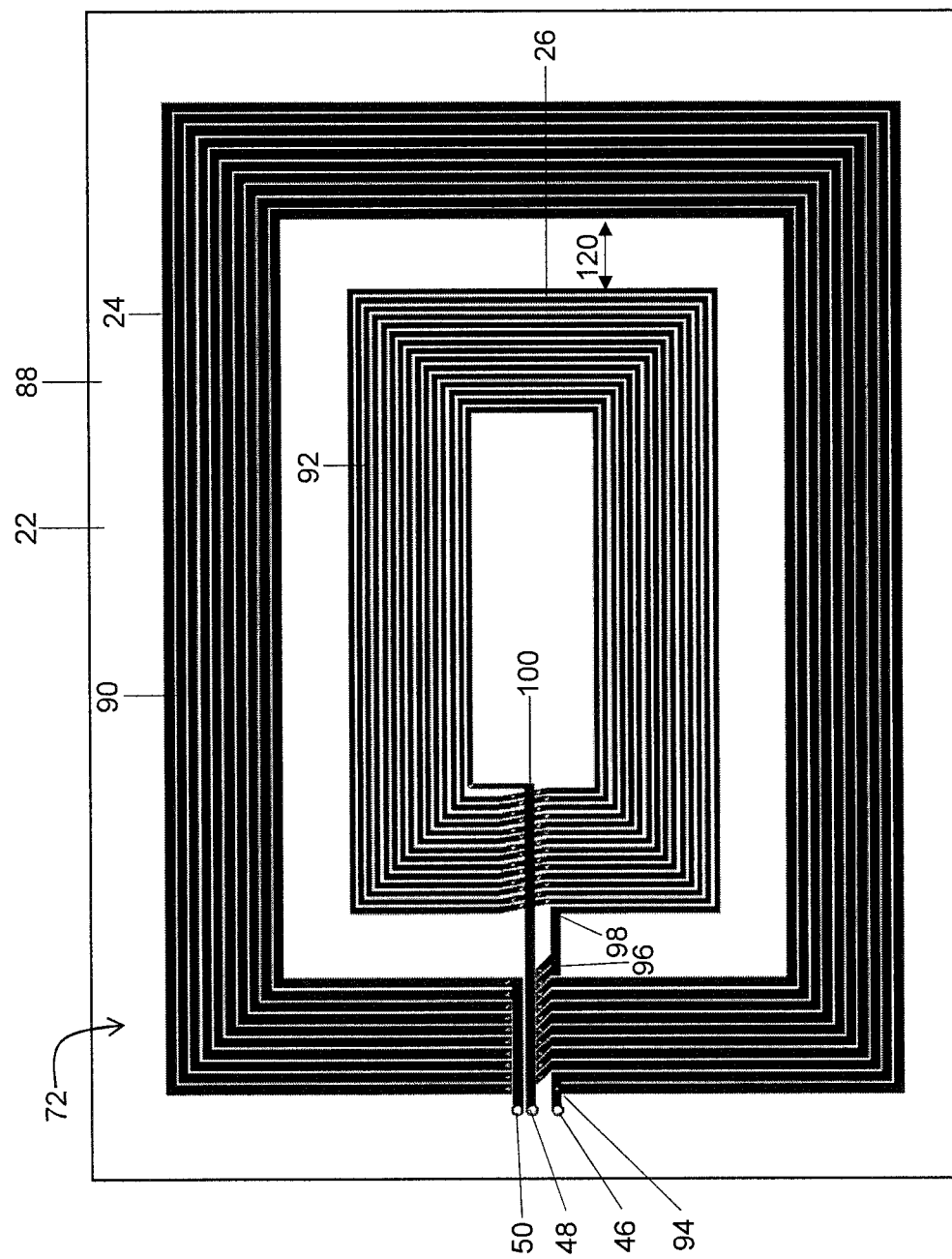
FIG. 3C is an embodiment of a second layer of a multi-layer single structure multiple mode antenna of the present disclosure.

FIGS. 3B and 3C illustrate an embodiment of a multiple layer three terminal antenna 72. In a preferred embodiment, the single structure antenna of the present disclosure may comprise a plurality of two or more substrate layers 22 that are positioned in a parallel orientation to each other. In addition, at least one electrically conductive trace is positioned along an exterior surface of the substrates that comprise the antenna 72. The filar or filars may be orientated such that at least one inductor coil is disposed along a top surface of one or more of the substrates. The substrates that comprise the antenna are preferably oriented in the same orientation such that the bottom surface of a first substrate is positioned above the top surface of a second substrate.

In addition, at least one via may be provided to establish an electrical connection between the various substrate layers. In a preferred embodiment, the at least one via provides an electrical connection between filars or portions of filars that comprise an inductor coil or coils at different substrate layers. As defined herein a "via" is an electrical connection between two or more substrate layers. A via may comprise a wire, an electrically filled through-bore or electrically conductive trace.

Specifically, FIGS. 3B and 3C illustrate the first and second layers, respectively of a two layer three terminal single structure antenna. FIG. 3B illustrates an embodiment of a first or lower layer 74 of the antenna 72 of the present disclosure. As shown, the first layer 74 comprises a first outer inductive coil 76 that is electrically connected in series to a second interior inductive coil 78.

In a preferred embodiment, as illustrated in FIG. 3B, the first terminal 46 is electrically connected in parallel to two traces or filars, thereby creating a bifilar connection 80 that comprises the first inductor coil 76. It is noted that two or more adjacent electrically conductive traces or filars that comprise an inductive coil may be connected in parallel. In general, connecting two or more adjacent traces or filars reduces electrical resistance, particularly the equivalent series resistance (ESR) of the antenna and as a result, improves the quality factor of the antenna.

As shown in FIG. 3B, the first inductor coil 76 is electrically connected in series to the second interior inductor coil 78 that is positioned within an inner perimeter formed by the first inductor coil 76. As shown, a second end 82 of the first inductor coil 76, located at an inner most end of the coil 76 is electrically connected to a first end 84 of the second inductor coil 78. The first end 84 of the interior inductor coil 78 is disposed at the end of an outer most filar track of the second inductor coil 78. The second inductor coil 78 terminates at a second inductor coil second end 86 which is disposed at an inner most location of the second inductor coil 78.

FIG. 3C illustrates an embodiment of a second upper substrate layer 88 of the antenna 72 of the present disclosure. The second layer 88 is preferably positioned directly above the first lower substrate 74. The second layer 88 comprises a third outer inductor coil 90 that is electrically connected in series to a fourth interior inductor coil 92. In a preferred embodiment, the respective first and third coils 76, 90 and the second and fourth coils 78, 92 of the first and second layers 74, 88 may be positioned about their respective substrates in a parallel relationship. In addition, the respective first and third coils 76, 90 and the second and fourth coils 78, 92 of the first and second layers 74, 88 may be in a similar position about their respective substrate surfaces and may comprise the same number of turns with similar trace widths. Alternatively, the respective first and third coils 76, 90 and the second and fourth coils 78, 92 of the first and second layers 74, 88 may be positioned at different locations relative to their specific substrate surfaces and they may have differing number of turns with differing trace widths.

Similar to the first layer 74, the first terminal 46 of the second layer 74 is electrically connected in parallel to two adjacently positioned traces or filars, thereby creating a bifilar connection at a first end 94 of the third inductor coil 90. This bifilar connection comprises the electrical trace pattern of the third inductor coil 90, extending around the third coil 90 and ending at a second end 96 thereof. Furthermore, the third inductor coil 90 is electrically connected in series to the fourth interior inductor coil 92 positioned within the inner perimeter of the third inductor coil 90 at a third inductor coil second end 96 which is disposed at an interior location of the third inductor coil 90. The fourth inductor coil 92 is electrically connected to the third inductor coil 90 at a first end 98 of the interior inductor coil which is disposed at an outer most filar track of the fourth inductor coil 92. In addition, as illustrated in FIG. 3C, the second upper layer 88 also comprises the second and third terminal connections 48, 50. In a preferred embodiment, the second terminal 48 is electrically connected at a second end 100 of the fourth inductor coil 92 positioned at an inner most location of the fourth coil 92. In addition, the length of the second terminal 48 is electrically isolated from each of the filar tracks that comprise the third and fourth inductor coils 90, 92. The third terminal 50 is provided on the second upper layer 88. As shown, the third terminal 50 is electrically connected to the bifilar track 94 that is disposed at the inner most location of the third outer inductor coil 90.

Furthermore, a via 102 or a plurality of vias 102, are preferably positioned between two or more substrate layers 74, 88 that comprise the single structure antenna 72 of the present disclosure. More preferably, the at least one via 102 provides a shunted electrical connection between different locations between the respective first and third inductor coils 76, 90 or the second and fourth inductor coils 78, 92 to minimize electrical resistance which may adversely affect electrical performance and quality factor.

In a preferred embodiment, a plurality of shunted via connections are positioned between the upper and lower layers to electrically isolate portions of the second and third terminals 48, 50, thereby enabling the terminals to "overpass" the conductive traces of the respective coils. More specifically, to create an "overpass" a plurality of vias 102 may be positioned on respective left and right sides of a trace 104 of the terminal. The plurality of vias 102 positioned on the respective left and right sides of the terminal line 104 of the terminal thus form electrical paths underneath the terminal trace 104, thereby electrically isolating the terminal trace 104 by "bypassing" the portion of conductive traces on which the terminal lead 104 is positioned. In addition, the plurality of shunted vias 102 may also create an electrical path that bypasses at least a portion of the terminal lead 104. In this embodiment, each of the plurality of vias 102 are positioned in opposition to each other on respective left and right sides of the terminal lead 104.

Figure 3D:
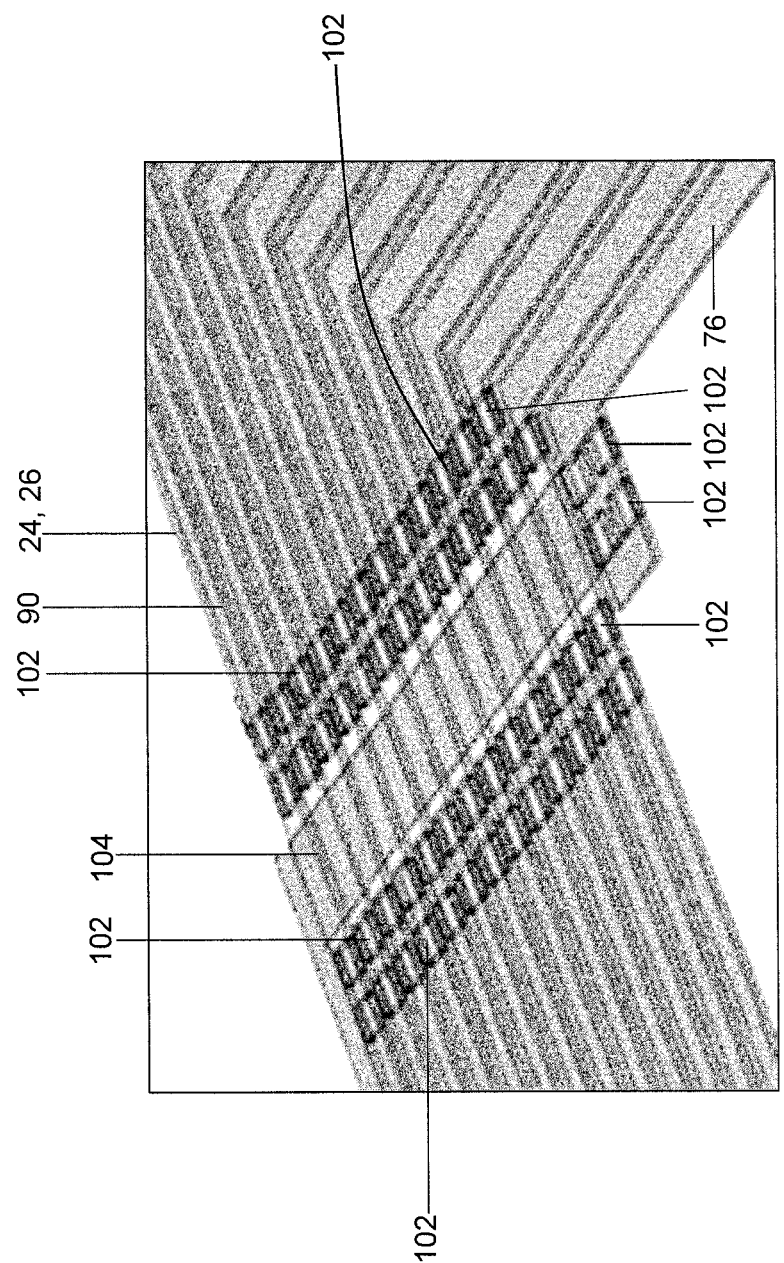
FIG. 3D illustrates a magnified view of a portion of an inductor coil having a plurality of shunted via connections.

FIG. 3D illustrates a magnified view of an example of a plurality of shunted via connections between a portion of the first inductor coil 76 that is disposed on the lower first substrate layer 74 and the third inductor coil 90 that is disposed on the upper second substrate layer 88. As shown, a plurality of via connections is shown between inductor coils that are disposed on the respective upper and lower substrate layers 74, 88. More specifically, as shown in the embodiment of FIG. 3D, there are four vias 102 positioned along each filar tracks besides each of the respective right and left sides of the terminal line 104. In a preferred embodiment, the via connections provide a shunted electrical connection that by passes under the terminal line 104. Thus by positioning a plurality of vias adjacent the respective sides of the terminal line 104, an electrical connection can be provided that bypasses the terminal line 104 of the terminal thereby keeping the terminal trace 104 electrically isolated from the conductive traces it passes through. Furthermore, by providing a plurality of vias 102 positioned along each of the filar tracks that comprise the inductor coil, various electrical connections can be made which can further tailor the inductance and resulting operating frequency of the single structure antenna of the present disclosure. For example, various electrically isolated terminal connections can be positioned throughout the inductor coils thus establishing further customized inductances and operating frequencies.

Figure 3E:
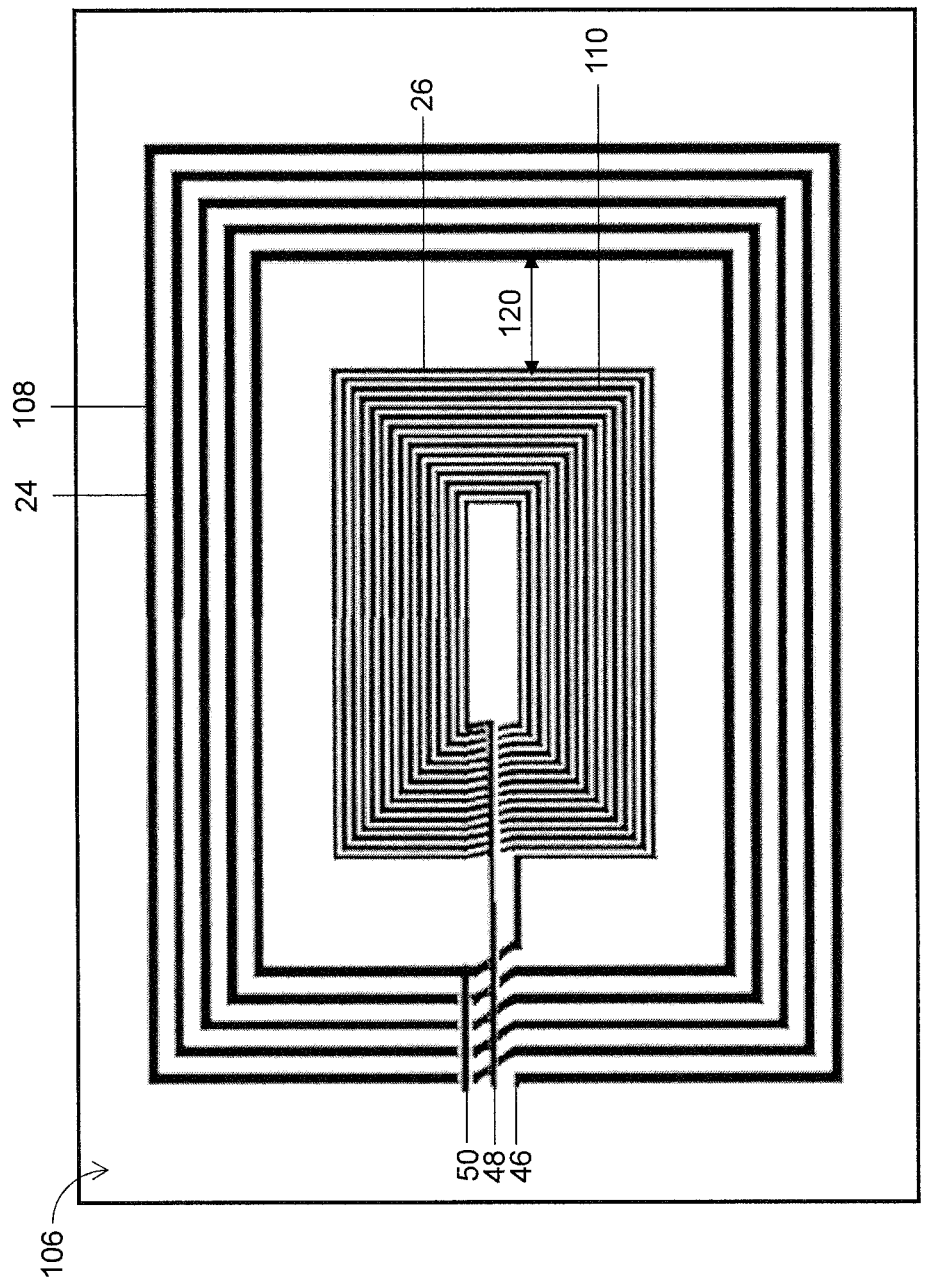
FIG. 3E is an embodiment of a three terminal single structure multiple mode antenna of the present disclosure in which the respective terminals are connected to a single filar.

FIG. 3E illustrates an alternative embodiment of a single structure antenna 106 in which respective first and second inductive coils 108, 110 comprise a single filar pattern. As shown the first, second and third terminals 46, 48, and 50 are respectively connected to a single filar that comprises the first and second inductor coils 108, 110. While it is preferred to connect the respective terminals to multiple filars, such as the first terminal connection shown in FIGS. 3B and 3C, to minimize electrical resistance, it may be necessary to provide an electrical connection to a single filar to achieve a desired inductance in a relatively small space and/or surface area. In general, having an electrical parallel connection to two or more adjacently positioned filars reduces electrical resistance which in turn increases the quality factor of the antenna.

Figure 3F:
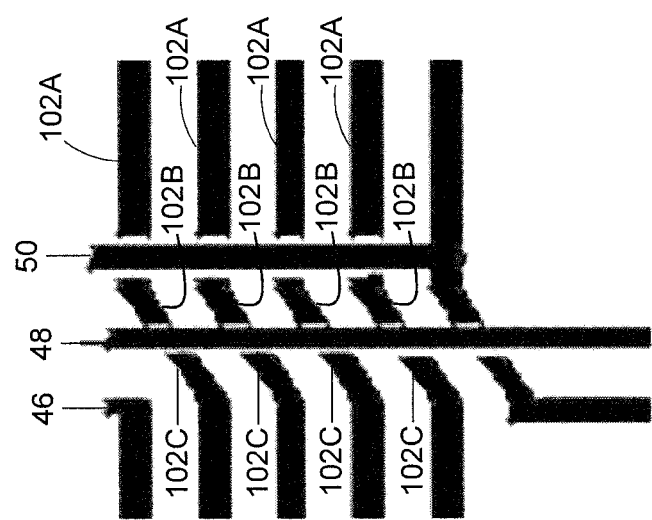
FIG. 3F is a magnified view showing an embodiment in which the filars of an inductor coil are electrically bypassing the terminal lines.

FIG. 3F illustrates a magnified view of the terminal connections illustrated in FIG. 3E. As shown, the terminal traces of the second and third terminals 48, 50 are electrically isolated as they effectively bypass over the electrically conductive the filar tracks that comprise the inductor coil. Via connections 103 provided on both sides of the respective terminal lines 104 provide an electrical connection that bypasses the terminal lines thereby electrically isolating the terminal lines from the filar lines of that comprise the inductor coil. As shown, a plurality of vias 102A are positioned on the right side of the terminal lead 104 of the third terminal 50, vias 102B are positioned to the left and right of the terminal traces 104 of respective third terminal 50 and second terminal 48 and vias 102C are positioned to the left of the terminal trace of the first terminal 48.

In addition to the two and three terminal antennas illustrated in the present application, it is further contemplated that a single structure antenna may comprise four or more terminal connections. FIG. 4 illustrates an electrical circuit diagram of an embodiment of a four terminal antenna 112 of the present disclosure. As illustrated, the first terminal 46 is electrically connected to the first end 58 of the first outer inductor coil 42. The second terminal 48 is electrically connected to the first end of the second inductor coil 44. The third terminal 50 is electrically connected to the second end 70 of the first inductor coil 42. In addition, a fourth terminal 114 is electrically connected to a second point 116 along the electrically conductive track of the first inductor coil 42. The fourth terminal connection effectively shortens the length of the first inductor coil 42 and/or the number of turns between electrical connections thereby providing an additional terminal connection which can be selected to adjust the inductance and operating frequency of the antenna.

Table II shown below, details the inductance and resulting operating frequency of an exemplar three and four terminal connection antennas illustrated in FIGS. 2, 2A, 3, 3A, 4 and 4B. It is noted that the inductance may be increased or decreased by modifying the number of turns of at least one of the first and second inductor coils.

TABLE II

| Antenna Config | Terminal Connection Config | $N_1$ | $N_2$ | Operating Frequency | Inductance (μH) | Quality Factor |
| --- | --- | --- | --- | --- | --- | --- |
| 4 Terminal | 1 and 2 | 3 | 0 | 6.78 MHz | 0.84 | >110 |
| 4 Terminal | 3 and 4 | 0 | 14 | 100-300 kHz | 6.7 | >20 |
| 3 Terminal | 1 and 2 | 3 | 14 | 6.78 MHz | 0.84 | >110 |
| 3 Terminal | 1 and 3 | 3 | 17 | 100-300 kHz | 7.5 | ~17.5 |
| 3 Terminal | 2 and 3 | 3 | 14 | 100-300 kHz | 6.7 | >20 |

As the table above illustrates, by establishing different electrical connection points along the coils that comprise the antenna, provides for a wide range of inductances, operating frequencies and frequency bands. As shown above, by increasing or decreasing the total number of turns, i.e. by selectively connecting different locations of the electrically connected the first and second inductor coils, and portions thereof affects the resultant inductance of the antenna.

In a preferred embodiment, the electrical or electronic device 38 may be a selection circuit 118 electrically connected to the single structure antenna of the present disclosure. Specifically, the selection circuit 118 is electrically connected to at least two of the terminals that comprise the antenna. The selection circuit 118 actively monitors and measures the electrical impedance at the respective antenna terminals and combinations thereof. Thus, when the electrical impedance is measured to be at, above, or below a certain threshold electrical impedance or band of electrical impedances, the selection circuit 118 is capable of connecting or disconnecting the various terminals that comprise the antenna to achieve a desired frequency band. In a preferred embodiment, the selection circuit 118 comprises at least one capacitor having a capacitance $C_3$. The capacitance of the selection circuit is selected to activate a switching mechanism between antenna terminals by providing a high impedance path or a low impedance path, depending on the frequency of operation. In addition, the selection circuit 118 may also be able to actively connect and/or disconnect various regions or specific locations along the inductance coils that comprise the single structure antenna. In an embodiment, the selection circuit 118 operates by selecting an inductor coil, portion of an inductor coil, or combinations thereof, having the lowest electrical impedance. Alternatively, the selection circuit 118 may be designed to actively switch between terminals at a specific electrical impedances or range of electrical impedances. For example, the selection circuit 118 may measure the electrical impedance at various terminal connections and determine that based on the value of the capacitance $C_3$ within the selection circuit 118 to connect terminals 1 and 3 instead of terminals 1 and 2 for example.

Consider, for example, a multi-mode antenna system wherein a first frequency mode is operating in the frequency range of $f_1+/-\Delta f_1$, and a second frequency mode is operating at $f_2+/-\Delta f_2$, wherein $f_1$ is the resonating frequency of the first outer inductor coil, $\Delta f_1$ is the bandwidth of the resonating frequency of the first outer inductor coil formed by the first terminal 46 and the third terminal 50 (FIG. 3E), $f_2$ is the resonating frequency of the second interior inductor coil, and $\Delta f_2$ is the bandwidth of the resonating frequency of the second interior inductor coil formed between the first and second terminals 46, 48 (FIG. 3E), provided the following conditions (A, B, and C) are true for the exemplar antenna. Example Conditions:

$$f_1 \geq 10 f_2, \quad \quad \text{A.}$$

$$\Delta f_2 \leq 0.5 f_2 \quad \quad \text{B.}$$

$$\Delta f_1 \leq f_1/50 \quad \quad \text{C.}$$

The selection circuit may be configured to select a desired antenna impedance $Z_2$, at a desired antenna operating frequency f. For example, given the parameter equations as shown below, where $C_3$ is the capacitance value of the selection circuit 118 for a desired antenna operating frequency, f (e.g. $f=f_1 \pm \Delta f_1$ or $f=f_2 \pm \Delta f_2$) and in which the impedance of the antenna is multiplied by a constant such as 1, 2, or 5. Thus, the selection circuit 118 can be designed such that the terminal connections are made at a certain impedance threshold value at a specific frequency or frequency band which may be determined by a multiplier constant.

$$\frac{1}{2\pi f C_3} < \text{Constant} \times |Z1 \text{ or } 2|$$

In general, the greater the difference in electrical impedance, the better discrimination in coil selection, thus the multiplier constant such be selected to create a discriminating electrical impedance that may be used to modify the operating frequency of the antenna. Thus, provided a capacitance value $C_3$, the selection circuit may choose between the lower of the electrical resistance of the first inductor coil $Z_1$ and the electrical resistance of the second inductor coil $Z_2$. In the example, if $$\frac{1}{2\pi f C_1}$$

is lower than $Z_2$, the selection circuit may actively choose the terminal connections for the first inductor coil. An exemplary situation is when the higher frequency range conforms to a single mode, the Rezence wireless charging standard operating at a frequency $f_1$ of about 6.78 MHz with a bandwidth of +/−15 kHz, while the lower frequency range conforms to two modes, i.e., the Qi standard operating between 100 kHz and 205 kHz and the PMA standard operating between 100 kHz and 350 kHz. In this case, if the first outer inductor coil is selected, then the antenna will actively receive or transmit in the Rezence mode at an operating frequency of about 6.78 MHz.

In addition to the number of turns and various lengths of the electrically conductive filars of the respective inductor coils that control the inductance and operating frequency of the antenna of the present disclosure, the quality factor of the single structure multiple mode antenna of the present disclosure can be significantly affected by the length and position of a gap 120 of space disposed between adjacent first and second inductor coils such as the first and second inductor coils 76, 78 and/or the third and fourth inductor coils 90, 92.

As will be described herein, the single structure multiple mode antenna 20, 40, 72, 106, 112 of the present disclosure is preferably designed with a high quality factor (QF) to achieve efficient reception/transfer of electrical power and/or an electrical data signal. In general, the quality factor of the antenna is increased by reducing the intrinsic resistive losses within the antenna, particularly at high operating frequencies of at least 300 kHz.

The quality factor is the ratio of energy stored by a device to the energy lost by the device. Thus, the QF of an antenna is the rate of energy loss relative to the stored energy of the antenna. A source device carrying a time-varying current, such as an antenna, possesses energy which may be divided into three components: 1) resistive energy ($W_{res}$), 2) radiative energy ($W_{rad}$), and 3) reactive energy ($W_{rea}$). In the case of antennas, energy stored is reactive energy and energy lost is resistive and radiative energies, wherein the antenna quality factor is represented by the equation $Q=W_{rea}/(W_{res}+W_{rad})$.

In near field communications, radiative and resistive energies are released by the device, in this case the antenna, to the surrounding environment. When energy must be transferred between devices having limited power stores, e.g., battery powered devices having size constraints, excessive power loss may significantly reduce the devices' performance effectiveness. As such, near-field communication devices are designed to minimize both resistive and radiative energies while maximizing reactive energy. In other words, near-field communications benefit from maximizing Q.

By example, the efficiency of energy and/or data transfer between devices in an inductively coupled system is based on the quality factor of the antenna in the transmitter ($Q_1$), the quality factor of the antenna in the receiver ($Q_2$), and the coupling coefficient between the two antennas (κ). The efficiency of the energy transfer varies according to the following relationship: eff∝κ$^2 Q_1 Q_2$. A higher quality factor indicates a lower rate of energy loss relative to the stored energy of the antenna. Conversely, a lower quality factor indicates a higher rate of energy loss relative to the stored energy of the antenna. The coupling coefficient (κ) expresses the degree of coupling that exists between two antennas.

Further, by example, the quality factor of an inductive antenna varies according to the following relationship:

$$Q = \frac{2\pi f L}{R}$$

where f is the frequency of operation, L is the inductance, and R is the total resistance (ohmic+rediative). As the quality factor is inversely proportional to the resistance, a higher resistance translates into a lower quality factor. Thus, the antenna of the present disclosure is designed to decrease the electrical resistance and, therefore, increase the quality factor.

Specifically, the single structure multiple mode antenna of the present disclosure is designed with a gap of space 120 positioned between adjacently positioned inductor coils such as the first and second inductor coils 24, 26. This gap 120 preferably reduces the proximity effect between adjacently positioned inner and outer coils, such as 76, 78 (FIG. 3B) and 90, 92 (FIG. 3C). As defined herein, "proximity effect" is the resultant increase in electrical resistance that occurs when two wires carrying alternating current, are positioned next to each other. More specifically, the proximity effect relates to the effect that one current carrying filament has on an adjacent current carrying filament when time-varying current is propagating through at least one of the conductive filaments. The magnetic field generated by one filament creates a field that opposes the current in the adjacent filament, thereby creating additional alternating current (AC) electrical resistance. This effect increases with frequency according to Faraday's law. In other words, when two electrically conductive wires are positioned next to each other, the magnetic field of one wire induces longitudinal eddy currents in the other adjacent wire. These eddy currents flow in long loops along the wire in the opposite direction as the main current. Thus, these eddy currents reinforce the main current on the side facing away from the first wire, and oppose the main current on the side facing the first wire. The net effect is a redistribution of the current in the cross section of the wire into a thin strip on the side facing away from the other wire. Since the current is concentrated into a smaller area of the wire, the resistance is increased.

The proximity effect has a significant effect on the quality factor of the antenna design. The applicants have discovered that the proximity effect can be greatly reduced by increasing the gap or distance 120 between the first outer and second interior inductor coils. However, increasing the gap 120 between these coils such that the proximity effect is negligible appreciably increases the foot print of the antenna which is not desired.

Therefore, a balance between the strength of the proximity effect and its effect on the quality factor and foot print size must be optimally achieved. In general, the applicants have discovered that by providing the gap 120 having a distance of about 0.2 mm reduces the magnetic field strength by about 50%, and designing the gap 120 with a distance of about 1 mm reduces the magnetic field strength by about 90%. It is contemplated that the gap 120 may range from about 0.05 mm to about 10 mm.

Another important consideration is the operating frequency of the antenna. In general, AC electrical resistance increases with increasing magnetic field strength. This increase in AC electrical resistance is about proportional to the magnetic field strength. This is due to the generally increased proximity effect at increased operating frequencies. In general, the increase in proximity effect can be mathematically represented by the strength of the magnetic field H of an adjacent filar multiplied by the operating frequency.

For example, to obtain a similarly equal reduction of proximity effect for a first antenna operating at 6.78 MHz in comparison to a second antenna operating at 200 kHz, the magnetic field strength generated by the first antenna is required to be reduced by about a factor of 34 (6.78 Mhz/200 kHz). Therefore, to obtain a similar reduction in AC electrical resistance due to the proximity effect, between the first antenna operating at 6.78 MHz and the second antenna operating at 200 kHz, would thus require a gap of about 0.2 mm between adjacent coil traces for the second antenna operating at 200 kHz, and a gap greater than 5 mm between adjacent coil traces for the first antenna operating at 6.78 MHz.

The applicants have thus discovered that designing the gap 120 having a dimension of 0.5 mm, or greater, between the first outer and second interior coils significantly reduces the proximity effect to a negligible amount for frequencies between about 100 to about 200 kHz. Furthermore, the applicants have discovered that designing the gap 120 having a distance of about 1 mm for frequencies between about 200 to about 400 kHz, or greater, is more preferred. In some cases, where the overall allowable surface area is large, for example, when the total number of turns of the first outer and second interior inductor coils is greater than 100 and the frequency is around 6.78 MHz to 13.56 MHz, this distance can be as great as 10 mm. In general, a gap distance 120 of about 10 mm effectively reduces the magnetic field strength and the proximity effect by about 99 percent.

Table III shown below, illustrates the effect of the gap size on the electrical resistance and resulting quality factor. Specifically, examples 1-4 are of a three terminal single structure multi-mode antenna having different gap sizes between the first outer and second interior coils. As illustrated in the table, increasing the size of the gap to about 1.8 mm, increases the quality factor by about 35% in comparison to a gap size of 0.2 mm of the antenna constructed in example 4. If a larger footprint is possible for the entire antenna structure, this gap size may be further increased greater than 5 mm which results in an increase in quality factor of about 42% in comparison to the example 4 antenna which constructed with a gap size of about 0.2 mm.

For example, a system with a coupling coefficient of about 0.05 for a system operating at 6.78 MHz, and using the same coil configuration for the respective receiving and transmitting antennas with a 1.8 mm gap will yield an antenna to antenna efficiency improvement of about 16%. In addition, using a gap size greater than 5 mm would yield an antenna to antenna efficiency improvement of about 18% given the equation below where K is the coupling coefficient between a transmitting and receiving antenna, $Q_1$ is the quality factor of the receiving antenna, and $Q_2$ is the quality factor of the transmitting antenna. As defined herein, "antenna to antenna efficiency" is the percentage of electrical energy received by a receiving antenna that was originally transmitted by a corresponding transmitting antenna.

$$Eff = \frac{\kappa^2 Q_1 Q_2}{\left(1 + \sqrt{1 + (\kappa^2 Q_1 Q_2)}\right)^2}$$

TABLE III

| Example | Gap Size | Freq. (MHz) | Inductance (μH) | Resistance (ohms) | Quality Factor |
|---|---|---|---|---|---|
| 1 | >5.0 mm | 6.78 | 3.1 | 1.30 | 101.6 |
| 2 | 1.8 mm | 6.78 | 3.1 | 1.37 | 96.4 |
| 3 | 1.0 mm | 6.78 | 3.1 | 1.57 | 84.1 |
| 4 | 0.2 mm | 6.78 | 3.1 | 1.85 | 71.4 |

It is important to note that the magnetic field strength is directly proportional to the strength of the electrical current being propagated through an adjacent filar. For example, given the same operating frequency, the strength of the proximity effect generated from a filar with 1 A of electrical current propagated therewithin is about 100 times greater than if the electrical current is at 10 mA.

Figure 5:
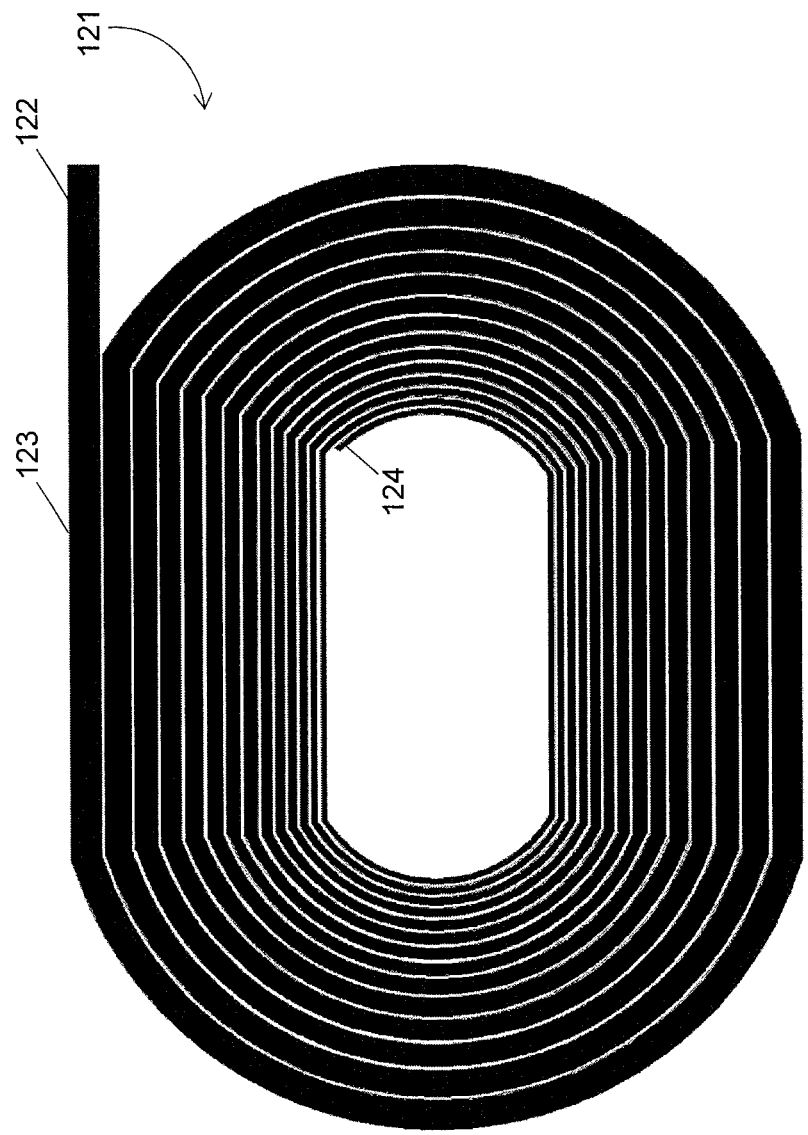
FIG. 5 shows an embodiment of a single structure multiple mode antenna of the present disclosure comprising a conductive filar with a variable width.

FIG. 5 illustrates an embodiment of an inductor coil 121 which comprises a conductive filar 123 having a variable filar width. As shown, at least one of the inductor coils that comprise an antenna may be constructed having a filar width that ranges from about 5 mm to about 0.01 mm, more preferably from 0.55 mm to about 0.2 mm. In the preferred embodiment shown, the inductor coil is constructed having an outer filar width at a first coil end 122 that ranges from about 10 mm to about 1 mm that progressively becomes narrow as the filar extends towards the center of the inductor 121. In a preferred embodiment, the filar width at the second end 124 may range from about 5 mm to about 0.01 mm. Such thinning of the filar width is desirous to provide an additional number of turns within a smaller surface area, thereby leading to an inductance value that is higher than what would have been achieved with wider traces for all turns. Furthermore, increasing the number of turns reduces the cross-sectional area of the filament utilized by the current due to the net proximity effects of the multitude of filaments. Therefore it is possible that a wide trace may have regions through which the current density is significantly reduced. By designing the coil in a manner of reducing the trace widths, the area utilization is maximized. Utilization of cross-sectional area is reduced due to proximity effect with increased frequency and a greater number of traces.

Constructing a coil with variable trace widths can significantly increase the inductance of the antenna. For example, two antennas having the same coil outer dimension of 34.5 mm×27 mm and an inner dimension of 15.4 mm×7.9 mm were constructed. The first antenna was constructed with 13 turns at a constant trace width of about 0.55 mm and a constant gap with between traces of about 0.2 mm. In comparison, the second antenna coil was constructed with 13 turns and a constant gap width of about 0.2 mm between adjacent traces of the coil. However, the second antenna was also constructed having a variable trace width that ranged from 0.55 mm to about 0.2 mm in the interior of the coil. The inductance of the antenna of design 1 having a constant trace width was measured to be about 4.2 µH. In contrast, the inductance of the antenna of design 2 with the variable trace width was measured to be about 8.2 µH, about double the inductance of the antenna of the first design with the same overall dimensions.

In a preferred embodiment, the quality factor may also be increased by incorporating various materials or structures that prevent or block the magnetic fields that cause the proximity effect that thus results in increased electrical resistance of adjoining conductive filars and ultimately results in a decreased quality factor. One such shielding material are ferrite materials which have a high permeability that effectively shields inductor coils from magnetic fields generated from an adjacent inductor coil or coils. Thus, by shielding the inductive coil from the magnetic field generated from another coil, reduces the proximity effect and, thus, increases the quality factor of the antenna.

The shielding material preferably has the primary function of providing a low reluctance path to magnetic field lines thereby reducing the interaction of the magnetic fields with other metallic objects, especially objects (e.g. batteries, circuit boards) placed behind the coil assembly. A second function of the shielding material is preferably to boost the inductance of the coil and, simultaneously, to increase the coupling between the transmitter coil assembly and the receiver coil assembly. The latter directly affects the efficiency of power transfer. The third ancillary benefit is that it may also improve the Quality Factor of the coil antenna if the loss tangent of the magnetic material is sufficiently small. As defined herein, "reluctance" is the resistance to a magnetic flux.

FIGS. 6A, 6B, 6C, 6D, and 6E are cross-sectional views illustrating various embodiments in which an inductor coil having an electrically conductive trace 30, 32 of a single structure multi-mode antenna of the present disclosure may be constructed using materials that shield the conductive traces, i.e., wires of the coils 24, 26 from magnetic fields. Such shielding materials may include, but are not limited to, zinc comprising ferrite materials such as manganese-zinc, nickel-zinc, copper-zinc, magnesium-zinc, and combinations thereof. These and other ferrite material formulations may be incorporated within a polymeric material matrix so as to form a flexible ferrite substrate. Examples of such materials may include but are not limited to, FFSR and FFSX series ferrite materials manufactured by Kitagawa Industries America, Inc. of San Jose Calif. and Flux Field Directional RFIC material, manufactured by 3M™ Corporation of Minneapolis Minn.

As shown in the various embodiments, three different such materials, a first material 126, a second material 128 and a third material 132, each having a different permeability, loss tangent, and/or magnetic flux saturation density may be used in the construction of the single structure antenna of the present disclosure. In a preferred embodiment, the first material 126 may comprise at least one of the FFSX series of ferrite materials having a permeability of about 100 to about 120 across a frequency range of at least 100 kHz to 7 MHz. The second material 128 may comprise the RFIC ferrite material having a permeability of about 40 to about 60, and the third material 130 may also comprise a ferrite material or combinations thereof, as previously mentioned. In a preferred embodiment, the first 126, second 128, or third 130 materials may comprise a permeability greater than 40. More preferably, the first 126, second 128, or third 130 materials may comprise a permeability greater than 100. The magnetic flux saturation density (Bsat) is at least 380 mT.

Figure 6A:
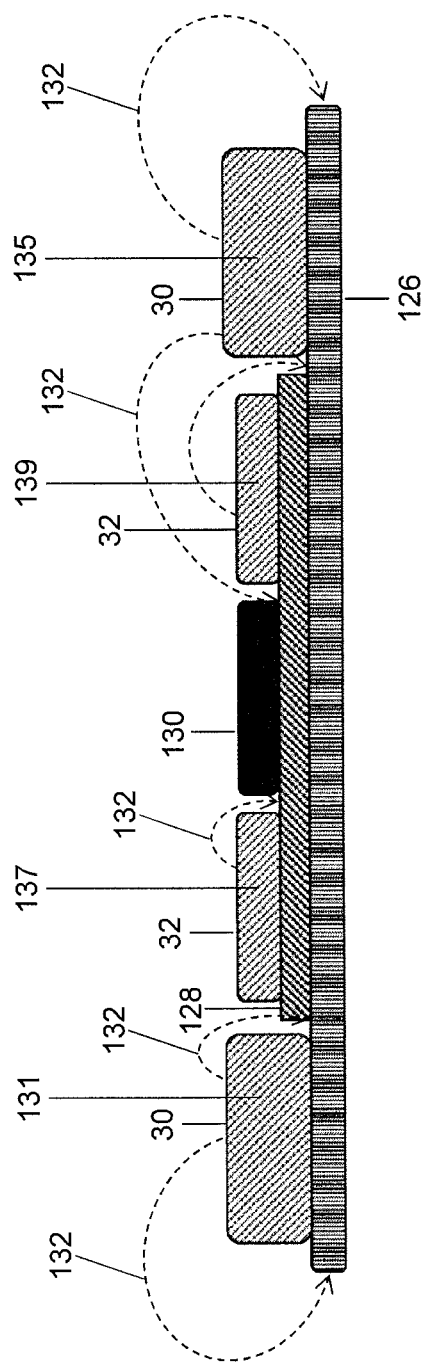
FIGS. 6A-6E illustrate cross-sectional views of different embodiments of the antenna of the present disclosure with different ferrite material shielding configurations.

FIG. 6A shows an embodiment in which the conductive segments 30, 32 are positioned directly on an exterior surface of the ferrite materials. As shown, the first and second ferrite materials 126, 128 serve as substrate layers on which the conductive traces 30, 32 are positioned. The third ferrite material 130 is preferably positioned within a central location between the coil winding. Note that each conductive segment 30, 32 could represent multiple traces of the coil turns. Specifically, as shown, first and second outer segments 131, 135 of the conductive traces 30, 32 are positioned directly on the surface of a first layer of the first ferrite material 126 and the third and fourth inner segments 137, 139 of the conductive trace 30, 32 are positioned directly on the surface of a second layer of the second ferrite material 128. The second layer of the second ferrite material 128 is positioned on top of the first layer of the first ferrite material 126. A third layer of the third ferrite material 130 is positioned directly on the second layer of the second ferrite material 128. In a preferred embodiment, the first, second and third layers of the different ferrite materials 126, 128, and 130 are positioned such that magnetic fields 132 generated by the conductive trace 30, 32 are absorbed by the ferrite materials. Furthermore, the selection of the ferrite material may be based on the material used to construct the conductive lines as well as the amount of the current or voltage flowing therethrough.

In a preferred embodiment, the various shielding materials and structures could be used to create a hybrid shielding embodiment. In a hybrid shielding embodiment, the various shielding materials are strategically positioned to improve the performance of the multiple inductor coils which resonate at differing frequencies. Thus, the shielding materials are positioned to enhance the multi-mode operation of the antenna 10. For example, utilizing a ferrite material having an increased permeability of about 100 to 120, such as the FFSX series material may be used to optimally shield a coil resonating at 6.78 MHz without degrading the performance of the other coil resonating at a lower frequency range of 100 kHz to about 500 kHz. Likewise, utilization of a ferrite material having a lower permeability such as from about 40 to about 60, like the RFIC material, is preferred because it enhances operation of a coil resonating in the lower kHz frequency region without degrading performance of the higher MHz resonating coil.

In addition to the specific shielding material, the positioning of the shielding material is also important to the optimal operation of the multi-mode single structure antenna of the present disclosure. For example with reference to FIGS. 6A through 6E, it may be preferred to position the higher permeability ferrite material near the higher resonating coil, such as the relative location of the first material 126 as shown in FIGS. 6A-6E. Similarly, it may be beneficial to position the lower permeability material near the coil that is resonating in the kHz range such as the location of the second material 128 The third material 130 could be a material that has similar material properties as the second material 128 or, alternatively, the third material 130 could be a ferrite material that has a high magnetic saturation that preserves the magnetic performance of the other materials in the presence of a transmitting that comprise a magnet; it also acts as an attractor to help affixing to transmitting coils that comprise a magnet.

Figure 6B:
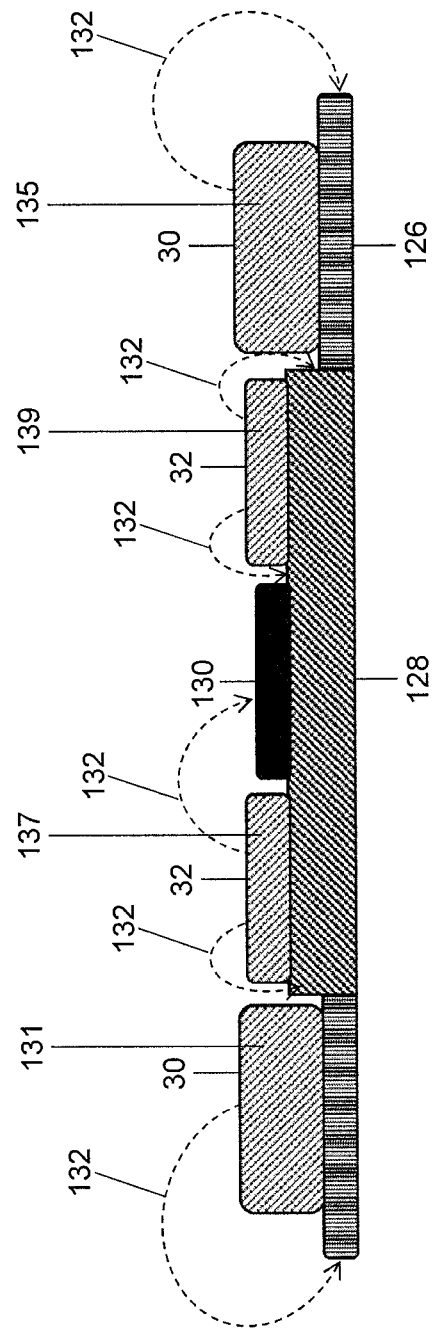

FIG. 6B illustrates a different embodiment of the construction of the antenna of the present disclosure in which the second ferrite material 128 is positioned within a cavity formed within the first material 126. In addition, the height of the second ferrite material layer 128 is greater than the height of the first layer of the first ferrite material 126.

Figure 6C:
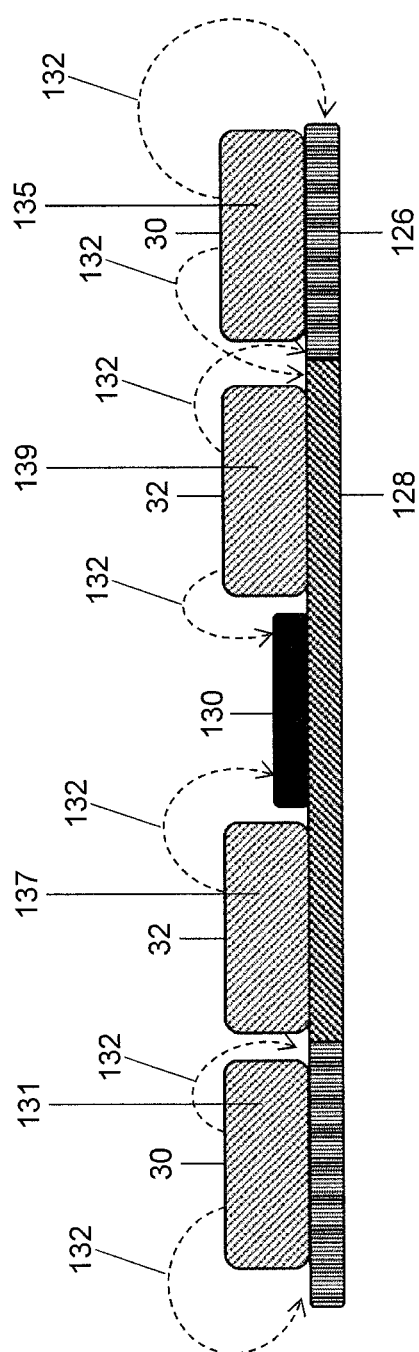
Figure 6D:
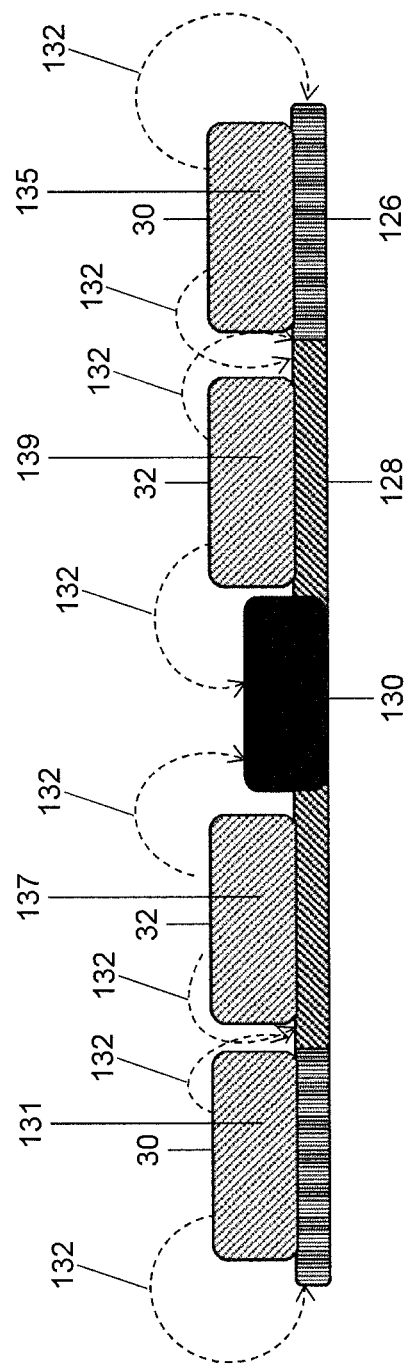
Figure 6E:
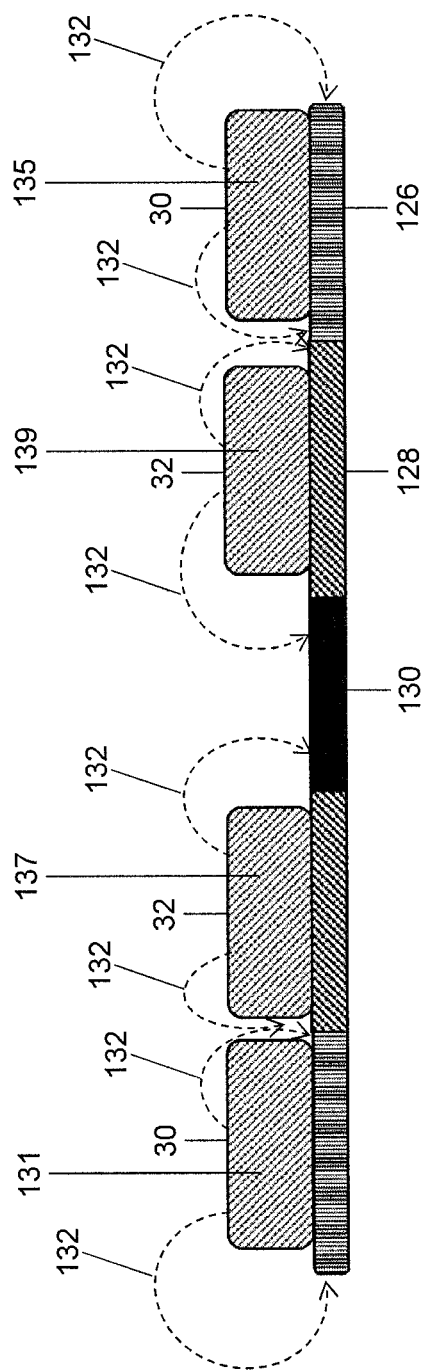

FIG. 6C illustrates another alternative embodiment in which the second ferrite material 128 is positioned within a cavity of the first ferrite material 126. However, in contrast to the embodiments shown ion FIGS. 6A and 6B, the height of the respective first and second ferrite material layers are about the same. FIG. 6D shows yet another embodiment in which the third ferrite material 130 may be positioned within a second cavity positioned within the second material layer 128. In addition, the second material 128 is positioned within the first cavity formed within the first layer of the first material 126. Lastly, FIG. 6E illustrates a fourth embodiment in which all three materials 126, 128 and 130 are positioned such that they are of about the same height. Specifically as shown, the third material 130 is positioned within the second cavity of the second material layer 128, the second material 128 is positioned within the first cavity of the first material layer 126 with all three material layers 126, 128, 130 being of about equal height. Therefore, the various layers of ferrite material may be positioned at different heights relative to each other such that magnetic fields 132 generated by adjacent conductive lines are optimally adsorbed by the ferrite materials.

In addition to utilizing three ferrite materials as previously discussed, it is contemplated that mixtures or compounds of various ferrite materials may be used to further custom tailor the desired permeability. Furthermore, the various layers may be composed of ferrite material mixtures and alloys. It is also noted that FIGS. 6A-6C represents specific embodiments in which ferrite materials may be positioned within the structure of the antenna of the present disclosure. It is contemplated that the various first, second, and third ferrite materials 126, 128, 130 can be interchangeably positioned throughout the structure of the antenna to custom tailor a desired response or create a specific magnetic field profile.

It will be appreciated that the multi-mode single structure antenna of the present application may be formed or made by any suitable techniques and with any suitable materials. For example, the antenna coils may comprise suitable metals or metal containing compounds and/or composites, conductive polymers, conductive inks, solders, wire, fiber, filaments, ribbon, layered metal combinations and combinations thereof be used as conductive materials. Suitable fabrication techniques may be used to place conductors on/in a substrate, including, but not limited to, printing techniques, photolithography techniques, chemical or laser etching techniques, laser cladding, laser cutting, physical or chemical vapor deposition, electrochemical deposition, molecular beam epitaxy, atomic layer deposition, stamping, chemical processing, and combinations thereof. It may also be suitable to fabricate the multi-mode single-structure antenna with wire-winding techniques leveraging magnet wires, coated wires, litz wires or other wires used by those skilled in the art. Electrical property enhancement, i.e., enhancement of electrical conductivity and substrate dielectric constant may also be used to achieve the desired properties for a specific application. For example, enhancement of electrical conductivity may be achieved through ion implantation, doping, furnace annealing, rapid thermal annealing, UV processing and combinations thereof.

Figure 7:
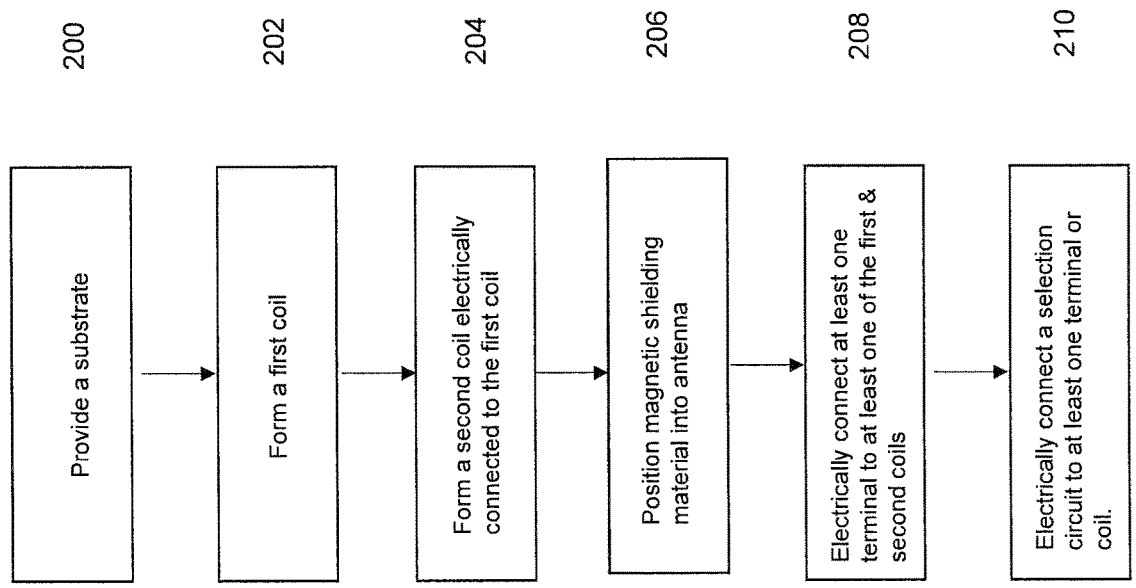
FIG. 7 is a flow diagram that illustrates an embodiment of a fabrication process of a single structure antenna of the present disclosure.

FIG. 7 illustrates a flow chart illustrating an embodiment of a method of fabricating a single structure multi-mode antenna of the present disclosure. As shown in the flow chart, in a first step 200 a substrate 22 may be provided. In a second step 202 the first coil 24 is formed. The first coil 24 may be formed on a surface 28 of a substrate 22 or alternatively, the first coil 24 may be formed without a substrate 22 using at least any of the fabrication techniques previously discussed. In a third step 204, the second coil 26 is formed such that is electrically connected to the first coil 24. Like the previous step 202, the second coil 26 may be formed on a surface 28 of the substrate 22 or alternatively, the second coil 26 may be formed without a substrate 22 using at least any of the fabrication techniques previously discussed. Alternatively, the first and second coils 24, 26 may be formed such that they are contactable to a surface 28 of a substrate 22. In this case, the first and second coils 24, 26 are removably contactable to the surface 28 of a substrate 22. For example, the substrate 22 may provide a temporary mechanical support for the antenna.

After the first and second coils 24, 26 have been formed, either with or without a substrate 22, at least one terminal is electrically connected to at least one of the first and second coils 24, 26 (step 206). In an optional fourth step 206, magnetic shielding materials may be incorporated within the structure of the antenna. In a fifth step 208, at least one terminal is electrically connected to at least one of the first and second coils 24, 26. In an optional sixth step 210, a selection circuit 118 may be electrically connected to at least one of the terminals or at least one of the first and second coils 24, 26. In addition, or in lieu of a selection circuit, an electrical switch 37 may be electrically connected to at least one of the first and second coils 24, 26 or at least one terminal.

Figure 8A:
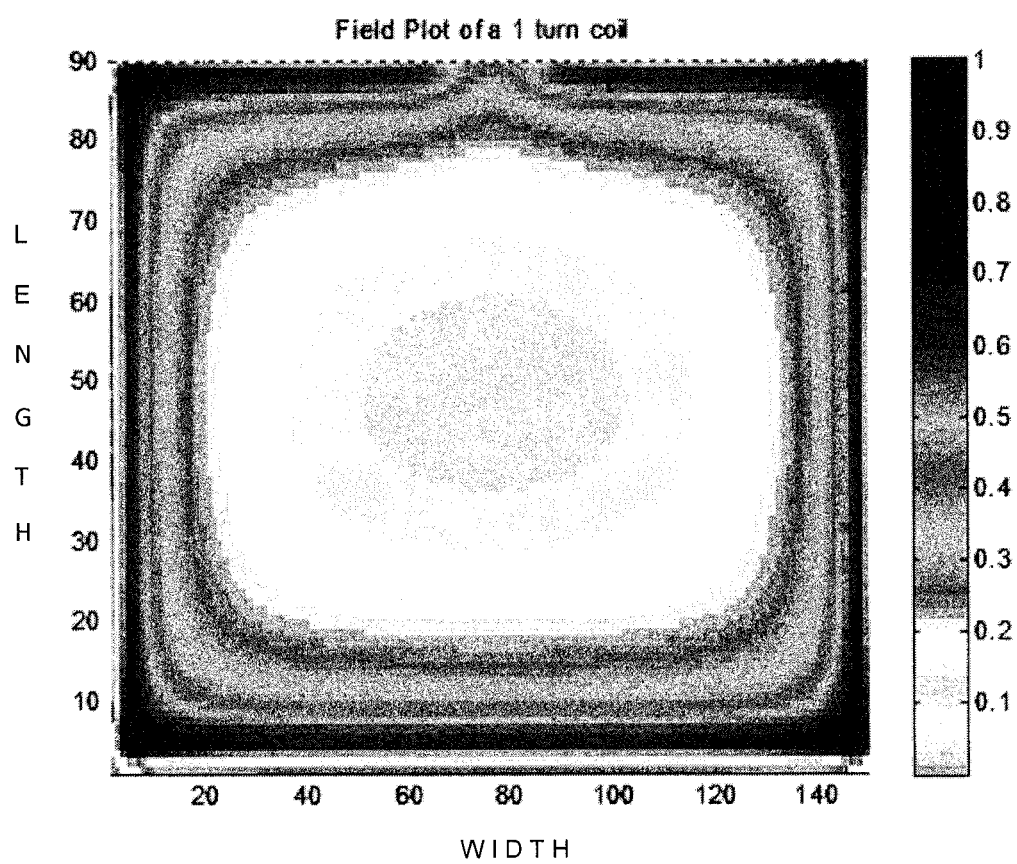
FIG. 8A illustrates an embodiment of the magnetic field strengths generated by a single turn coil antenna.
Figure 8B:
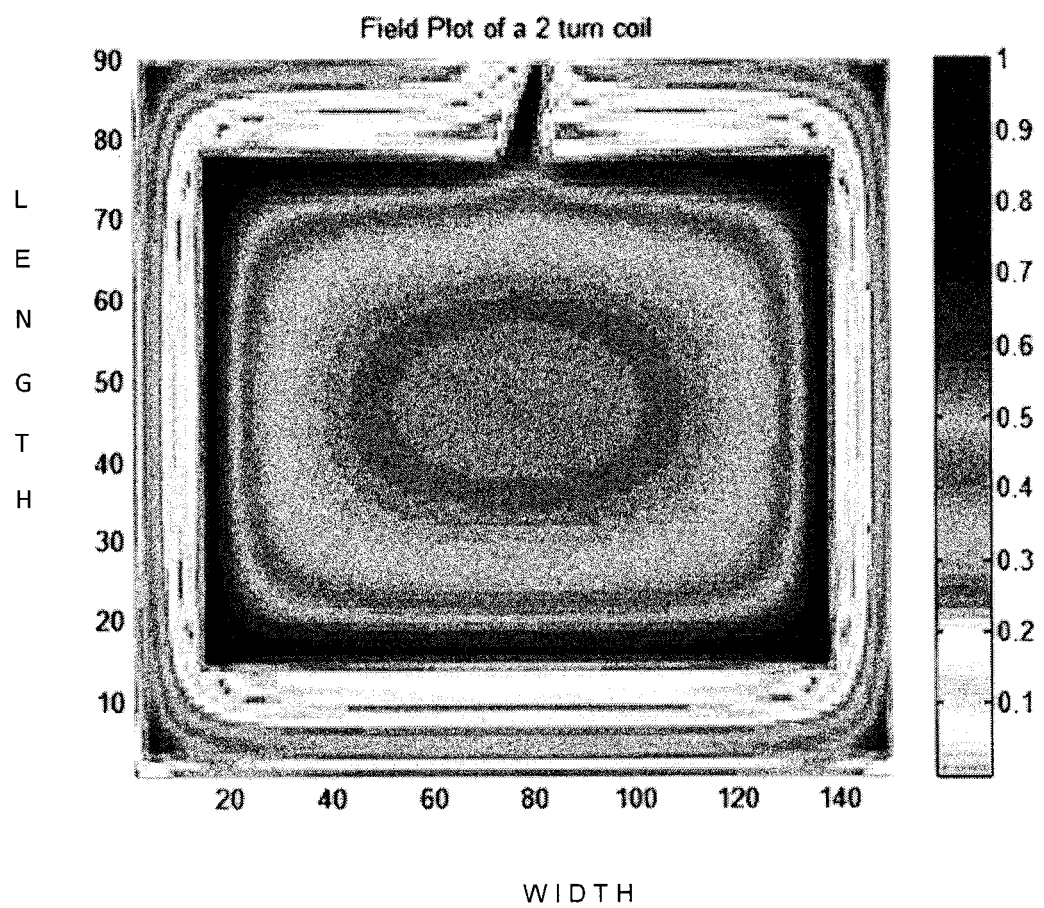
FIG. 8B illustrates an embodiment of the magnetic field strengths generated by a two turn coil antenna.
Figure 8C:
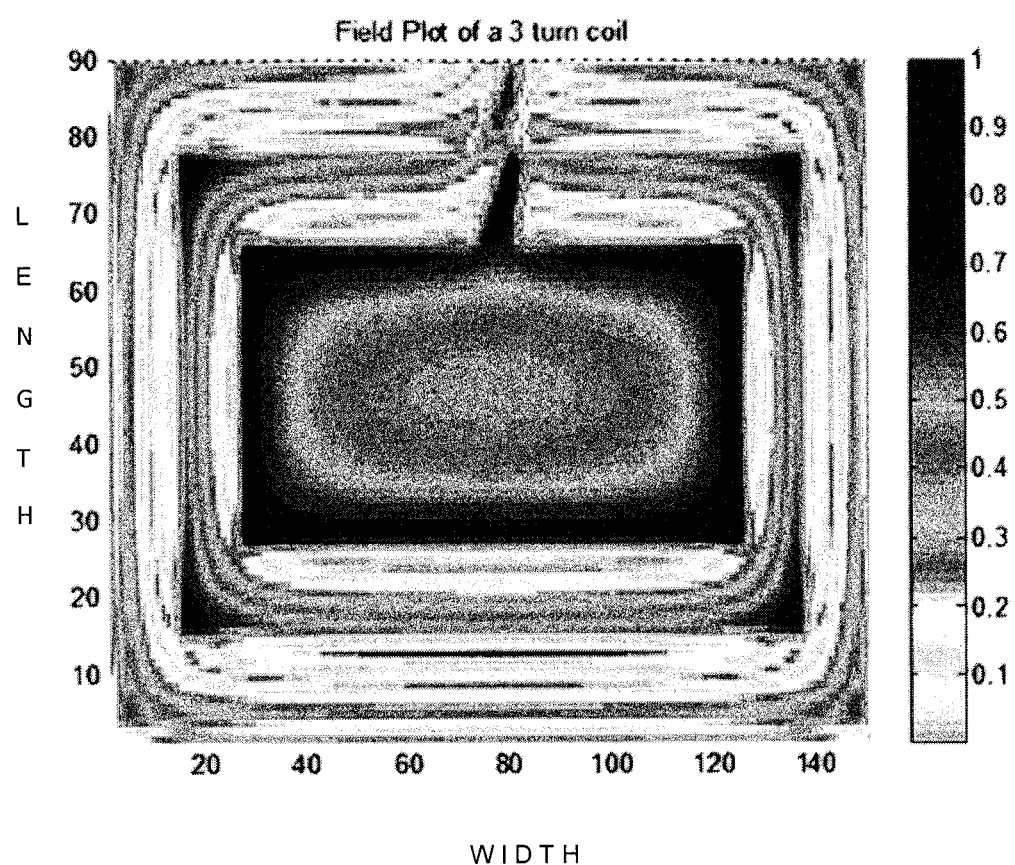
FIG. 8C illustrates an embodiment of the magnetic field strengths generated by a three turn coil antenna.

FIGS. 8A-8C illustrate various embodiments of magnetic field intensity profiles as a function of the number of turns that comprise the coil of the antenna of the present disclosure. As illustrated, in general, modifying the number of turns of the inductor affects the shape and profile of the intensity of the magnetic field. This ability to modify the position and/or strength of the magnetic field strength that is generated by the antenna can be desirable in optimizing data and energy transfer. In a preferred embodiment the strength and profile of the magnetic field can be custom tailored to meet the dimensions of various electronic devices. For example, by modifying the number of coils and/or position of magnetic shielding materials that comprise the single structure antenna of the present disclosure, the intensity profile of the magnetic fields that is generated by the antenna can be modified. It is noted that all the magnetic intensity profiles 8A-8C where taken of single structure antennas having an outer coil width dimension of about 150 mm and an outer coil length dimension of about 90 mm. In addition, the profile magnetic field measurements were taken from about 8 mm away from the outer surface of the respective antennas. A relative intensity scale lies along the right side of each of the plots FIGS. 8A-8C. As indicated by the intensity scale, the strongest magnetic field intensity has a relative intensity of about 1 and is graphically represented having the darkest shade of black. The weakest magnetic field strength has a relative intensity of about 0.1 and is shown having the lightest shade of grey.

FIG. 8A illustrates an embodiment of a magnetic field intensity profile taken of a single structure antenna comprising one outer coil having one turn. The magnetic field intensity is greatest along the outer perimeter of the coil as illustrated by the darker shades of black which represent the strongest magnetic field intensity. While the strongest magnetic field intensities are along the outer perimeter, the weakest magnetic field intensity, represented by the lighter shade of grey, lies in the central area formed within the perimeter of the coil. Thus, this embodiment is optimally configured for wireless energy transfer along the outer perimeter of the antenna.

FIG. 8B illustrates an embodiment of a magnetic field intensity profile taken of a single structure antenna comprising a coil having two turns. As shown, the greatest magnetic field intensity lies more along an inner portion of the coil as compared to the field magnetic field intensity profile of a coil having one turn as shown in FIG. 8A. The weakest field intensities of the two turn coil, shown by the lighter shade of grey, lie along the outer perimeter of the second turn of the coil which is positioned towards the interior of the antenna. In comparison to the coil having one turn as illustrated in FIG. 8A, the magnetic field along the central area of the antenna comprising a coil having two turns has an overall increased magnetic field. Thus, as shown, adding an additional interior turn moves the greatest field intensities closer to the middle of the antenna.

FIG. 8C illustrates an embodiment of a magnetic field intensity profile taken of a single structure antenna comprising a coil having three turns, a first outer turn, a second inner turn and a third inner most turn. Similar to the antenna comprising a coil with two turn, the magnetic field intensity of the three turn coil antenna shown in FIG. 8C is the strongest, along the inner perimeter of the third innermost coil and central area of the antenna. Thus, the antenna comprising a coil having three turns has the strongest magnetic field in general in the central area of the antenna. In addition, the respective corner locations of the second inner turn of the coil also has increased magnetic field intensity. Therefore, such an antenna with a three turn coil is optimally designed to transfer electrical power and data in the central area of the antenna.

Figure 9:
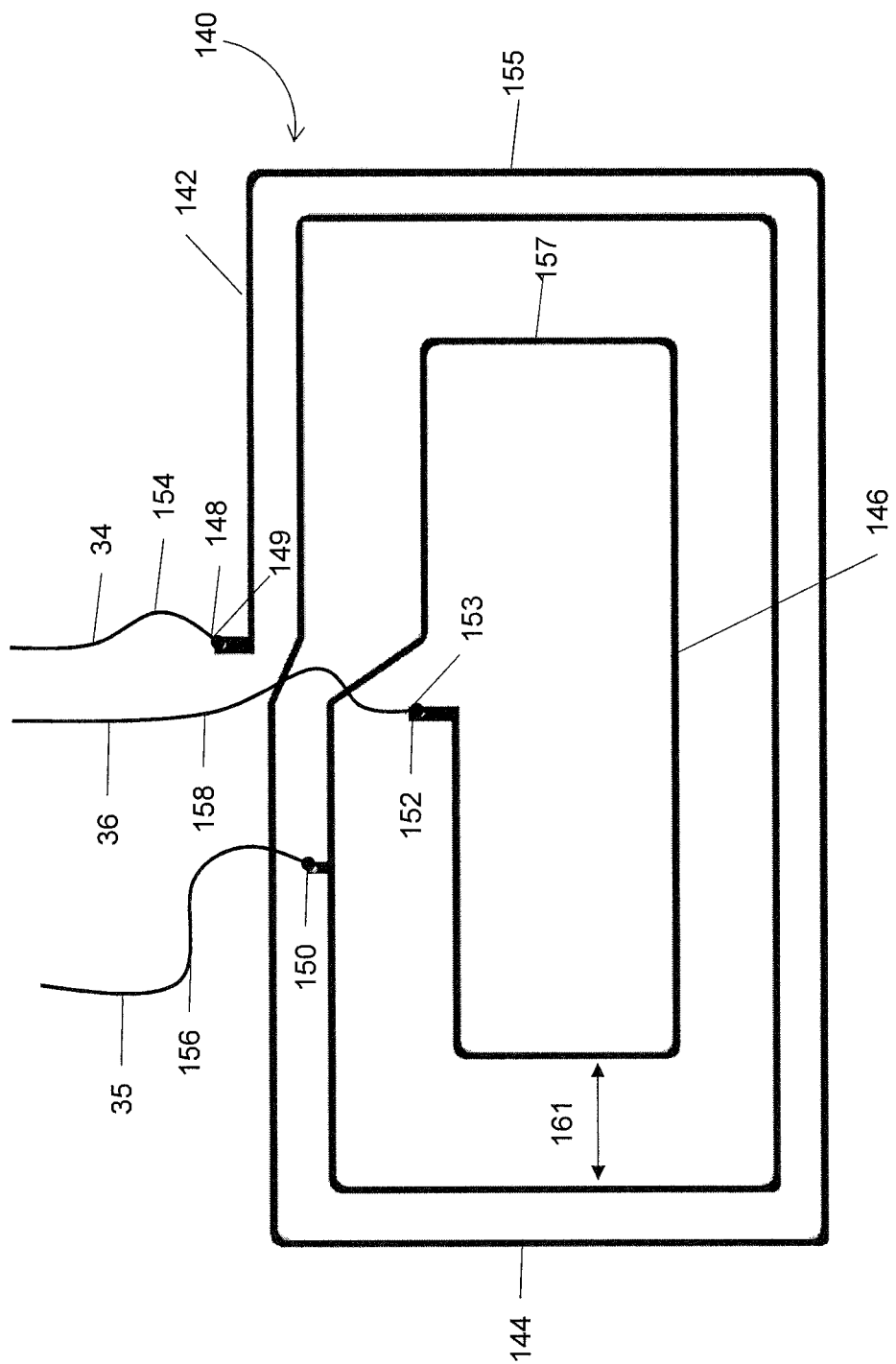
FIG. 9 shows an embodiment of a two coil antenna fabricated from a metal stamping process.

FIG. 9 illustrates a further embodiment of an antenna 140 of the present disclosure of a one piece construction having a unitary antenna body. As illustrated, the antenna 140 is preferably formed from one piece of wire or filament 142 that is formed into the shape of the unitary body antenna 140 extending from a first wire end 149 to a second wire end 153. In a preferred embodiment, the antenna 140 may be formed by a stamping process in which the electrically conductive material is formed together in a mold and die stamp forming process using a metal blank. In a preferred embodiment, the metal blank is positioned between the mold and die. The die is pressed against the metal blank within the mold thus forming the antenna body 140. In addition, the electrically conductive material that forms the unitary antenna body may be a metal bar, wire, or filament that is stamped out of a sheet of metal. Alternatively, antenna 140 may be formed by a wound wire process whereby the unitary body of the antenna 140 is formed from a single wire that is curved or wound into the desired shape of the antenna 140 comprising a plurality of turns.

The antenna 140 is preferably formed of a continuous wire form having multiple electrical connection points 148, 150, 152 that are disposed along various portions of the wire 142 of the antenna 140. The plurality of electrical connection points 148, 150, 152 or electrical "taps" create multiple inductor coils having different inductances that comprise the antenna 140 of the present disclosure.

As illustrated in FIG. 9, a first electrical connection point 148 that is disposed at the first end 149 of the wire 142 of the antenna 140 serves as the common electrical connection. A second electrical connection point 150 is positioned along the third turn of the antenna 140 serves as the "low" inductance electrical connection. A third electrical connection point 152 is disposed at the second end 153 of the antenna 140 serves as the "high" inductance electrical connection of the antenna 140. In an embodiment, terminal leads 154, 156, 158, such as electrically conductive wires, may be attached to these electrical connection points to create antenna terminals. Thus, as shown, the first electrical connection point 148 may serve as the first terminal 34, the third electrical connection point 152 may serve as the second terminal 36 and the second electrical connection point 150 may serve as the third terminal 35. Furthermore, the various first, second and third electrical connection points 148, 150, 152 form the multiple inductor coils of the antenna 140. As illustrated, a first outer inductor coil portion 144 having $N_1$ number of turns is disposed between the first and second electrical connection points 148, 150 and a second inductor coil portion 146 having $N_2$ number of turns is disposed between the second and third electrical connection points 150, 152. Similar to the previous single structure antenna embodiments, the unitary body antenna 140 may comprises more than three terminal connections which can be electrically connected to generate a multitude of operating frequencies and/or inductances. In addition, a turn gap 161 may be positioned between adjacent turns of the first and second inductor coils portions 144, 146. Specifically, the turn gap 161 is a space disposed between adjacent wires 142 of the antenna 140. In a preferred embodiment, the turn gap 161 may extend from about 0.1 mm to about 50 mm.

Preferably, the unitary body antenna 140 illustrated in FIG. 9 is self-standing and does not require the support of a substrate. However, it is contemplated that such an antenna structure may be contactable to a substrate surface. Substrates may include, but are not limited to, a dielectric material and/or a magnetic field blocking material such as a ferrite material as previously discussed. In addition, such an antenna construct may be incorporated within an article of clothing, furniture, an electrical appliance or a vehicle.

Figure 10:
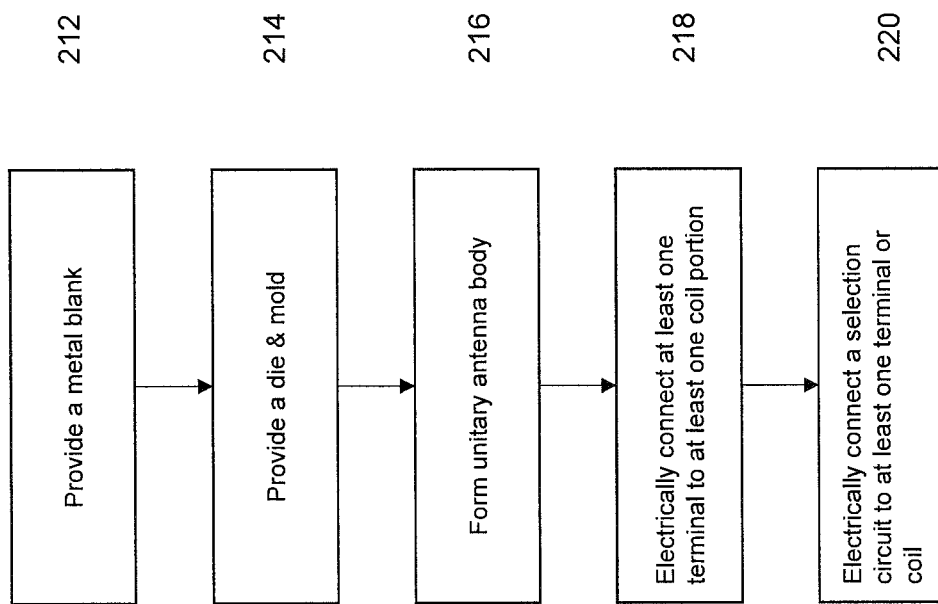
FIG. 10 is a flow chart that illustrates an embodiment of a fabrication process of a single structure antenna of the present disclosure having a unitary body structure.

FIG. 10 is a flow chart that illustrates an embodiment of method of fabricating the single structure multi-mode antenna 140 having a unitary antenna body. As shown in the flow chart, in a first step 212, a metal blank is provided. In a second step 214, a die and mold that are used to form the metal blank into the form of the antenna 140 are provided. In a third step 216, the die is used to form the blank metal into the form of the unitary body antenna 140. In a fourth step 218, at least one terminal is electrically connected to at least one of the first and second coil portions 144, 146. In an optional fifth step 220, a selection circuit 118 may be electrically connected to at least one of the terminals or at least one of the first and second coil portions 144, 146. In addition, or in lieu of a selection circuit 118, an electrical switch 37 may be electrically connected to at least one of the first and second coil portions 144, 146 or at least one terminal.

Figure 11:
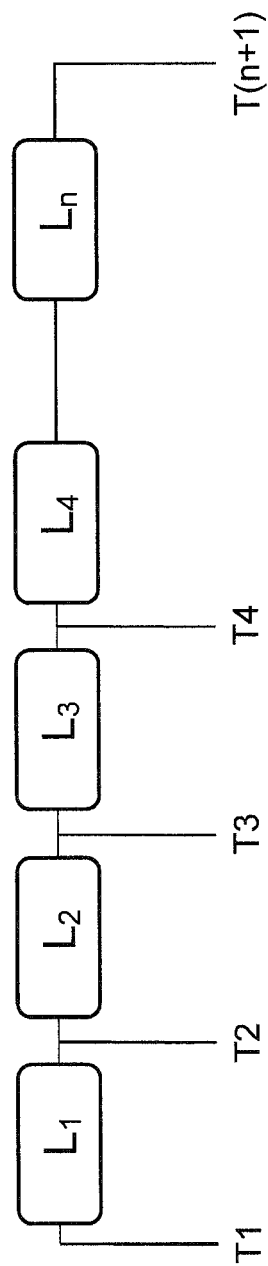
FIG. 11 shows a theoretical embodiment of a single structure antenna of the present disclosure comprising n+1 number of terminals.

It is further contemplated that the various embodiments of the single structure antenna of the present disclosure may comprise a plurality of terminals greater than three. FIG. 11 illustrates a theoretical example in which a single structure antenna of the present disclosure may comprise a plurality of n+1 number of terminal connections. As shown, the antenna of the present disclosure may comprise three, four, five or more terminal connections which can be electrically connected to generate an infinite number of operating frequency bands and/or inductances.

FIG. 11 illustrates a theoretical example of a single structure antenna of the present disclosure that comprises an indefinite number of inductors, Ln in which each of the multitude of inductors may have a different inductance. Furthermore, as illustrated, the respective inductors, $L_1$ through $L_n$ preferably comprise a terminal connection $T_1$ through $T_{(n+1)}$ or electrical "tap" that is electrically connected to at least a portion of the respective inductor coil. Therefore, it is possible to create a single structure antenna that may be selectively tuned to exhibit an unlimited number of frequencies and/or inductances such that the antenna of the present disclosure can be tuned to an exact frequency or frequencies.

Figure 12A:
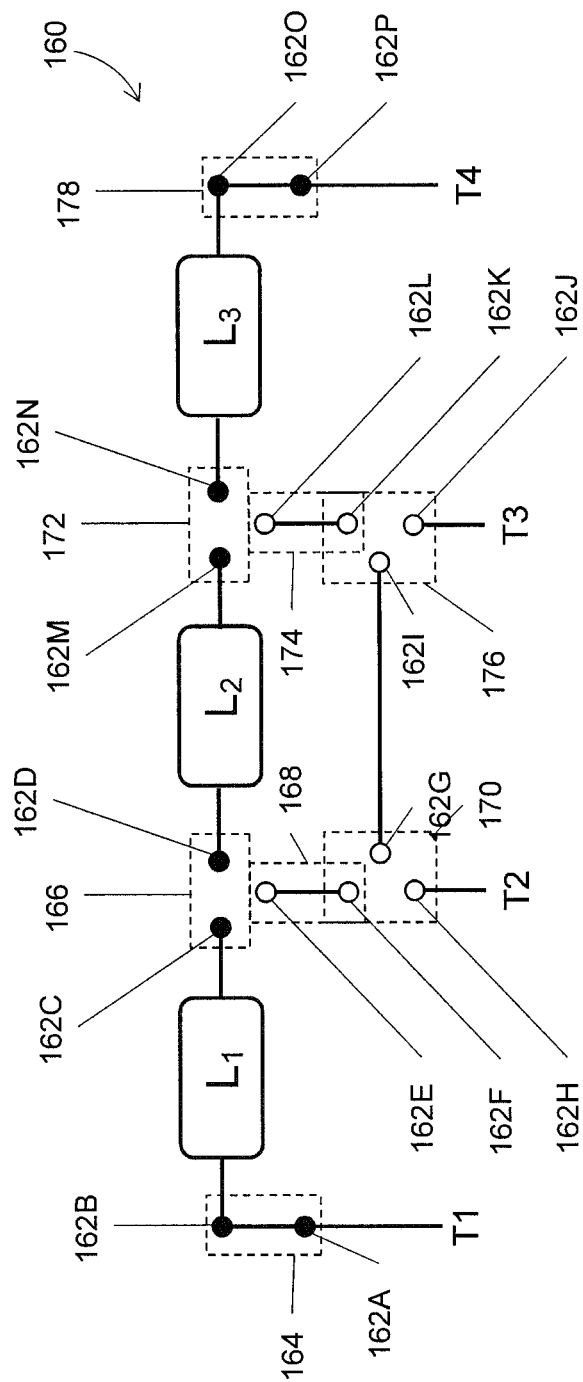
FIGS. 12A-12C illustrate various embodiments of electrical switch configurations that provide different electrical connections between inductor coils.
Figure 12B:
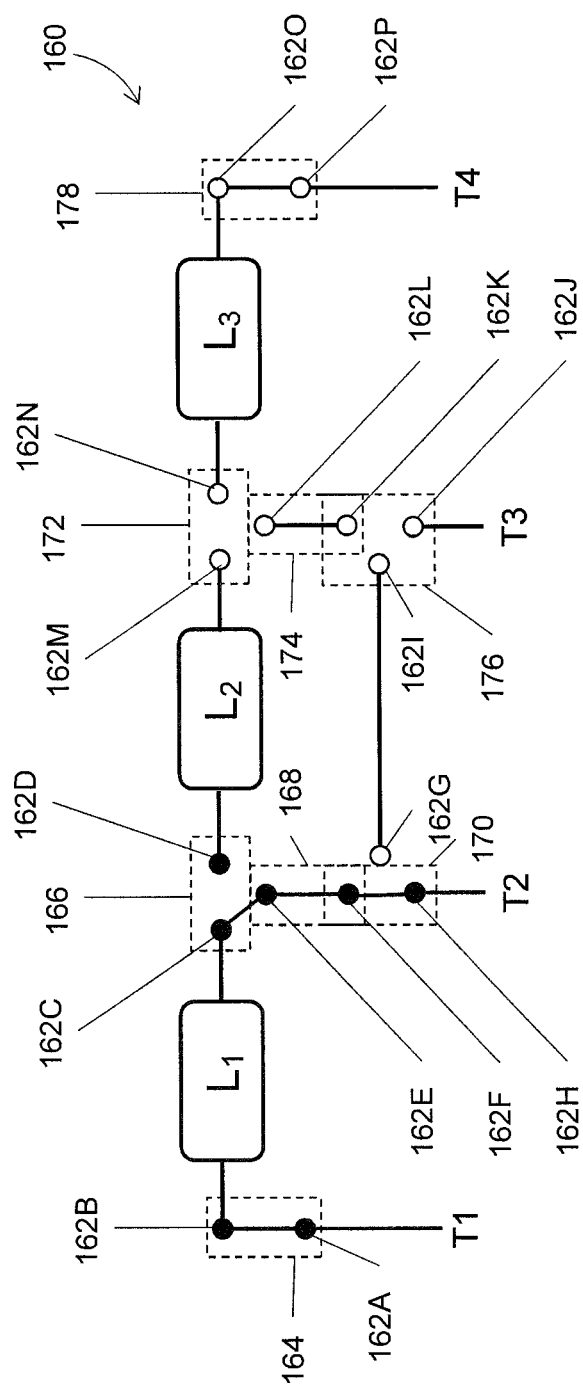
Figure 12C:
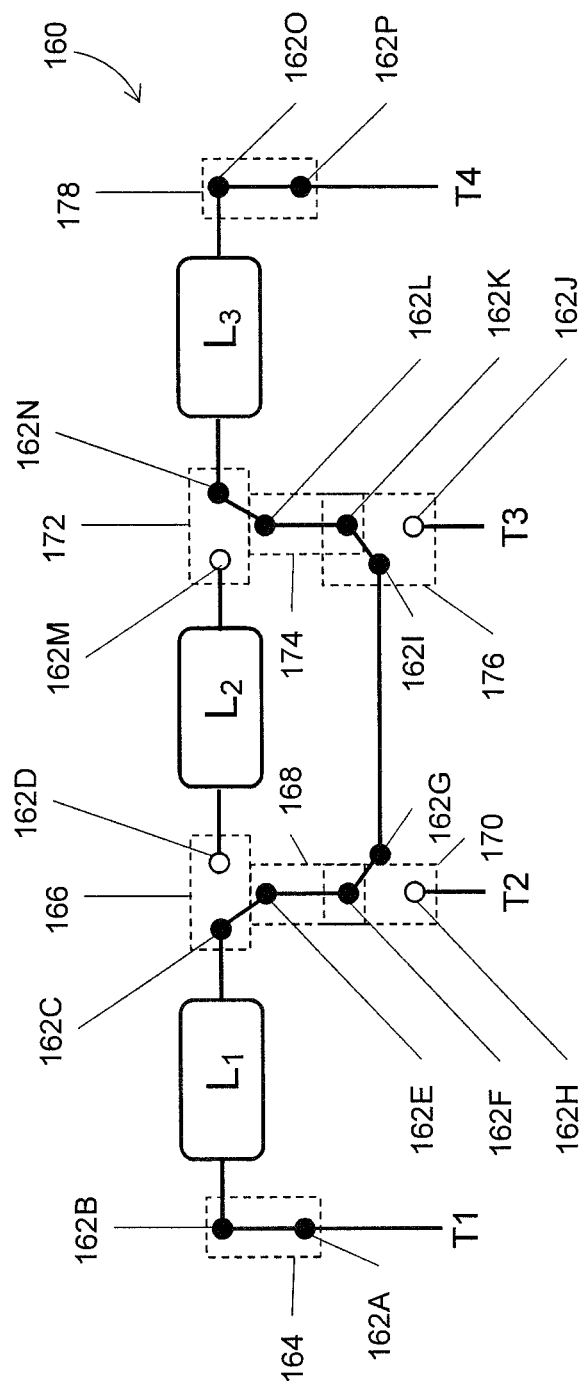

FIGS. 12A-12C illustrate embodiments of electrical switch configurations 160 that may be used to electrically connect and/or disconnect the various terminals that may comprise the single structure antenna of the present disclosure. It is noted that FIGS. 12A-12C correlate to respective embodiments illustrated in FIGS. 8A-8C. As illustrated in FIGS. 12A-12C, the exemplar antenna comprises three inductors $L_1$-$L_3$ having four terminal connections $T_1$-$T_4$. A multiple of electrical connection points 162A-162P are positioned at various locations along the antenna. In addition, the antenna comprises a multitude of electrical switches 164, 166, 168, 170, 172, 174, 176 and 178 that are positioned along the antenna and are designed to electrically connect and/or disconnect the various electrical connection points along the antenna. For example, electrical switch 164 is shown electrically connecting electrical connection points 162A and 162B, electrical switch 172 is shown electrically connecting electrical connection points 162M and 162N. Thus, by electrically connecting a certain combination of electrical connection points 162A-162P along the single structure antenna by at least one of the various electrical switches 164-178 the antenna can be tuned to a desired operating frequency, frequencies and/or inductances that are suitable to wirelessly transfer or receive electrical energy and/or data signals as desired.

Furthermore, any of these multitude of switches may be turned electrically "on" or "off" as desired as the antenna operates. It is noted that electrically active, i.e., electrically connected, electrical connection points are illustrated as black filled circles whereas non-active electrical connection points, i.e., electrical connection points that are electrically disconnected, are shown as unfilled circles. It is further noted that a microprocessor (not shown) or circuit board (not shown) may be used to control the combination of switches that are turned "on" or "off". In addition, the electrical switch may comprise a multitude of different electrical switches. Examples of which may include, but are not limited to, an electrical toggle switch, a rocker switch, a push button switch, an inline switch, switched capacitor networks, and filter networks that utilize inductors and/or capacitors. As defined herein, an electrical switch is an electrical component that can either connect or disconnect an electrical current, voltage, signal or combinations thereof, along an electrical pathway. A switch can also divert an electrical current, voltage, signal or combinations thereof, from one electrical conductor to another. An electrical switch that is in an "on" position is defined as allowing an electrical signal or electrical current or voltage to pass therethrough and thus is electrically connected. An electrical switch that is in an "off" position is defined as prohibiting an electrical signal or electrical current or voltage to pass therethrough and thus is electrically disconnected.

FIG. 12A illustrates an embodiment in which the antenna of the present disclosure is configured with the first and fourth terminals T1, T4 electrically connected such that the antenna exhibits an inductance equal to the combination of the first, second and third inductors $L_1$, $L_2$ and $L_3$. Specifically, as illustrated, electrical switches 164, 166, 172 and 178 are closed and electrical connection points 162A, 162B, 162C, 162D, 162M, 162N, 162O and 162P are electrically closed thereby allowing electrical current to pass therethrough.

FIG. 12B shows an embodiment in which the antenna is configured with the first and second terminals T1, T2 electrically connected so that the antenna exhibits an inductance comprising the first inductor $L_1$. Specifically, as illustrated, electrical switches 164, 166, and 170 are electrically closed and electrical connection points 162A, 162B, 162C, 162E, 162F, and 162H are electrically active. All other electrical switches and electrical connection points are illustrated to be electrically open.

Figure 13:
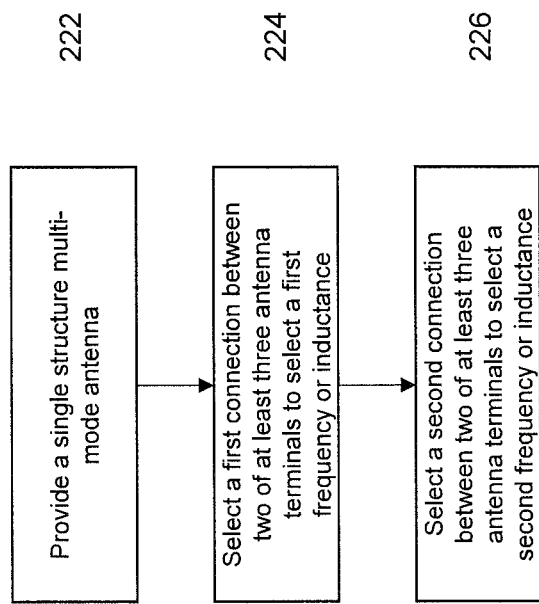
FIG. 13 is a flow chart that illustrates an embodiment of operating a single structure antenna of the present disclosure.

FIG. 12C shows an embodiment of the antenna in which the first and third inductors $L_1$, $L_3$ that comprise the antenna are electrically connected. As illustrated, an electrical switch connections bypass the second inductor $L_2$ within the antenna. A first bypass switch electrically connects the first inductor to a bypass portion of the antenna and a second bypass switch electrically connects the first inductor $L_1$ to the third inductor $L_3$. Specifically, as illustrated, electrical switches 164, 168, 174 and 178 are electrically closed and electrical connection points 162A, 162B, 162C, 162E, 162F, 162G, 162I, 162K, 162L, 162N, 162O and 162P are electrically active. FIG. 13 is a flow chart that illustrates an embodiment of operating the multi-mode single structure antenna of the present disclosure. As shown, in a first step 222, a multi-mode single structure antenna of the present disclosure is provided. In a second step 224, a connection between at least two terminals is selected. Thus, by connecting two of the at least three terminals enables an operator to select a desired receiving or transmitting antenna frequency. In addition, by connecting two of the at least three terminals enables an operator to select a desired inductance that is exhibited by the antenna. To tune the antenna to a different frequency or inductance, a second connection between two of the at least three terminals having a different electrical connection configuration of that of the first is made. The electrical connections between terminals may be made manually or alternatively, can be made automatically by a machine such as a computer or device comprising a processing unit. As previously mentioned, the electrical connections between terminals can be made via an electrical switch 37 and/or a selection circuit 118. Thus, it is contemplated that the single structure antenna of the present disclosure is capable of being tuned to a plurality of unlimited frequencies or inductances by connecting different terminals or electrical points positioned along at least the first and second coils 24, 26. It is appreciated that various modifications to the inventive concepts described herein may be apparent to those of ordinary skill in the art without departing from the spirit and scope of the present disclosure as defined by the appended claims.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of fabricating an antenna, the method comprising:
  a) providing a substrate having a surface composed of an electrically insulative material;
  b) forming a conductor on the substrate, wherein the conductor is a one piece construction providing an unitary electrically conductive body, the one piece construction comprising a first coil, a second coil, a continuous junction, a first terminal, a second terminal, and a third terminal in one piece, wherein
    i. the first coil has $N_1$ number of turns and is configured to generate a first inductance, the first coil comprising a continuous electrically conductive path that extends along the first coil from a first coil first end that resides at an end of an outermost turn of the first coil to a first coil second end that resides at an end of an innermost turn of the first coil;
    ii. the second coil has $N_2$ number of turns and is configured to generate a second inductance, the second coil comprising a continuous electrically conductive path that extends along the second coil from a second coil first end that resides at an end of an outermost turn of the second coil to a second coil second end that resides at an end of an innermost turn of the second coil, wherein the second coil is positioned on the substrate within an inner perimeter formed by the innermost turn of the first coil, wherein the first end of the second coil meets and joins the second end of the first coil forming the continuous junction therebetween, and wherein the continuous junction resides within the inner perimeter formed by the innermost turn of the first coil;

iii. the first end of the first coil disposed at the first terminal, the second end of the second coil disposed at the second terminal, the third terminal disposed along either of the first or second coils, wherein the third terminal is electrically connecting the first coil and the second coil, and wherein the first coil, the second coil, the continuous junction therebetween, the first terminal, the second terminal, and the third terminal form the one piece construction; and c) selecting a connection between two of the first, second and third terminals to adjust an inductance that is generatable by the antenna, the selected connection thereby tuning the antenna to a frequency or a frequency band.

2. The method of claim 1, wherein the first and second coils are formed by at least one of the following methods: a surface printing technique, photolithography, chemical or laser etching, laser cladding, laser cutting, physical or chemical vapor deposition, electrochemical deposition, molecular beam epitaxy, atomic layer deposition, stamping, or chemical processing.

3. The method of claim 1, further comprising creating a gap separating the outermost turn of the second coil from the innermost turn of the first coil.

4. The method of claim 3, further comprising providing a gap size of at least about 0.1 mm.

5. The method of claim 1, further comprising providing the first coil with two or more filars electrically connected in parallel.

6. The method of claim 1, further comprising providing the second coil with two or more filars electrically connected in parallel.

7. The method of claim 1, wherein the first terminal is disposed at an end of the first conductive wire of the first coil located at an outermost first coil perimeter, the third terminal is disposed at the first end of the second coil positioned at a second coil outer perimeter, and the second terminal is disposed at the second end of the second coil located along an interior perimeter of the second coil.

8. The method of claim 1, further comprising providing a selection circuit comprising at least one of a capacitor, a resistor, and an inductor electrically connected to the first, second, and third terminals.

9. The method of claim 8, wherein the selection circuit actively connects two of the first, second, and third terminals to generate a tunable inductance.

10. The method of claim 1, further comprising providing $N_1$ at least one and $N_2$ at least two.

11. The method of claim 1, further comprising providing $N_2$ greater than $N_1$.

12. The method of claim 1, further comprising providing each terminal with a terminal lead portion that extends between a coil connection point and a terminal end, the coil connection point electrically connected to one of either of the first and second coils, respectively, and wherein the terminal lead portion extends over at least a portion of either of the first and second coils, respectively.

13. The method of claim 12, further comprising providing a plurality of first vias are positioned adjacently along a right side of a length of the terminal lead portion and a plurality of second vias are positioned along a left side of a length of the terminal lead portion and opposed from the plurality of first vias so that each of the plurality of first vias opposes one of the plurality of second vias, wherein the respective opposing vias of the plurality of first and second vias are electrically connected to the same conductive wire of either of the first or second coils thereby establishing a conductive electrical path therebetween that bypasses the terminal lead portion.

14. The method of claim 1, further comprising providing at least the first or second coils with a variable width.

15. The method of claim 1, further comprising providing a quality factor greater than 10 at a frequency of at least 10 kHz.

16. The method of claim 1, further comprising selecting an electrical signal from the group consisting of a data signal, an electrical voltage, an electrical current, and combinations thereof receivable by at least one of the first and second coils.

17. The method of claim 1, further comprising selecting an electrical signal from the group consisting of a data signal, an electrical voltage, an electrical current, and combinations thereof transmittable by at least one of the first and second coils.

18. The method of claim 1, further comprising selecting a material of the substrate from the group consisting of a polyimide, an acrylic, fiberglass, polyester, polyether imide, polytetrafluoroethylene, polyethylene, polyetheretherketone (PEEK), polyethylene napthalate, fluropolymers, copolymers, a ceramic material, a ferrite material and combinations thereof.

19. The method of claim 1, wherein the antenna is configured to receive or transmit an electrical signal within a frequency band selected from the group consisting of about 100 kHz to about 250 kHz, about 250 kHz to about 500 kHz, 6.78 MHz, 13.56 MHz, and combinations thereof.

20. The method of claim 1, wherein the antenna is configured to receive or transmit an electrical signal at frequencies of at least 10 kHz.

21. The method of claim 1, wherein the first and second coils are at least partially overlapping.

* * * * *